United States Patent
Kwak et al.

(10) Patent No.: US 9,335,887 B2
(45) Date of Patent: May 10, 2016

(54) MULTI DISPLAY DEVICE AND METHOD OF PROVIDING TOOL THEREFOR

(71) Applicant: Samsung Electronics Co., Ltd., Suwon-si, Gyeonggi-do (KR)

(72) Inventors: Ji-yeon Kwak, Seoul (KR); Yong-jun Lim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 198 days.

(21) Appl. No.: 14/050,817

(22) Filed: Oct. 10, 2013

(65) Prior Publication Data

US 2014/0101576 A1 Apr. 10, 2014

(30) Foreign Application Priority Data

Oct. 10, 2012 (KR) .................. 10-2012-0112686

(51) Int. Cl.
| | | |
|---|---|---|
| *G06F 15/00* | (2006.01) | |
| *G06F 13/00* | (2006.01) | |
| *G06F 3/0481* | (2013.01) | |
| *G06F 3/0482* | (2013.01) | |
| *G06F 3/0488* | (2013.01) | |

(52) U.S. Cl.
CPC ............ *G06F 3/0481* (2013.01); *G06F 3/0482* (2013.01); *G06F 3/04883* (2013.01)

(58) Field of Classification Search
CPC ............................ G06F 1/1616; G06F 3/04842
USPC .................... 715/763–765, 783, 761
See application file for complete search history.

(56) References Cited

U.S. PATENT DOCUMENTS

| | | |
|---|---|---|
| 5,862,251 A | 1/1999 | Al-Karmi et al. |
| 6,545,669 B1 | 4/2003 | Kinawi et al. |
| 6,750,858 B1 | 6/2004 | Rosenstein |
| 6,819,939 B2 | 11/2004 | Masamura |
| 7,006,134 B1 | 2/2006 | Arai et al. |
| 7,120,317 B1 | 10/2006 | Wu et al. |
| 8,049,737 B2 | 11/2011 | Cho et al. |
| 2003/0179422 A1 | 9/2003 | Liu |
| 2004/0020941 A1 | 2/2004 | Engesser et al. |
| 2004/0150671 A1 | 8/2004 | Kamiwada et al. |
| 2006/0062466 A1 | 3/2006 | Zou et al. |
| 2006/0161870 A1 | 7/2006 | Hotelling et al. |
| 2007/0242056 A1 | 10/2007 | Engelhardt et al. |
| 2008/0126955 A1 | 5/2008 | Takatoshi |

(Continued)

FOREIGN PATENT DOCUMENTS

| | | |
|---|---|---|
| EP | 2244166 | 10/2010 |
| EP | 2347317 | 7/2011 |

(Continued)

OTHER PUBLICATIONS

US 7,092,574, 08/2006, Suzuki et al. (withdrawn)

*Primary Examiner* — Kevin Nguyen
(74) *Attorney, Agent, or Firm* — Staas & Halsey LLP

(57) ABSTRACT

A multi display device includes a first body including a first display, a second body including a second display, a hinge configured to connect the first and second bodies, and a controller configured to display a toolset including tools corresponding to an operation state of the multi display device on a screen of at least one of the first and second displays when a user manipulation to display a toolset is input, and to perform an operation corresponding to the selected tool when one tool is selected from the toolset.

24 Claims, 60 Drawing Sheets

(56) References Cited

U.S. PATENT DOCUMENTS

| | | |
|---|---|---|
| 2008/0148184 A1 | 6/2008 | Davis |
| 2008/0244468 A1 | 10/2008 | Nishihara et al. |
| 2010/0060664 A1 | 3/2010 | Kilpatrick, II et al. |
| 2010/0064244 A1 | 3/2010 | Kilpatrick, II et al. |
| 2010/0073306 A1 | 3/2010 | Hickerson |
| 2010/0079355 A1 | 4/2010 | Kilpatrick, II et al. |
| 2010/0085382 A1 | 4/2010 | Lundqvist et al. |
| 2010/0103099 A1 | 4/2010 | Lee |
| 2010/0182265 A1 | 7/2010 | Kim et al. |
| 2010/0188353 A1 | 7/2010 | Yoon et al. |
| 2010/0245256 A1 | 9/2010 | Estrada et al. |
| 2010/0255862 A1 | 10/2010 | Mitsunaga et al. |
| 2010/0275159 A1 | 10/2010 | Matsubara et al. |
| 2011/0102314 A1 | 5/2011 | Roux |
| 2011/0107226 A1 | 5/2011 | Heo |
| 2011/0187646 A1 | 8/2011 | Mahmoud |
| 2011/0191704 A1 | 8/2011 | Hinckley et al. |
| 2011/0209102 A1 | 8/2011 | Hinckley et al. |
| 2011/0216064 A1 | 9/2011 | Dahl et al. |
| 2011/0291988 A1 | 12/2011 | Bamji et al. |
| 2011/0310031 A1 | 12/2011 | Harris et al. |
| 2012/0015694 A1 | 1/2012 | Han |
| 2012/0042246 A1 | 2/2012 | Schwesinger et al. |
| 2012/0064947 A1 | 3/2012 | Yi et al. |
| 2012/0084710 A1 * | 4/2012 | Sirpal et al. .......... 715/783 |

FOREIGN PATENT DOCUMENTS

| | | |
|---|---|---|
| JP | 09504884 | 5/1997 |
| JP | 2796768 | 7/1998 |
| JP | 2001-021972 | 1/2001 |
| JP | 2002-281135 | 9/2002 |
| JP | 2004-259297 | 9/2004 |
| JP | 2006-030379 | 2/2006 |
| JP | 2008033686 | 2/2008 |
| JP | 2008-102947 | 5/2008 |
| JP | 2008-262544 | 10/2008 |
| JP | 2011-039942 | 2/2011 |
| JP | 2011221229 | 11/2011 |
| KR | 1020040035019 | 4/2004 |
| KR | 10-0448038 | 9/2004 |
| KR | 1020040091272 | 10/2004 |
| KR | 1020040104777 | 12/2004 |
| KR | 1020050068127 | 7/2005 |
| KR | 1020050078690 | 8/2005 |
| KR | 1020050109190 | 11/2005 |
| KR | 10-0606797 | 8/2006 |
| KR | 1020060092621 | 8/2006 |
| KR | 100653965 | 11/2006 |
| KR | 20070014586 | 2/2007 |
| KR | 1020070022612 | 2/2007 |
| KR | 1020070051249 | 5/2007 |
| KR | 100803504 | 2/2008 |
| KR | 1020080113832 | 12/2008 |
| KR | 1020090065040 | 6/2009 |
| KR | 20090102815 | 9/2009 |
| KR | 1020090092641 | 9/2009 |
| KR | 1020100053597 | 5/2010 |
| KR | 10-0960577 | 6/2010 |
| KR | 1020100086639 | 8/2010 |
| KR | 1020100105005 | 9/2010 |
| KR | 1020100115547 | 10/2010 |
| KR | 1020100121880 | 11/2010 |
| KR | 1020100132772 | 12/2010 |
| KR | 20110053265 | 5/2011 |
| KR | 20110053269 | 5/2011 |
| KR | 20110055718 | 5/2011 |
| KR | 1020110049492 | 5/2011 |
| KR | 20110066165 | 6/2011 |
| KR | 20110069803 | 6/2011 |
| KR | 1020110063410 | 6/2011 |
| KR | 1020110116699 | 10/2011 |
| KR | 10-1094769 | 12/2011 |
| KR | 20110139697 | 12/2011 |
| KR | 20120006674 | 1/2012 |
| KR | 1020120001944 | 1/2012 |
| KR | 1020120026395 | 3/2012 |
| KR | 1020120038692 | 4/2012 |
| WO | 2006086508 | 8/2006 |
| WO | 2012044545 | 4/2012 |

* cited by examiner (a)

(b)

(a)

(b)

(a)

(b)

MULTI DISPLAY DEVICE AND METHOD OF PROVIDING TOOL THEREFOR

CROSS-REFERENCE TO RELATED APPLICATIONS

This application claims priority under 35 U.S.C. §119 from Korean Patent Application No. 10-2012-0112686, filed on Oct. 10, 2012 in the Korean Intellectual Property Office, the disclosure of which is incorporated herein by reference in its entirety.

BACKGROUND OF THE INVENTION

1. Field of the Invention

Methods and apparatuses consistent with exemplary embodiments of the present general inventive concept relate to a multi display device and a method of providing a tool therefor, and more particularly, to a multi display device to display a task screen through a multi-display and to provide a tool usable on the task screen, and a method of providing a tool therefor.

2. Description of the Related Art

Various types of display devices have been used in recent years. Such display devices have various applications installed therein and execute them according to user's selection. The user may control the display device using an input device. In particular, many portable electronic devices that are easy to carry have been developed as display devices that use a user interface of a touch screen type due to their limited size. Accordingly, various types of graphical user interfaces (GUIs) that can be touched by the user may be provided.

The GUI may be provided in an optimized form so that the user can intuitively know an operation of a running application and can control a corresponding device more easily and swiftly.

However, most of the related-art user interfaces are generated for a display device including only one display unit. Therefore, a user interface method of a multi-display device including a plurality of display units has not been satisfactorily studied.

In particular, with the development of central processing unit (CPU) and software technologies, the portable devices are able to display a plurality of task screens displaying a single application or a plurality of applications. The plurality of task screens may be provided through one or more touch screens that are split physically or graphically.

Accordingly, there is a demand for a method to allow a user to use a multi-display device, which provides a plurality of task screens, more intuitively and more easily.

SUMMARY OF THE INVENTION

The present general inventive concept provides a multi display device and a method of providing various toolsets, which allow a user to control an application intuitively and easily.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a multi display device including a first body including a first display, a second body including a second display, a hinge to connect the first and second bodies, and, a controller to display a toolset comprising tools corresponding to an operation state of the multi display device on a screen of at least one of the first and second displays when a user manipulation to display a toolset is input, and to perform an operation corresponding to the selected tool when one tool is selected from the toolset, wherein a display position of a tool displayed on the toolset is variable.

The toolset may include a tool that is usable in an application that is being executed in the multi display device.

The toolset may include a dedicated tool that is used only for the application, and a common tool that is commonly usable in a plurality of applications, and the controller may place the dedicated tool in the toolset in preference to the common tool.

When a tool that is usable in the application that is being executed is selected from the toolset, the controller may display a tool icon corresponding to the selected tool, and may perform an operation corresponding to the tool while changing a display position of the tool icon according to user manipulation.

When there is a first lower level tool belonging to the selected tool, the controller may display a first lower level toolset listing the first lower level tool on one side of the toolset, and, when one first lower level tool is selected from the first lower level toolset and there is a second lower level tool belonging to the selected first lower level tool, the controller may display a second lower level toolset listing the second lower level tool on one side of the first lower level toolset.

A size and a shape of the toolset may be adjusted differently according to a number of tools that are usable in the application.

The user manipulation may be a touch gesture, and the toolset may be a graphic UI in which tools are arranged in a semi-circular form with reference to a point where the touch gesture ends. The first lower level toolset may be a graphic UI of a circular bar shape or a graphic UI of a button shape that is displayed along an outer edge of the toolset.

The controller may newly display a hidden tool on the toolset according to user manipulation.

The user manipulation may be a touch and drag gesture that is made from a border region of the first body in a first direction toward the first display or from a border region of the second body in a second direction toward the second display, and the controller may display the toolset on the first display or the second display according to a direction in which the touch and drag gesture is made.

The user manipulation may be a touch and drag gesture that is made from a connection region between the first body and the second body in a first direction toward the first display or in a second direction toward the second display, and the controller may display the toolset on the first display or the second display according to a direction in which the touch and drag gesture is made.

The toolset may further include at least one icon to select an application that is executable in the multi display device, and, when the icon is selected from the toolset, the controller may execute an application corresponding to the selected icon on a certain region of the first display or the second display.

The toolset may enable tool update and tool addition.

The controller may provide a tool region on at least one of the first display and the second display, and may move a tool that is selected by the user from among tools of the toolset to the tool region and may display the tool on the tool region.

The user manipulation may be a touch that is performed by an external object on the first display or the second display, and, when the touch is performed, the controller may display the toolset including a tool corresponding to a kind of the external object on a touch point, and may assign a function of a tool selected from the toolset to the external object.

When a patterning instrument is assigned to a first external object and a writing instrument is assigned to a second external object, and, when a touch is performed by the first external object and the second external object on the screen of the first or second display, the controller may display a pattering instrument image and a writing instrument image on touch points, and, when the touch point of the second external object is moved, the controller may display the patterning instrument image and a line that is drawn according to a moving path of the second external object.

The multi display device may further include a communicator that receives a control signal from a stylus pen to manipulate the multi display device, and, when a control signal to display the toolset is input from the stylus pen, the controller may determine that the user manipulation is performed.

The toolset may include at least one of an internet browser adjustment menu, a music player adjustment menu, a moving image player adjustment menu, a camera option adjustment menu, a message adjustment menu, a memo adjustment menu, a gallery adjustment menu, an e-book adjustment menu, a contact information adjustment menu, a calendar adjustment menu, a writing characteristic adjustment menu, and an e-book adjustment menu.

The foregoing and/or other features and utilities of the present general inventive concept may also be achieved by providing a method of providing a tool of a multi display device that includes a first body including a first display, and a second body including a second display, the method including when user manipulation to display a toolset is input, displaying a toolset including tools corresponding to an operation state of the multi display device on a screen of at least one of the first display and the second display, and when one tool is selected from the toolset, performing an operation corresponding to the selected tool, wherein a display position of a tool displayed on the toolset is variable.

The toolset may include a tool that is usable in an application that is being executed in the multi display device.

The toolset may include a dedicated tool that is used only for the application, and a common tool that is commonly usable in a plurality of applications, and the displaying the toolset may include placing the dedicated tool in the toolset in preference to the common tool.

The performing the operation corresponding to the selected tool may include, when a tool that is usable in the application that is being executed is selected from the toolset, displaying a tool icon corresponding to the selected tool, and performing an operation corresponding to the tool while changing a display position of the tool icon according to user manipulation.

The performing the operation corresponding to the selected tool may include, when there is a first lower level tool belonging to the selected tool, displaying a first lower level toolset listing the first lower level tool on one side of the toolset, and, when one first lower level tool is selected from the first lower level toolset and there is a second lower level tool belonging to the selected first lower level tool, displaying a second lower level toolset listing the second lower level tool on one side of the first lower level toolset.

A size and a shape of the toolset may be adjusted differently according to a number of tools that are usable in the application.

The user manipulation may be a touch gesture, and the toolset may be a graphic UI in which tools are arranged in a semi-circular form with reference to a point where the touch gesture ends. The first lower level toolset may be a graphic UI of a circular bar shape or a graphic UI of a button shape that is displayed along an outer edge of the toolset.

The method may further include newly displaying a hidden tool on the toolset according to user manipulation.

The user manipulation may be a touch and drag gesture that is made from a border region of the first body in a first direction toward the first display or from a border region of the second body in a second direction toward the second display, and the displaying on the screen may include displaying the toolset on the first display or the second display according to a direction in which the touch and drag gesture is made.

The user manipulation may be a touch and drag gesture that is made from a connection region between the first body and the second body in a first direction toward the first display or in a second direction toward the second display, and the displaying on the screen may include displaying the toolset on the first display or the second display according to a direction in which the touch and drag gesture is made.

The toolset may further include at least one icon to select an application that is executable in the multi display device, and the performing the operation corresponding to the selected tool may include, when the icon is selected from the toolset, executing an application corresponding to the selected icon on a certain region of the first display or the second display.

The toolset may enable tool update and tool addition.

The method may further include providing a tool region on at least one of the first display and the second display, and moving a tool that is selected by the user from among tools of the toolset to the tool region and displaying the tool on the tool region.

The user manipulation may be a touch that is performed by an external object on the first display or the second display, and the displaying on the screen may include, when the touch is performed, displaying the toolset including a tool corresponding to a kind of the external object on a touch point. The performing the operation corresponding to the tool may include assigning a function of a tool selected from the toolset to the external object.

The method may further include, when a patterning instrument is assigned to a first external object and a writing instrument is assigned to a second external object, and, when a touch is performed by the first external object and the second external object on the screen of the first or second display, displaying a pattering instrument image and a writing instrument image on touch points, and, when the touch point of the second external object is moved, displaying the patterning instrument image and a line that is drawn according to a moving path of the second external object.

The method may further include receiving a control signal from a stylus pen to manipulate the multi display device, and when a control signal to display the toolset is input from the stylus pen, determining that the pre-defined user manipulation is performed.

The toolset may include at least one of an internet browser adjustment menu, a music player adjustment menu, a moving image player adjustment menu, a camera option adjustment menu, a message adjustment menu, a memo adjustment menu, a gallery adjustment menu, an e-book adjustment menu, a contact information adjustment menu, a calendar adjustment menu, a writing characteristic adjustment menu, and an e-book adjustment menu.

The foregoing and/or other features and utilities of the present general inventive concept may also be achieved by providing a non-transitory computer readable recording medium having embodied thereon a computer program to execute a method of providing a tool of a multi display device, which includes a first display and a second display, the method including when user manipulation to display a toolset is input, displaying a toolset including tools corresponding to an operation state of the multi display device on a screen of at least one of the first display and the second display, and when one tool is selected from the toolset, performing an operation corresponding to the selected tool.

The foregoing and/or other features and utilities of the present general inventive concept may also be achieved by providing a multi display device, including a first body comprising a first display, a second body comprising a second display, a hinge to connect the first and second bodies, a communicator to communicate with an external device that provides an input to manipulate at least one of the first display and the second display, and a controller to differentiate between the input of the external device and another input of a user to display at least one toolset on at least one of the first display and the second display based on the differentiation to perform the manipulation.

The multi display device may further include at least one sensor to sense a location with respect to at least one of the first display and the second display of the input of the external device and the another input of a user.

The at least one toolset may be displayed on the at least one of the first display and the second display according to an operation state of the multi display device in response to the sensing.

The at least one toolset may include at least one tool displayed thereon to allow the user to perform the manipulation.

A display position of the at least one tool displayed on the at least one toolset may be variable.

The at least one toolset may appear when a tool corresponding to an already displayed toolset is selected.

A location of the at least one toolset on the at least one of the first display and the second display may be variable based on at least one of the input of the external device and another input of the user.

A first tool of the at least one toolset may be selected with respect to the input of the external device and a second tool of the at least one toolset may be selected with respect to the another input of the user to perform the manipulation.

The first tool and the second tool may be operated simultaneously.

The external device may include a stylus pen, including a sensor to sense movement of the stylus pen with respect to the first body and the second body, and a communicator to send results of the sensed movement to the communicator of the multi display device.

The stylus pen may perform the manipulation based on the movement.

BRIEF DESCRIPTION OF THE DRAWINGS

The above and/or other aspects will be more apparent by describing in detail exemplary embodiments, with reference to the accompanying drawings, in which:

These and/or other features and utilities of the present general inventive concept will become apparent and more readily appreciated from the following description of the embodiments, taken in conjunction with the accompanying drawings of which:

FIG. 52 is a view illustrating executing a toolset according to an approach of a user's hand according to an exemplary embodiment of the present general inventive concept;

DETAILED DESCRIPTION OF THE PREFERRED EMBODIMENTS

Figure 1:
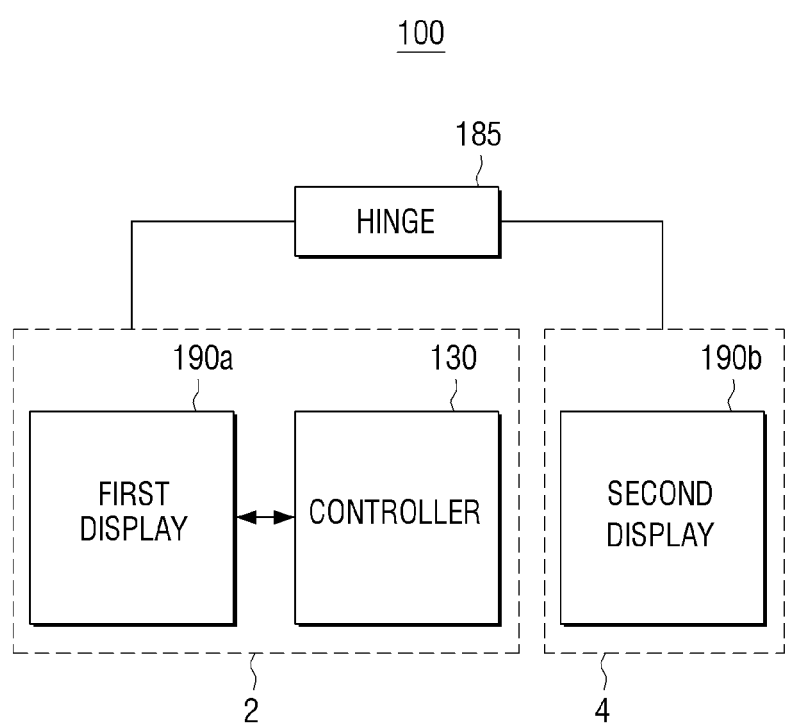
FIG. 1 is a block diagram illustrating a configuration of a multi display device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

A multi display device refers to a device that includes a display including one or more touch screens, and is configured to execute an application or display a content. For example, the multi display device may be implemented by a tablet personal computer (PC), a notebook computer, a laptop computer, a portable multimedia player (PMP), a personal digital assistant (PDA), a smart phone, a mobile phone, and a digital album, but is not limited thereto. Furthermore, the multi display device may include multiple displays and/or touch screens of any side thereof. Although a multi display device configured as a cellular phone or a smart phone according to exemplary embodiments will be explained below, the exemplary embodiments should not be construed as limited to this configuration.

FIG. 1 is a block diagram illustrating a configuration of a multi display device 100 according to an exemplary embodiment of the present general inventive concept.

Referring to FIG. 1, a multi display device 100 includes a first body 2, a second body 4, and a hinge 185. The first body 2 is a single independent exterior component including a controller 130 and a first display 190a, and the second body 4 is another independent exterior component including a second display 190b.

Although the controller 130 is provided in the first body 2 in FIG. 1, the controller 130 may be included in the second body 4 or a plurality of controllers 130 may be provided in the first and second bodies 2 and 4, respectively. The first and second bodies 2 and 4 may further include various circuits, chips or signal lines in addition to the above-described elements, but an illustration of a detailed configuration is omitted for convenience of explanation.

The first body 2 and the second body 4 are connected to each other by means of the hinge 185. The hinge 185 supports the first body 2 and the second body 4 to allow the first body 2 and the second body 4 to rotate with respect to the hinge 185. Rotation angles of the first body 2 and the second body 4 may be determined variously according to a shape of the hinge 185.

For example, when at least one of the first body 2 and the second body 4 is rotated, the first and second displays 190a and 190b may be closed to be brought into contact with each other, or may be bent back in the opposite direction and opened to have their rear surfaces brought into contact with each other. Also, the first and second displays 190a and 190b may be opened to be unfolded 180 degrees according to a configuration of the hinge 185. Various ways in which the first body 2 and the second body 4 may be folded or unfolded with reference to the hinge 185 according to exemplary embodiments of the present general inventive concept will be explained in detail below.

The first and second displays 190a and 190b, respectively, may display a multimedia content playback screen, an application execution screen, a desktop screen including an icon, and a web browsing screen under the control of the controller 130. The first and second displays 190a and 190b, respectively, may be implemented by using a touch screen. Accordingly, when a part of a user's body (for example, the user's fingers or thumb) or an inputting means (for example, a stylus pen), which can be sensed, touches the first and second displays 190a and 190b, respectively, the controller 130 may perform various operations according to coordinate values of the touch point and a shape of the touch gesture. The touch gesture includes various gestures such as simple touch, approach, touch and drag, double touch, a flick, and a rugging. The user may control the operations of the multi display device using the touch gesture. Also, when the multi display device is equipped with a micro phone, a camera, or a button, the user may control the operations of the multi display device using various combinations of different user manipulations such as voice manipulation to input a voice command through the microphone, motion manipulation to input a motion gesture using the camera, and button manipulation to perform various selection operations. Various shapes and motions of such user manipulations and corresponding control operations may be set in advance by a manufacturer of the multi display device or the user. When predetermined user manipulation is input, the controller 130 performs an operation corresponding to the user manipulation using the first display 190a and the second display 190b.

For example, when a user manipulation matching a toolset display operation is input, the controller 130 may display a toolset corresponding to an operation state of the multi display device on at least one of the first display 190a and the second display 190b. The toolset may display identifiers of various tools, such as icons and names.

The tool recited herein refers to various functions that the user can use in relation to a currently performed operation. For example, in a document creating program that allows the user to create, read, or edit a document, various tools such as font adjustment, thickness adjustment, pen, eraser, and ruler may be used, but are not limited thereto. Accordingly, when user manipulation set to display a toolset is input while the document creating program is being executed, the controller 130 displays a toolset including the above-described tools on a screen of at least one of the first and second displays 190a and 190b, respectively. Furthermore, when user manipulation to display a toolset is input while a home screen including various icons is being displayed, a toolset including a tool to add an icon to the home screen, a tool to execute a widget, and a tool to change a desktop image may be displayed. As described above, the toolset may include different tools according to a current operation state of the multi display device.

The user may select at least one tool from the toolset. When a tool is selected from the toolset, the controller 130 performs an operation corresponding to the selected tool. In the above-described example, when a pen is selected from the toolset, a line may be drawn by the pen along a trajectory of a user's finger touching and moving along at least one of the first and second displays 190a and 190b, respectively.

Such a toolset may display the tools of the toolset variably according to user's manipulation. Specifically, display positions of the tools included in the toolset and display or non-display of the tools are not always fixed, and may be adjusted according to user's manipulation. For example, a position of a tool of the toolset may be changed according to user's manipulation.

For another example, a tool that is placed on a variable region of the toolset that is not displayed on the screen may be displayed on a display region of the tool set that is displayed on the screen of the display by a user's touch (for example, a drag gesture such as rotating a dial). This will be explained in detail below with reference to FIG. 31.

Also, the toolset is not necessarily fixed and may be changed by updating the toolset by installing new software via a disc, memory, or the Internet, and tools may also be added or deleted. Also, the icons or names identifying the tools may be changed. Updating the tool will be explained below with reference to FIG. 55.

Hereinafter, various control operations of the controller 130 will be explained in detail.

The toolset may include a tool that is usable in an application that is being executed in the multi display device 100. In this case, the toolset may include a dedicated tool and a common tool. The dedicated tool is a tool that is usable only in an application that is being currently executed in the multi display device. In contrast, the common tool is a tool that is commonly usable not only in the application that is being currently executed but also in a plurality of applications. The controller 130 may display the dedicated tool on the toolset in preference to the common tool. For example, when a camera application is being executed, the dedicated tool may be a tool that is used only in the camera application, such as a flash setting tool, a front and rear camera conversion tool, a moving image shooting conversion tool, a focus mode setting tool, and a timer setting tool, but is not limited thereto. On the other hand, the common tool is a tool that is executable regardless of the camera application such as a message sending tool, a device environment setting tool, and a calling tool, but is not limited thereto.

The multi display device 100 displays the dedicated tool of the running application in preference to the common tool, thereby allowing the user to easily use the tool of the running application.

When there are many kinds of tools, the tools may be divided into an upper level tool and a lower level tool according to their respective characteristics. The lower level tool refers to a sub tool that belongs to the upper level tool. For example, if a tool indicating a writing instrument is an upper level tool, specific writing instruments such as a pencil, a pen, a brush, and a crayon may be lower level tools. The tools that are included in the initially displayed toolset may refer to upper level tools.

When there is a first lower level tool that belongs to the selected tool, the controller 130 may display a first lower level toolset listing the first lower level tool on one side of the toolset. When one of the first lower level tools is selected from the first lower level toolset and there is a second lower level tool belonging to the selected first lower level tool, a second lower level toolset listing the second lower level tool may be displayed on one side of the first lower level toolset. In the above example, when the writing instrument tool is an uppermost level tool and tools such as a pencil, a pen, a brush, and a crayon are first lower level tools belonging to the tool instrument tool, various pens of different thicknesses may be provided as second lower level tools for the pen. The toolset may have its size and shape adjusted according to a number of tools usable in the running application.

According to various exemplary embodiments of the present general inventive concept, the toolset may be a graphic user interface (UI) in which tools are arranged in a semi-circular form with reference to a point where a touch gesture ends, and the lower level toolset may be a graphic UI of a circular bar shape or a graphic UI of a button shape that is displayed along an outer edge of the upper level toolset. Accordingly, at least one of the toolset and the lower level toolset may display hidden tools that are newly displayed according to user manipulation.

The hidden tool refers to a tool that is placed on the variable region of the toolset that is not displayed on the display. It is common that frequently used tools may be placed on the display region of the toolset and the other tools may be placed on the variable region. The hidden tool that is placed on the variable region of the toolset may be installed by updating the toolset. The hidden tool will be explained in detail below with reference to FIG. 31.

Although the toolset UI has a semi-circular shape in the above example, this should not be considered as limiting and the toolset UI may be implemented in the form of a water drop UI, a card pocket UI, a quadrangular menu bar UI, or a quadrangular graph UI. The toolset UI will be explained in detail below with reference to FIGS. 31 through 33.

Hereinafter, an operation of the controller 130 according to user manipulation to call a toolset will be explained.

The user manipulation according to an exemplary embodiment of the present general inventive concept may be a touch and drag gesture that allows a user to touch a connection region between the first body 2 and the second body 4 and perform a drag in a first direction toward the first display 190a or in a second direction toward the second display 190b.

Also, the user manipulation may be a touch and drag gesture that allows a user to touch a border region of the first body 2 and perform a drag in a first direction toward the first display 190a, or touch a border region of the second body 4 and perform a drag in a second direction toward the second display 190b.

The controller 130 may display the toolset on the first display 190a or the second display 190b according to a direction or a location in which the touch and drag gesture is performed.

According to various exemplary embodiments of the present general inventive concept, the toolset may further include at least one icon to select an application that is executable in the multi display device 100. When an icon is selected on the toolset, the controller 130 may execute an application corresponding to the selected icon on a certain region of the first display 190a or the second display 190b.

According to various exemplary embodiments of the present general inventive concept, the controller 130 may provide a tool region on at least one of the first display 190a and the second display 190b, and may move a tool that is selected from among the tools displayed on the toolset to the tool region and display it.

The above-described exemplary embodiments of the present general inventive concept will be explained in detail along with a toolset dock of FIG. 37.

According to various exemplary embodiments of the present general inventive concept, when the user manipulation is a touch that is performed by an external object on the first display 190a or the second display 190b, the controller 130 may display a toolset including tools corresponding to a type of the external object on a touch point, and may assign a function of a tool selected from the toolset to the external object. More specifically, when a patterning instrument is assigned to a first external object and a writing instrument is assigned to a second external object, and when the user touches the screen of the first or second display 190a or 190b with the first external object and the second external object, the controller 130 displays a patterning instrument image and a writing instrument image on the touch point, and, when the touch point of the second external object is moved, the controller 130 may display the patterning instrument image and a line that is drawn along a moving path of the second external object. Specifically, the patterning instrument may include various straight ruler, squares ruler, wave-form ruler, protractors, and circular plates, and the writing instrument may include pencils, pens, brushes, and crayons displaying various colors. As such, the multi display device 100 is able to differentiate between the first and second external objects.

The above-described exemplary embodiment of the present general inventive concept will be explained in detail with reference to FIGS. 53 and 54.

According to various exemplary embodiments of the present general inventive concept, when a control signal to display a toolset is input from a stylus pen, the controller 130 may determine that user manipulation is performed.

The above-described various exemplary embodiments of the present general inventive concept regarding displaying the toolset will be explained in detail below with reference to the accompanying drawings.

Figure 2:
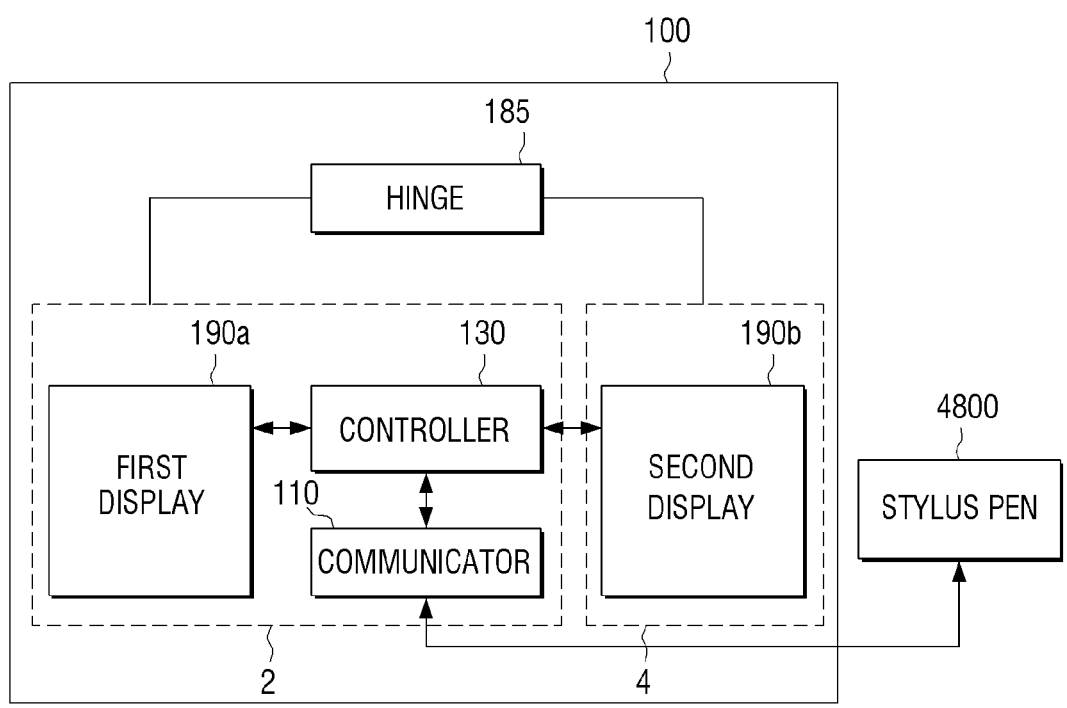
FIG. 2 is a schematic block diagram illustrating configurations of a multi display device and a stylus pen according to an exemplary embodiment of the present general inventive concept.

FIG. 2 is a schematic block diagram illustrating configurations of a multi display device 100 and a stylus pen 4800 according to an exemplary embodiment of the present general inventive concept.

Referring to FIG. 2, the multi display device 100 may include first and second displays 190a and 190b, respectively, a hinge 185, a controller 130, and a communicator 110, and may receive external input from the stylus pen 4800.

The operations of the first and second displays 190a and 190b, respectively, the hinge 185, and the controller 130 have been described above with reference to FIG. 1, and thus a redundant explanation is omitted.

The communicator 110 receives a control signal to manipulate the multi display device 100 from the stylus pen 4800.

The stylus pen 4800 is of a pencil type and refers to an auxiliary device to manipulate the multi display device.

The stylus pen 4800 may transmit a control signal to display a toolset to the communicator 110 of the multi display device 100. A general function of the stylus pen 4800 will be explained in detail with reference to FIG. 48.

Figure 3:
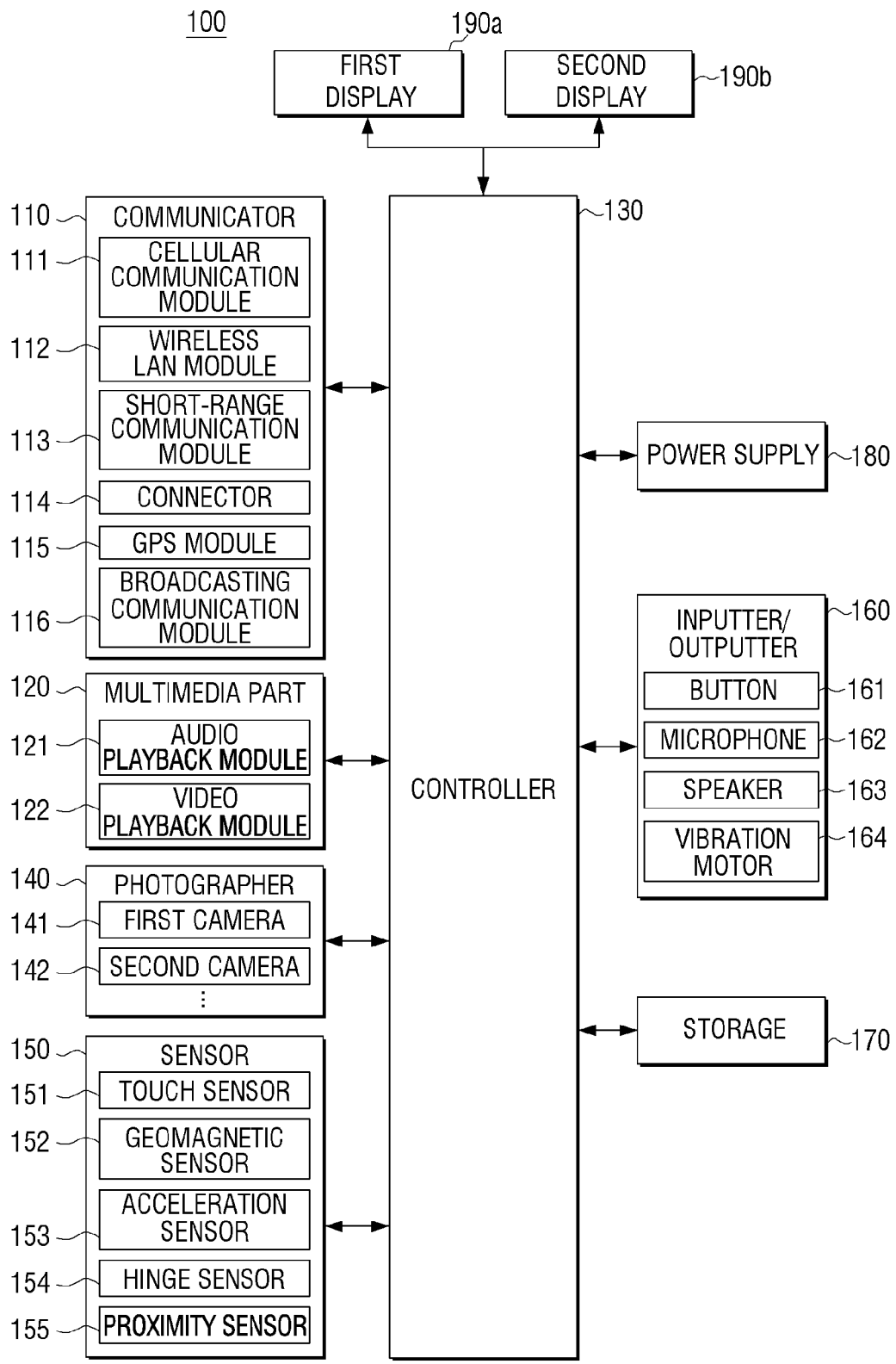
FIG. 3 is a block diagram illustrating an example of a detailed configuration of a multi display device according to an exemplary embodiment of the present general inventive concept.

FIG. 3 is a block diagram illustrating a configuration of a multi display device in detail according to an exemplary embodiment of the present general inventive concept.

Referring to FIG. 3, the multi display device 100 according to an exemplary embodiment includes a communicator 110, a multimedia part 120, a controller 130, a photographer 140, a sensor 150, an inputter/outputter 160, a storage 170, a power supply 180, and first and second displays 190a and 190b, respectively.

The communicator 110 may be configured to exchange information with an external device using various wired/wireless communication methods. The external device recited herein may include at least one of another device, a mobile phone, a smart phone, a tablet PC, a computer server, and a digital TV. These devices may be connected to the multi display device 100 through a communication network.

The communicator 110 may include wireless communication modules such as a cellular communication module 112, a wireless LAN module 112, a short-range communication module 113, a GPS communication module 115, a broadcast communication module 116, and a connector 114 including at least one of wire communication modules such as a high-definition multimedia interface (HDMI), a universal serial bus (USB), and an institute of electrical and electronics engineers (IEEE) 1394, but is not limited thereto.

The cellular communication module 111 uses wireless access technology according to a cellular communication protocol under the control of the controller 130, and allows the multi display device 100 to be connected with an external device (in particular, a base station of a cellular system) through at least one antenna or a plurality of antennas (not illustrated).

Also, the cellular communication module 111 exchanges radio signals containing a voice, a video, a short message service (SMS) message, or a multimedia messaging service (MMS) message with another device that is accessible such as a mobile phone having a phone number input to the multi display device 100, a smart phone, and a tablet PC.

The wireless LAN module 112 accesses a wireless access point (AP) (not illustrated) that exists within a predetermined range under the control of the controller 130, and is connected to the Internet. The wireless LAN module 112 may support the wireless LAN standard of IEEE, but is not limited thereto.

The short-range communication module 113 is configured to allow the multi display device 100 to perform short-range communication with an external device under the control of the controller 130. The short-range communication module 113 may include at least one of a Bluetooth module, an infrared data association (IrDA) module associated with an IrDA data 1.4 standard, a near field communication (NFC) module, a Wi-Fi module, and a Zigbee module, but is not limited thereto.

The Bluetooth module transmits a data stream in the form of a data packet using 2402~2480 MHz, except for 2 MHz after 2400 MHz and 3.5 MHz before 2483.5 MHz of industrial scientific and medical (ISM), that is, 79 channels in total. When a frequency hopping method is used to transmit packets (data) little by little while hopping a plurality of channels rapidly according to a specific pattern, 79 channels may hop 1600 times per 1 second.

The IrDA module transmits data using infrared rays. The infrared rays have a longer wavelength than that of visible rays and thus smoothly pass through minute particles drifting in the air. In particular, the infrared rays can easily guarantee a wide bandwidth in comparison with electromagnetic wave and has the merit of transmitting data at high speed. According to the IrDA data 1.4 standard, the multi display device 100 is able to wirelessly communicate with an external device at a rate of up to 16 Mbps within a 1M distance.

The NFC module communicates with an external device in a non-contact short-range wireless communication method using a frequency band of 13.56 Mz. When a plurality of terminals using the NFC technology approach one another within a short distance such as about 10 cm, the terminals exchange data with one another. In this case, the external device may include a module including an NFC tag and the multi display device 100 may include an NFC reader. When tagging is performed, data is transmitted from the external device to the multi display device 100. To exchange information, the external device and the multi display device 100 may include an NFC tag and an NFC reader, respectively.

The Wi-Fi module performs short-range communication according to the IEEE 802.11 standard. According to the IEEE 802.11n, data can be transmitted at a rate of up to 150 Mbps. If multiple-input and multiple-out (MIMO) technology to increase output using a plurality of antennas is applied, data can be transmitted at a rate of up to 600 Mbps. In particular, the Wi-Fi direct method guarantees the above rate and also enables direct communication between devices without a separate AP.

The communicator 110 may include the Zigbee module. The Zigbee is a short-range communication method according to IEEE 802.15.4 technology standard, and has a transfer rate of 250 Kbps, 20 Kbps, and 40 Kbps. This method is suitable for relatively simple data transfer.

As described above, the communicator 110 may be implemented in the above-described various short-range communication methods, but is not limited thereto.

The connector 114 is configured to provide an interface with various devices such as a USB 2.0, a USB 3.0, an HDMI, and IEEE 1394, but is not limited thereto.

The connector 114 may be used as an interface to connect the multi display device 100 and an external device or a power source. The connector 114 may transmit data stored in the storage 170 of the multi display device 100 to the external devices or receive data from the external device through a cable connected to the connector 114 under the control of the controller 130. Power may be input from the power source through the cable connected to the connector 114, or a battery (not illustrated) may be charged through the cable.

The GPS module 115 receives electromagnetic waves from a plurality of GPS satellites (not illustrated) orbiting around the earth, and calculates a location of the multi display device 100 using a time of arrival from the GPS satellites (not illustrated) to the multi display device 100 and GPS parameters.

The broadcasting communication module 116 may receive broadcast signals (for example, TV broadcast signals, radio broadcast signals, or data broadcast signals) and additional broadcast information (for example, electronic program guide (EPG) or electronic service guide (ESG)) from a broadcasting station through a broadcast communication antenna (not illustrated) under the control of the controller 130.

The multimedia part 120 is included to reproduce moving image contents, audio contents, and other various multimedia contents. The multimedia part 120 processes the multimedia content using a parser or a codec and reproduces the content. The multimedia part 120 includes an audio reproducing module 121 and a video reproducing module 122.

The audio reproducing module 121 may reproduce a stored or received digital audio file (for example, a file having an extension of mp3, wma, ogg, or wav) under the control of the controller 130.

The video reproducing module 122 may reproduce a stored or received digital moving image file (for example, a file having an extension of mpeg, mpg, mp4, avi, mov, or mkv) under the control of the controller 130.

The video reproducing module 122 supports various codecs to be able to reproduce a digital video file. That is, the video reproducing module 122 decodes video data using a codec corresponding to an encoding method of the video file to be reproduced.

The controller 130 controls the communicator 110, the multimedia part 120, the photographer 140, the sensor 150, the inputter/outputter 160, the storage 170, the power supply 180, and the first and second displays 190a and 190b, respectively. The controller 130 provides a clock to hardware, and includes a CPU to transmit control signals, a memory to temporarily or semi-permanently store a process, a GPU to process graphics, and a system bus to transmit data between the memory and the CPU and the GPU. Also, the controller 130 includes an operating system (OS) to run the hardware configuration, and an application to provide a user interface on the OS and transmit the interface to a framework. Each element of the controller 130 will be explained in detail below.

The photographer 140 may include at least one of a first camera 141 and a second camera 142 as illustrated in FIG. 3. Although only the first camera 141 and the second camera 142 are illustrated in FIG. 3, an additional camera may be included according to an exemplary embodiment of the present general inventive concept.

Figure 23:
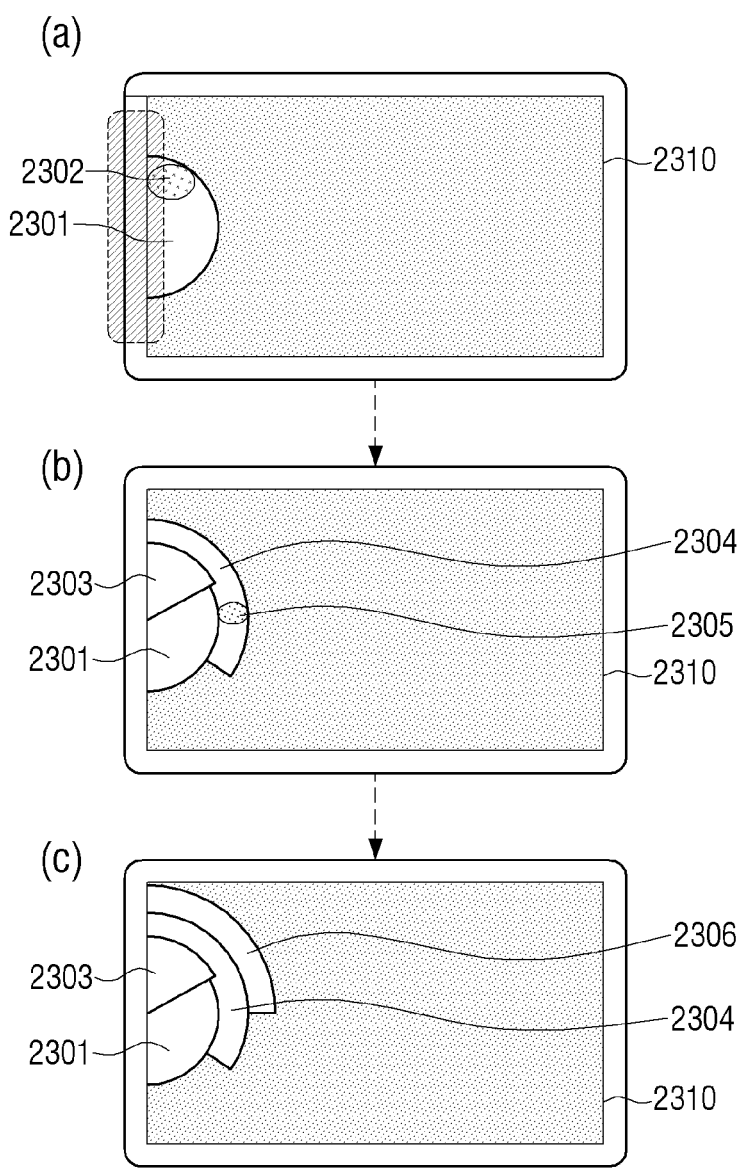

Each of the first and second cameras 141 and 142 includes a shutter (not illustrated), a lens 5110 of FIG. 23, an aperture (not illustrated), and a charge coupled device (CCD) image sensor (not illustrated), and an analogue/digital converter (ADC). The shutter is a mechanism to adjust an amount of exposed light along with the aperture. The lens receives light from an external light source and processes an image. At this time, the aperture adjusts an amount of incident light according to how much it is opened or closed. The CCD image sensor accumulates light input through the lens and outputs the image photographed by the lens in synchronization with a vertical sync signal according to an amount of accumulated light. An image is obtained by the CCD image sensor that converts light reflected from a subject into an electric signal. In order to obtain a color image using the CCD image sensor, a color filter is required. A filter such as a color filter array (CFA) may be employed. The CFA allows each pixel to pass only the light representing one color, and has a regularly arranged configuration and has various forms according to its arrangement configuration. The ADC converts an analogue image signal output from the CCD image sensor into a digital signal. The above configuration is merely an example and the configuration of each camera may be variously modified. For example, each camera may photograph an image using a complementary metal oxide semiconductor (CMOS) image sensor rather than the CCD image sensor.

The first camera 141 and the second camera 142 may be provided in a housing of the multi display device 100 or may be connected to the multi display device 100 using a separate connecting means. At least one of the first camera 141 and the second camera 142 may include an auxiliary light source (for example, a flash (not illustrated)) to provide necessary light to perform photographing.

According to an exemplary embodiment of the present general inventive concept, the first camera 141 may be disposed on a front surface of the multi display device 100, and the second camera 142 may be disposed on a rear surface of the multi display device 100. According to another exemplary embodiment of the present general inventive concept, the first camera 141 and the second camera 142 may be adjacent to each other (for example, a gap between the first camera 141 and the second camera 142 is larger than 1 cm and less than 8 cm) to photograph a 3D still image or a 3D moving image. According to still another exemplary embodiment of the present general inventive concept, the first camera 141 may be displayed on a first panel and the second camera 141 may be disposed on a second panel.

The photographer 140 may detect a user's motion or shape through at least one of the first camera 141 and the second camera 142, and may transmit the user's motion or shape to the controller 130 as an input to execute or control an application. For example, the user's motion may refer to a user's hand motion sensed by the first or second camera. The user's shape may refer to a facial shape of the user sensed by the first or second camera.

According to still another exemplary embodiment of the present general inventive concept, the multi display device 100 may detect a user's motion using other means such as an infrared ray sensor, and may execute or control an application in response to the motion.

The sensor 150 is to sense various state changes such as a user's touch on the multi display device 100, a user motion, and a motion of the multi display device 100. In the above-described exemplary embodiment of the present general inventive concept, the touch sensor or proximity sensor has been described as an example of the sensor 150. In another exemplary embodiment of the present general inventive concept, the sensor 150 may include at least one of a touch sensor 151, a geomagnetic sensor 152, an acceleration sensor 153, a hinge sensor 154, and a proximity sensor 155.

Figure 6:
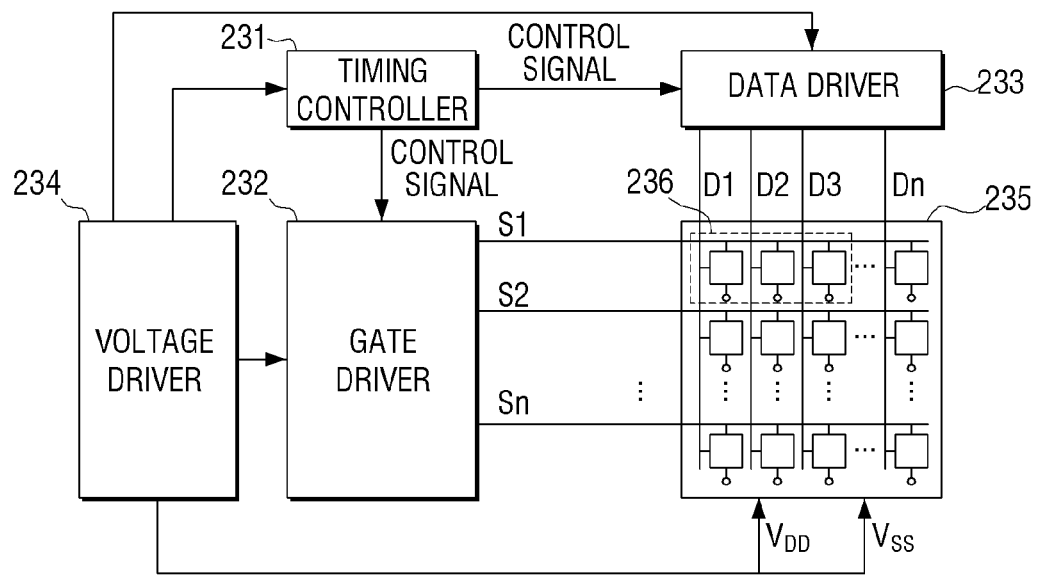
FIG. 6 is a view illustrating an example of a hardware configuration of a display according to an exemplary embodiment of the present general inventive concept.

The touch sensor 151 is a sensor that can sense a touch of a user object on the display of the multi display device 100. That is, the touch sensor 151 senses input to select an object displayed on a display screen by touching the first or second display 190a or 190b using a body such as a finger or a inputting means which can be sensed. The touch sensor 151 may be divided into a capacitive touch sensor and a piezoelectric touch sensor according to how a user's touch is sensed. The touch sensor 151 according to an exemplary embodiment of the present general inventive concept may be implemented in either of the two types described above. The touch sensor 151 may be included in the first and second displays 190a and 190b, respectively, along with a display panel 235, as illustrated in FIG. 6.

The geomagnetic sensor 152 is a sensor that senses azimuth by detecting a flow of a magnetic field. The geomagnetic sensor 152 detects azimuth coordinates of the multi display device 100 and detects a direction in which the multi display device 100 is placed based on the azimuth coordinates. The direction in which the multi display device 100 is placed is recognized as corresponding control input and the controller 130 performs corresponding output.

The acceleration sensor 153 is a sensor that senses acceleration of the multi display device 100, and sets virtual x, y, and z axes on the multi display device 100 and senses a value of acceleration of gravity that changes according to an inclination of each axis. The acceleration sensor 153 may be used to detect acceleration (i.e., dynamic acceleration) of a moving object, but may be used mainly to detect the acceleration of gravity.

The hinge sensor 156 may sense an angle or a motion of the hinge 185. The proximity sensor 155 may sense whether an object approaches the multi display device 100 of the user. The proximity sensor will be explained in detail below.

Although not illustrated in FIG. 3, the sensor 150 of the multimedia display device 100 may further include at least one of a gravity sensor that senses in which direction gravity is acted, a gyro sensor that recognizes six axes in total by adding rotation to an existing acceleration sensor, an orientation sensor that automatically senses horizontal and vertical frames of a content such as an image and automatically rotates and arranges the content, an illuminance sensor that senses an amount of ambient light around the multi display device 100, an altitude sensor that measures atmospheric pressure, an RGB sensor that senses a color of an object, a distance sensor that measures a distance using ultrasonic wave or infrared rays, and a hall sensor that uses a change in a voltage according to a magnitude of a magnetic field.

The sensor 150 detects a state of each sensor, generates a signal corresponding to the detection, and transmits the signal to the controller 130. The sensors of the sensor 150 may be added or deleted according to performance of the multi display device 100.

The inputter/outputter 160 is an element that performs input/output using a screen or other external connecting ports. Specifically, the inputter/outputter 160 receives an input signal that is transmitted from an inputting means connected to the multi display device 100 such as a mouse, a keyboard, or a joystick, or a wireless inputting means such as a remote controller, and transmits the input signal to the controller 130. Also, the inputter/outputter 160 may output various signals or data that is generated by the controller 130 to an external device. The inputter/outputter 160 includes a button 161, a microphone 162, a speaker 163, and a vibration motor 164.

At least one button 161 may be formed on a front surface, a side surface, or a rear surface of the housing of the multi display device 100 in the form of a push type or a touch type, and may include at least one of a power/lock button, a volume control button, a menu button, a home button, a back button, and a search button. When the button 161 is pressed, a corresponding control command is generated and transmitted to the controller 130. The controller 130 controls the operation of the multi display device 100 according to the control command.

The microphone 162 receives a voice or a sound under the control of the controller 130 and generates an electric signal.

The speaker 163 may output a sound corresponding to various signals of the cellular communication module 111, the wireless LAN module 112, the short-range communication module 113, the multimedia part 120, or the photographer (for example, a radio signal, a broadcast signal, a digital audio file, a digital moving image file, or photographing) to the outside of the multi display device 100.

The speaker 163 may output a sound corresponding to a function of the multi display device 100 (for example, a button sound or a ringtone corresponding to calling). A single speaker 163 or a plurality of speakers 163 may be formed on an appropriate location or locations of the housing of the multi display device 100. For example, the speaker 163 may include an internal speaker module that is formed on a location that is in the proximity to user's ears when the user is on the phone, and an external speaker module that has higher output suitable to reproduce audio/video files or to allow a user to view a broadcast, and is disposed on an appropriate location of the housing of the multi display device 100.

The vibration motor 164 converts an electric signal into a mechanical vibration under the control of the controller 130. For example, when a voice call is received from another device (not illustrated), the multi display device 100 that is in a vibration mode drives the vibration motor 164. A single vibration motor 164 or a plurality of vibration motors 164 may be disposed in the housing of the multi display device 100. The vibration motor 164 may be operated in response to a user's touch gesture sensed on the first or second display 190a or 190b, and a continuous touch motion sensed on the first or second display 190a or 190b.

The storage 170 is configured to store various programs and data such as an operating system (OS) or an application.

The storage 170 may store an operating system (OS) program to control the operation of the multi display device 100. When the multi display device 100 is turned on, the stored OS is read out from the storage, compiled, and runs each component of the multi display device 100.

The storage 170 may also store an application program that is managed by the OS, performs the operation of the multi display device 100 using resources of the OS, and provides a user interface. The application program is read out from the storage by the OS according to a user's execution command, and is converted into an executable format and performs various operations.

Further, the storage 170 may store various multimedia data that are processed by the controller 130, content data, and data that is received from an external source. That is, the storage 170 may store signals, information, or data that are input/output according to the operations of the cellular communication module 111, the wireless LAN module 112, the short-range communication module 113, the connector 114, the GPS module 115, the multimedia part 120, the photographer 140, the sensor 150, the inputter/outputter 160, and the first and second displays 190a and 190b, respectively, under the control of the controller 130.

For example, the storage 170 may store information that is transmitted according to a result of sensing by the input pen 500, or may store a result of analyzing the information by the controller 130.

The storage 170 may be implemented by using at least one of a read only memory (ROM), a random access memory (ROM), a memory card (for example, an SD card or a memory stick) that is mountable in the multi display device 100 or dismountable from the multi display device 100, a non-volatile memory, a volatile memory, a hard disk drive (HDD), or a solid state drive (SSD), but is not limited thereto.

The power supply 180 supplies power to be used in the multi display device 100. The power supply 180 may be implemented by a rechargeable battery, and may further include a voltage converter to convert an external power source and supply it to a rechargeable battery.

The power supply 180 may supply power to the multi display device 100 in various modes such as a maximum performance mode, a general mode, a power saving mode, and a standby mode under the power control of the controller 130.

The first and second displays 190a and 190b, respectively, are included in the sensor 150 as described above, and are configured to output images stored in a frame buffers. The first and second displays 190a and 190b, respectively, may display multimedia contents, images, moving images, and texts under the control of the controller 130.

The first display 190a and the second display 190b are physically separated from each other. Display screens displayed on the first display 190a and the second display 190b may be controlled independently. For example, resolution of the first display 190a and resolution of the second display 190b are individually set. Also, screen enlargement, screen rotation, screen movement, and screen split of the first display 190a and the second display 190b may be individually performed.

The first display 190a and the second display 190b may display a single display screen using a virtual integrated frame buffer.

The first and second displays 190a and 190b, respectively, are display devices that display execution screens of various applications executable by the controller 130 (for example, call, data transfer, broadcast, and camera) and provide user interfaces corresponding to the applications. The first and second displays 190a and 190b, respectively, may include the above-described touch sensor 151. In this case, the first and second displays 190a and 190b, respectively, may receive input of at least one touch gesture through a user's body (for example, fingers including the thumb) or an inputting means that can be sensed (for example, a stylus pen).

Such a user interface may include a predetermined touch region, a soft key, and a soft menu. An electronic signal corresponding to at least one touch gesture that is input through the user interface may be transmitted to the first and second display 190a and 190b, respectively, through an LCD controller (not illustrated). Also, the first and second displays 190a and 190b, respectively, may sense a continuous touch motion and may transmit an electronic signal corresponding to a continuous or discontinuous touch motion to the LCD controller. As described above, the touch sensor 151 may be implemented by a resistive method, a capacitive method, an infrared-ray method, or an acoustic wave method.

The first and second displays 190a and 190b, respectively, convert a sensing signal regarding a user operation that is sensed through the touch sensor into a digital signal (for example, x and y coordinates), and transmits the digital signal to the controller 130. The controller 130 may perform a control operation corresponding to the user operation that is input through the first and second displays 190a and 190b, respectively, using the received digital signal. For example, the controller 130 may select a soft key that is displayed on the first and second displays 190a and 190b, respectively, or may execute an application corresponding to the soft key in response to the user operation.

The above-described user gesture is not limited to direct contact of the user's body or a touch inputting means with the first and second displays 190a and 190b, respectively, and may be made in a non-contact method. Sensitivity of the user operation detectable by the first and second displays 190a and 190b, respectively, may be changed according to performance or a configuration of the multi display device 100.

The touch gesture according to an exemplary embodiment of the present general inventive concept includes various types of user gestures that can be sensed by the multi display device 100 by directly contacting a touch screen or approaching the touch screen. For example, the touch gesture may include a user's operation of selecting a single position or a plurality of continuous positions on the touch screen using user's finger of the left and right hands (in particular, an index finger), user's thumb, or an object that can be sensed by the touch screen (for example, a stylus pen).

The touch gesture will be explained in detail with reference to following tables.

TABLE 1

|  | Type | Mark |
|---|---|---|
| Single | Tap |  |
| Finger | Touch & Hold |  |
| Gesture | Double Tap |  |
|  | Drag |  |
|  | Drag & Drop |  |
|  | Flick |  |

Table 1 illustrates various types of gestures that are made using a single finger.

Referring to table 1, the types of gestures made using a single finger may include tap, touch & hold, double tap, drag, drag & drop, and flick, but is not limited thereto. The tap is a user's operation of touching the touch screen slight and then raising the user's finger. The touch & hold is a user's operation of touching the touch screen and keeping touching for a long time. The double tap is a user's operation of tapping twice quickly. The drag is a user's operation of touching and moving in one direction while still touching, and the drag & drop is a user's operation of touching an object on the touch screen and dragging it from one position to the other position. The flick is a user's operation of dragging rapidly.

TABLE 2

|  | Type | Mark |
|---|---|---|
| Two | Two finger Tap |  |
| Finger | Touch & Spread |  |
| Gesture | Pinch Out |  |
|  | Pinch In |  |
|  | Two finger Drag |  |
|  | Cross Two Finger |  |
|  | Touch & Rotate |  |

Table 2 illustrates various types of gestures that are made using two fingers.

Referring to table 2, the types of gestures made using two fingers may include two finger tap, touch & spread, pinch out, pinch in, two finger drag, cross two finger, and touch & rotate, but are not limited thereto. The two finger tap is a user's operation of tapping with two fingers simultaneously, and the touch & spread is a user's operation of pressing the touch screen with two fingers simultaneously and moving only one finger in a straight line without moving the other finger. The pinch out is a user's operation of touching the touch screen with two fingers simultaneously and then moving the two fingers further apart, and the pinch in is a user's operation of touching the touch screen with two fingers simultaneously and then moving the two fingers closer together. The two finger drag is a user's operation of dragging with two fingers in the same direction, and the cross two finger is a user's operation of dragging with two fingers closer together, crossing the two fingers, and then dragging further apart. Finally, the touch & rotate is a user's operation of touching the touch screen with one finger and keeping touching (touch & hold), and touching with the other finger and rotating about fixed one finger while still touching.

TABLE 3

|  | Type | Mark |
|---|---|---|
| Multi | Three finger touch |  |
| Finger | Four finger touch |  |
| Gesture | Five finger touch |  |
| Palm | Palm |  |

Table 3 illustrates various types of gestures that are made using two or more fingers, and a type of gesture that is made using the user's palm.

Referring to table 3, the types of gestures made using two or more fingers may include three finger touch, four finger touch, and five finger touch. Also, gestures such as tap, drag, and rotate may be performed using two or more fingers as illustrated in tables 1 and 2.

When one of the above-described various touch gestures is recognized, the controller 130 performs an operation corresponding to the touch gesture. For example, the controller 130 may execute an application, a widget, or a web browser stored in the storage 170, and may display an execution screen thereof on at least one of the first and second displays 190a and 190b, respectively.

In contrast, the bodies of the multi display device 100 are connected to each other by means of the hinge 185 in the above-described exemplary embodiments, but the bodies may be connected to each other by means of a flexible connector instead of the hinge 185.

Hereinafter, a detailed configuration of the above-described controller 130 will be explained with reference to FIG. 4.

Figure 4:
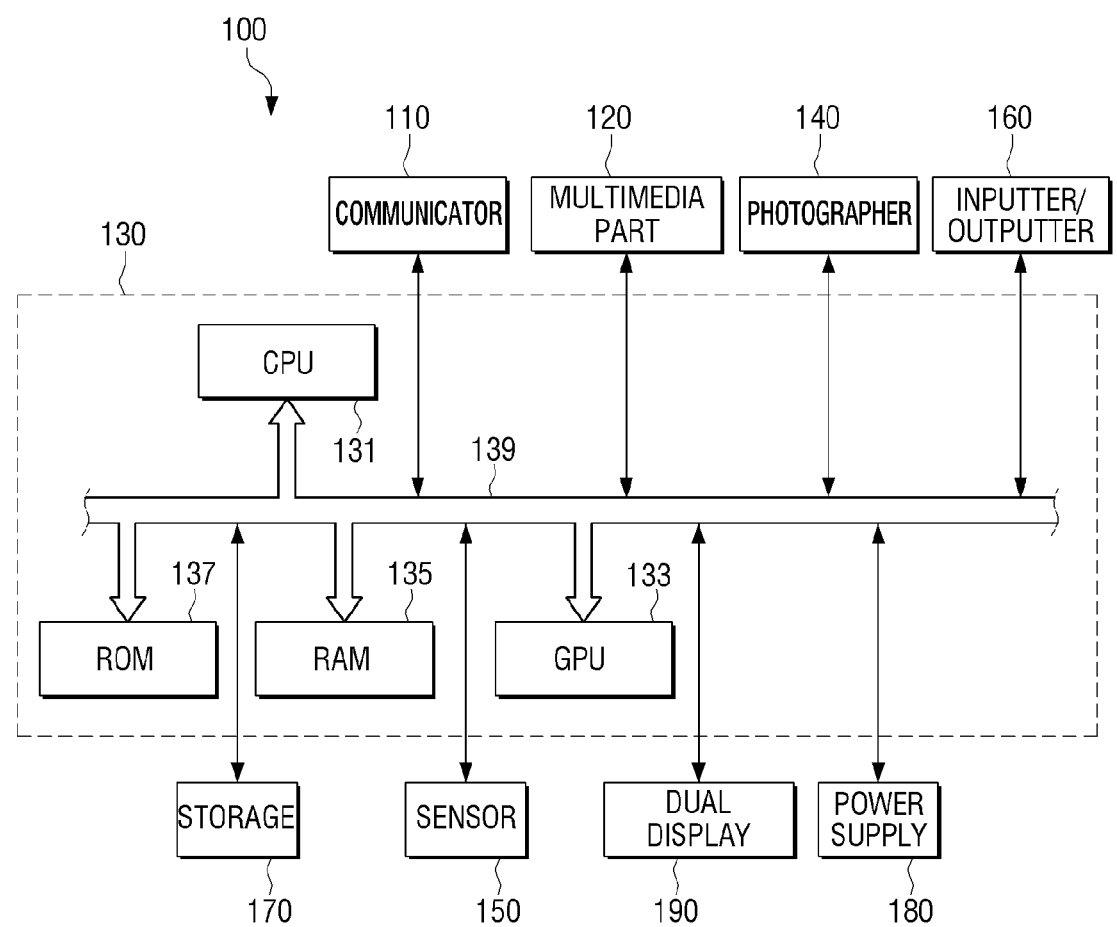
FIG. 4 is a block diagram illustrating a detailed configuration of a controller included in a multi display device according to an exemplary embodiment of the present general inventive concept.

FIG. 4 is a block diagram illustrating a detailed configuration of a multi display device 100 according to various exemplary embodiments of the present general inventive concept.

Referring to FIG. 4, the multi display device 100 includes a communicator 110, a multimedia part 120, a controller 130, a photographer 140, a sensor 150, an inputter/outputter 160, a storage 170, a power supply 180, and a multi display part 190.

The communicator 110 is configured to communicate with an external device according to various communication methods as described above. Since the communicator 110 has been described above in detail, a redundant explanation thereof is omitted.

The multimedia part 120 is configured to reproduce moving image contents, audio contents, or other various multimedia contents. The multimedia part 120 processes a multimedia content using a parser or a codec, and reproduces the content.

The photographer 140 is configured to photograph an image according to user manipulation. A plurality of photographers 140 may be provided in the multi display device 100. For example, a first photographer may be provided in the first body in which the first display 190a is provided, and a second photographer may be provided in the second body 4 in which the second display 190b is provided. The controller 130 may store an image that is photographed by the photographer 140, or may attach the image to a mail, a messenger, or a message and may transmit the image to the outside. Also, the controller 130 may recognize a user's motion gesture by analyzing the image photographed by the photographer 140, and may perform a control operation corresponding to the motion gesture.

The inputter/outputter 160 is an element that performs input/output using a screen or other external connecting ports. Specifically, the inputter/outputter 160 receives an input signal that is transmitted from an inputting means connected to the multi display device 100 such as a mouse, a keyboard, or a joystick, or a wireless inputting means such as a remote controller, and transmits the input signal to the controller 130. Also, the inputter/outputter 160 may output various signals or data that is generated by the controller 130 to an external device.

The sensor 150 is configured to sense various state changes such as a user's touch on the multi display device 100, a user motion, and a motion of the multi display device 100. The sensor 150 will be explained again in detail below.

The power supply 180 is configured to supply power to each element of the multi display device.

The controller 130 controls overall operations of the above components.

The controller 130 includes a central processing unit (CPU) 131, a graphics processing unit (GPU) 133, a random access memory (RAM) 135, a read only memory (ROM) 137, and a system bus 139. The CPU 131 controls not only the internal elements of the controller 130 but also the elements of the multi display device 100.

The CPU 131, the GPU 133, the RAM 135, and the ROM 137 are connected to one another through the system bus 139 and may exchange various data or signals with one another.

The ROM 137 stores a set of commands to boot a system. When a turn on command is input and power is supplied, the CPU 131 copies an OS stored in the storage 170 into the RAM 135 according to a command stored in the ROM 137, executes the OS, and boots the system. When booting is completed, the CPU 131 copies various application programs stored in the storage 170 into the RAM 135, and performs various operations by executing the application programs copied into the RAM 135. As described above, the CPU 131 may perform various operations by executing the application programs stored in the storage 170.

The storage 170 may store information on a toolset that is usable in each application.

When an event to display a toolset is generated, the CPU 131 displays a toolset using the toolset information stored in the storage 170. Specifically, when an event in which a toolset display menu is selected, an event in which a user's body or a stylus pen 4800 approaches or touches, and an event in which the first and second displays 190*a* and 190*b* are unfolded by a predetermined angle by the hinge 185 are generated, the toolset may be displayed.

The GPU 133 may include a decoder, a renderer, and a scaler. Accordingly, the GPU 133 decodes a stored content, renders the decoded content and forms a frame, and scales a size of the formed frame according to a display size under the control of the display controller (not illustrated). If the frame is to be displayed on one of the first and second displays 190*a* and 190*b*, respectively, the frame is scaled according to the size of one display, and, if the frame is to be displayed on both the two displays, the frame is scaled according to the entire display size. The GPU 133 provides the processed frame to the display and displays it.

The controller 130 may further include various types of interfaces for interfacing with surrounding elements.

When a web browser program is executed, the CPU 131 accesses a web server through a network interface (not illustrated). When web page data is received from the web server, the CPU 131 controls the GPU 133 to configure a web page screen and display the configured web page screen on at least one of the above-described first and second displays 190*a* and 190*b*, respectively.

As described above, when a touch and other user manipulation are sensed on the multi display device 100, the controller 130 determines whether the user manipulation is intended. When it is determined that the user manipulation is intended, the controller 130 reads out information on an operation corresponding to the user manipulation from the storage 170, and performs an operation corresponding to the information. The above-described operation of the controller 130 may be implemented by executing various programs stored in the storage 170.

Hereinafter, a software hierarchy diagram of the controller 130 will be explained.

Figure 5:
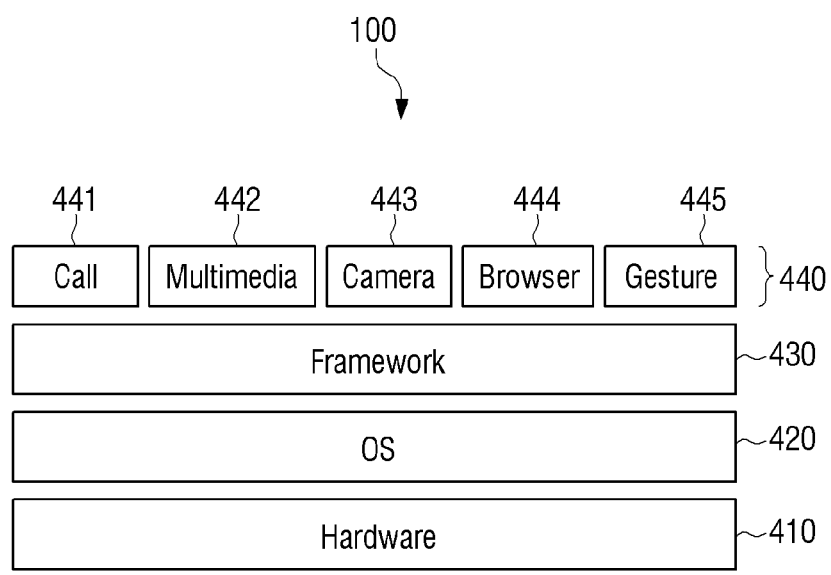
FIG. 5 is a view illustrating a software configuration of a multi display device according to an exemplary embodiment of the present general inventive concept.

FIG. 5 is a view illustrating a system hierarchy of the multi display device 100 according to an exemplary embodiment of the present general inventive concept.

Referring to FIG. 5, the multi display device 100 includes hardware 410, an OS 420 to drive the hardware, an application layer 440 including application layers 441 through 445 that are managed by the OS as processes and provide user services using resources, and a framework layer 430 to intermediate between the OS and the application.

The OS 420 controls an overall operation of the hardware 410 and manages the hardware 410 and a process corresponding to each application. That is, the OS 420 is a layer that manages the hardware and performs a basic function such as memory and security. The OS 420 includes modules such as a display driver to drive a multi display, a communication driver to exchange data, a camera driver to drive a camera, an audio driver to drive an audio unit, and a power supply manager. Also, the OS 420 may include an API library and a runtime that are accessible by a developer. The OS 420 processes a call of an application and operates the hardware according to a result of the processing.

The framework layer 430 exists as an upper layer of the OS 420. The framework 430 connects the application layer 440 and the OS layer 420. That is, the framework layer 430 includes a location manager, a notification manager, and a frame buffer to display an image on a touch screen.

The application layer 440 exists as an upper layer of the framework layer 430 to perform various functions of the multi display device 100. For example, the application layer 440 may include a call application 441, a multimedia application 442, a camera application 443, a browser application 444, and a gesture application 445.

The applications 441 through 445 provide a user interface, and receive a command from the user and transmit the command to the OS 420 through the framework, or request resources of the OS 420. The OS 420 processes a system call and manages tasks of many applications. The OS 420 operates many hardware configurations including the first display 190*a* and the second display 190*b* according to a result of processing the system call.

Hereinafter, a hardware configuration of a display will be explained.

FIG. 6 is a view illustrating a circuit configuration of a display of the first display 190*a* (or alternatively, the second display 190*b* of FIG. 2), according to an exemplary embodiment of the present general inventive concept. Hereinafter, the first display 190*a* will be mainly described, but the second display 190b has the same configuration as that of the first display 190a and thus is operated in the same way.

The display may include the first display 190a and the second display 190b as described above. Also, the display may further include a touch screen.

Referring to FIG. 6, an image output circuit of the first display 190a may include a timing controller 231, a gate driver 232, a data driver 233, a voltage driver 234, and a display panel 235.

The timing controller 231 receives a clock signal (DCLK), a horizontal sync signal (Hsync), and a vertical sync signal (Vsync), which are suitable to correspond to a resolution of the touch screen, from an external source, generates a gate control signal (scan control signal) and a data control signal (data signal), rearranges input R, G, and B data, and provides the R, G, and B data to the data driver 233.

The timing controller 231 may generate a gate shift clock (GSC), a gate output enable (GOE), and a gate start pulse (GSP) regarding the above gate control signal. The GSC is a signal to determine a time at which a thin film transistor (TFT) connected to light emitting elements such as R, G, and B organic light emitting diodes (OLEDs) is turned on and/or off. The GOE is a signal to control output of the gate driver 232, and the GSP is a signal to indicate a first driving line of a screen out of one vertical sync signal.

Also, the timing controller 231 may generate a source sampling clock (SSC), a source output enable (SOE), and a source start pulse (SSP) regarding the data control signal. The SSC is used as a sampling clock to latch data in the data driver 233, and determines an operation frequency of a data drive IC. The SOE transmits the data latched by the SSC to the display panel 235. The SSP is a signal to inform a latch or sampling start of data corresponding to the one horizontal synchronization duration.

The gate driver 232 generates a scan signal and is connected to the display panel 235 through scan lines S1, S2, S3, . . . , Sn). The gate driver 232 applies a gate on/off voltage (Vgh/Vgl), which is provided from the voltage driver 234, to the display panel 235 according to the gate control signal generated by the timing controller 231. The gate on voltage (Vgh) is transmitted to a gate line 1 (GL1) through a gate line N (GLn) in sequence to realize a unit frame image on the display panel 235.

The data driver 233 generates a data signal and is connected to the display panel 235 through data lines (D1, D2, D3, . . . , Dm). The data driver 233 completes scaling and inputs the RGB data of the image frame to the display panel 235 according to the data control signal generated by the timing controller 231. The data driver 233 converts the image data of the RGB, which is provided from the timing controller 231 in series, into data in parallel, converts digital data into an analogue voltage, and provides image data corresponding to one horizontal line to the display panel 235. This process is performed with respect to each horizontal line in sequence.

The voltage driver 234 generates driving voltages and transmits them to the gate driver 232, the data driver 233, and the display panel 235. That is, the voltage driver 234 receives a supply voltage from an external source, that is, an alternating current (AC) voltage of 110V or 220V, and generates a power voltage (VDD) necessary to drive the display panel 235 and provides the power voltage, or provides a grounded voltage (VSS). Also, the voltage driver 234 may generate the gate on voltage (Vgh) and provides it to the gate driver 232. To achieve this, the voltage driver 234 may include a plurality of voltage driving modules (not illustrated) that are individually operated. The plurality of voltage driving modules (not illustrated) may be operated to provide different voltages under the control of the controller 130, and the controller 130 may control the voltage driver 234 such that the plurality of voltage driving modules provide different driving voltages according to pre-set information. For example, the plurality of voltage driving modules may provide different first voltages and a second voltage that is set as default according to pre-set information under the control of the controller 130.

According to an exemplary embodiment of the present general inventive concept, the voltage driver 234 may include a plurality of voltage driving modules corresponding to a plurality of regions into which the display panel 235 is divided. In this case, the controller 130 may control the plurality of voltage driving modules to provide different first voltages, that is, ELVDD voltages according to screen information (or input image information) of the plurality of regions. That is, the controller 130 may control a level of the ELVDD voltage using an image signal that is input to the data driver 233. The screen information may be at least one of brightness and grayscale information of the input image.

The display panel 235 includes a plurality of gate lines (GL1 through GLn) and a plurality of data lines (DL1 through DLn) that intersect to define a pixel region. R, G, and B light emitting elements such as OLEDs may be formed on a pixel region 236 where the gate lines and the data lines intersect. Also, a switching element, that is, a TFT is formed on a certain region of the pixel region 236, specifically, a corner. When such a TFT is turned on, grayscale voltages are provided to the R, G, and B light emitting elements from the data driver 233. At this time, the R, G, and B light emitting elements provide light according to an amount of electricity provided based on the grayscale voltages. That is, if much electricity is provided, the R, G, and B light emitting elements provides a large amount of light.

Figure 7:
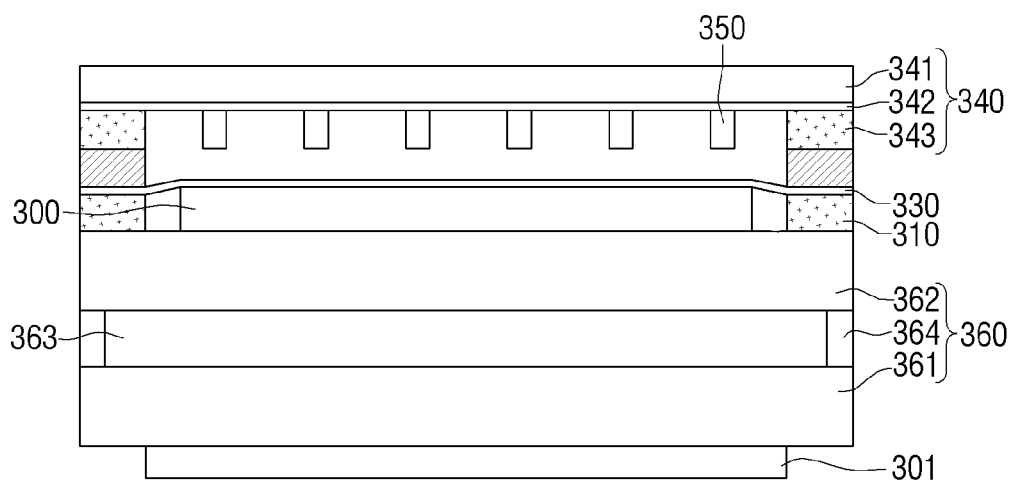
FIG. 7 is a cross section view of a display that is applicable to a multi display device according to an exemplary embodiment of the present general inventive concept.

FIG. 7 is a cross section view of a display according to an exemplary embodiment of the present general inventive concept.

Referring to FIG. 7, the first display 190a includes an image outputter and a touch screen.

The image outputter includes a display panel 360 in which an upper substrate 362 and a lower substrate 361 are formed in close contact with each other, an upper polarizing plate 300 that is formed on the upper substrate 362 of the display panel 360, and a lower electrode 310 that is formed on an edge of the polarizing plate 300. The image outputter further includes a lower polarizing plate 301 that is formed on the lower substrate 361.

A liquid crystal layer 363 may be formed between the upper substrate 362 and the lower substrate 361. The upper substrate 362 and the lower substrate 361 include a display region to display an image and a border region that is formed along an edge of the display region. Although not illustrated, the display region of the lower substrate 361 includes a plurality of gate lines and a plurality of data lines, a thin film transistor that is formed on a region where the plurality of gate lines and the plurality of data lines intersect, and a pixel electrode that is connected to the thin film transistor. A sustain electrode that partially overlaps the pixel electrode may be provided. A plurality of pads may be formed on the border region of the lower substrate 361 to be connected with the gate lines and the data lines.

The upper substrate 362 and the lower substrate 361 may be sealed by a sealing member 364 such as a sealant. The sealing member 364 may be formed along the border region of the upper substrate 362 and the lower substrate 361.

The touch screen includes a lower transparent electrode 330 that is connected to the lower electrode 310 and is formed on the upper polarizing plate 300, a touch pad 340 in which an upper transparent electrode 342 is provided and that is attached to the upper substrate 362, and a protrusion 350 that is provided between the upper transparent electrode 342 and the lower transparent electrode 330.

The touch pad 340 includes a base film 341, the upper transparent electrode 342 that is formed on the base film 341, and an upper electrode 343 that is formed on the upper transparent electrode 342.

When the touch pad 340 is pressed by a predetermined external force, the protrusion 350 of the region to which the force is applied is brought into close contact with the lower transparent electrode 330, and accordingly, the lower transparent electrode 330 and the upper transparent electrode 342 are electrically connected to each other. The currents flowing in the upper transparent electrode 342 and/or the lower transparent electrode 330 are changed by the electrical connection, and this change is sensed by a separate sensing means (not illustrated). The sensing means transmits a sensed signal to the controller 130, which is separately provided. The controller 130 generates coordinates of the region in which the flow of the currents is changed using the sensed signal, and transmits the coordinates to a predetermined driver (not illustrated). The driver may perform the same operation as manipulating an image displayed on the display panel 360 using an input tool such as a mouse in response to the input coordinates.

In contrast, the multi display device 100 may include an image frame buffer having various configurations due to its specific characteristics. Hereinafter, the image frame having various potential configurations will be described.

Figure 8:
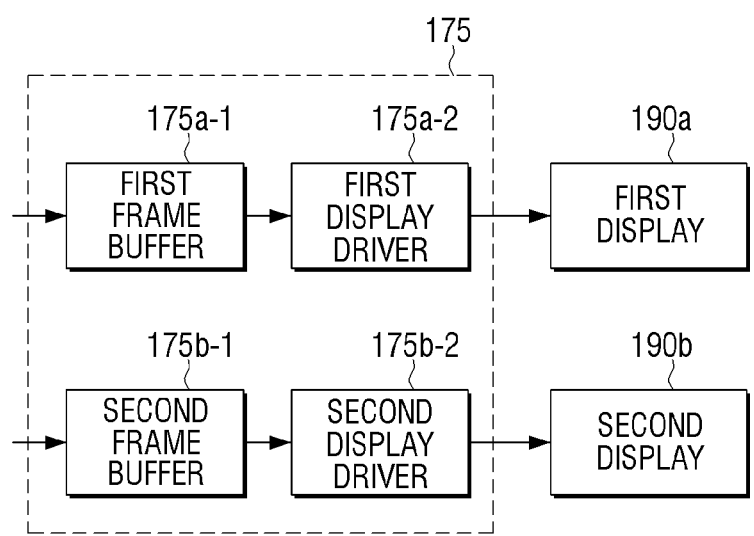
FIGS. 8 and 9 are block diagrams illustrating various configurations of an LCD controller that controls two displays of a multi display device according to an exemplary embodiment of the present general inventive concept.
Figure 9:
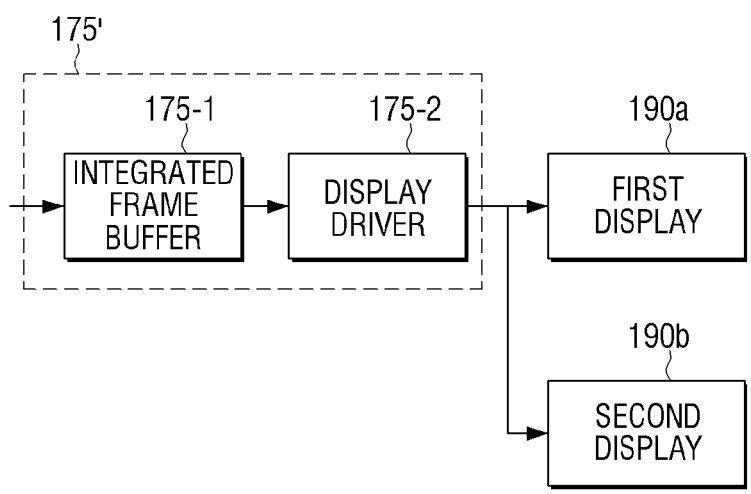

FIG. 8 is a block diagram illustrating a display driver 175 of a multi display device 100 according to an exemplary embodiment of the present general inventive concept, and FIG. 9 is a block diagram illustrating a display driver 175' according to another exemplary embodiment of the present general inventive concept.

Referring to FIG. 8, the display driver 175 includes a first frame buffer 175a-1, a first display driver 175a-2, a second frame buffer 175b-1, and a second display driver 175b-2. That is, the first and second displays 190a and 190b, respectively, may include respective frame buffers 175a-1 and 175b-1 and respective display drivers 175a-2 and 175b-2.

The first frame buffer 175a-1 is configured to buffer an image frame to be displayed on the first display 190a, and the second frame buffer 175b-1 is configured to buffer an image frame to be displayed on the second display 190b.

For example, an image frame that has been digital signal processed by the GPU 133 may be stored in the first and second frame buffers 175a-1 and 175b-1 in a bitmap format. In this case, a buffering region of each of the frame buffers 175a-1 and 175b-1 is assigned according to a maximum pixel size supportable by each of the first and second displays 190a and 190b, respectively. The first display driver 175a-2 analyzes the image frame stored in the first frame buffer 175a-1 and converts the image frame into a first image source signal. The first display driver 175a-2 provides the first image source signal to the first display 190a and drives the first display 190a to display the image frame.

Likewise, the second display driver 175b-2 analyzes the image frame stored in the second frame buffer 175b-1, converts the image frame into a second image source signal, provides the second image source signal to the second display 190b, and displays the image frame.

Such two frame buffers may be suitable to process the image frame corresponding to each of the first and second displays 190a and 190b, respectively, in parallel. When a parallel processor outputs an image signal corresponding to each of the displays 190a and 190b, respectively, image output efficiency can be improved.

However, the first and second displays 190a and 190b, respectively, may use a single integrated frame buffer 175-1 rather than using the first frame buffer 175a-1 and the second frame buffer 175b-1 provided separately, as illustrated in FIG. 9.

FIG. 9 is a block diagram illustrating a configuration of the multi display device 100 that controls operations of the first and second displays 190a and 190b, respectively, using the integrated frame buffer 175-1. When the frame buffer is implemented by using the integrated frame buffer 175-1, the integrated frame buffer 175-1 may be assigned a size larger than a maximum resolution of the first and second displays 190a and 190b.

For example, when each of the first and second displays 190a and 190b, respectively, displays at a maximum resolution of 1024*800, the integrated frame buffer 175-1 may be assigned a storage region corresponding to a frame buffer size capable of displaying a resolution of 1024*1600. A first region of the integrated frame buffer 175-1 stores a first image frame to be displayed on the first display 190a, and a second region stores a second image frame to be displayed on the second display 190b.

A display driver 175-2 provides the first or second image frame to the first display 190a or the second display 190b using addresses of the first image frame and the second image frame stored in the integrated frame buffer 175-1, and drives each of the first and second displays 190a and 190b.

As described above, the sensor 150 of the multi display device 100 may include the proximity sensor 155. Hereinafter, a configuration and an operation of the proximity sensor 155 will be explained.

Figure 10:
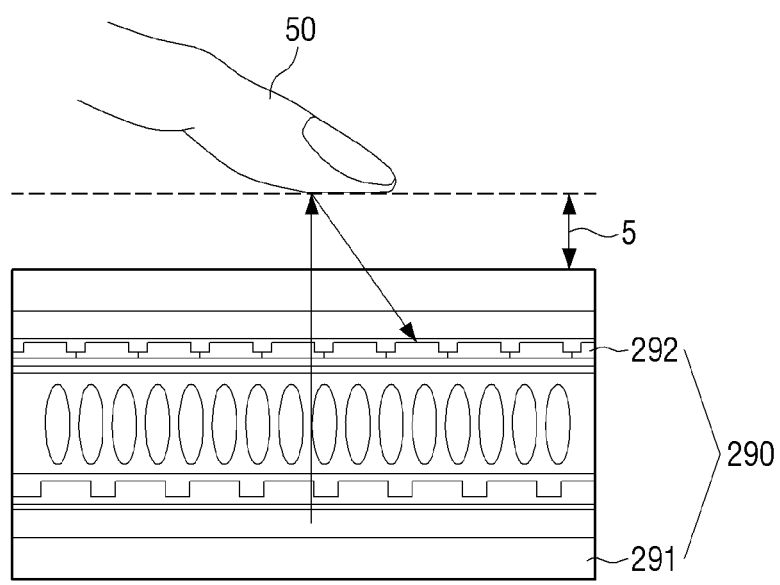
FIG. 10 is a view illustrating an example of a method of sensing hovering according to an exemplary embodiment of the present general inventive concept.

FIG. 10 is a view illustrating an example of a method of sensing hovering according to an exemplary embodiment of the present general inventive concept.

The user may input a control command to the multi display device 100 only by moving his/her finger or other user objects close to a touch screen without directly touching the touch screen. In this case, the multi display device 100 may sense hovering using the proximity sensor 155. The hovering may be recognized as a single touch gesture when the user does not directly touch the touch screen and a motion is recognized within a predetermined effective recognition range on space.

Referring to FIG. 10, a display 290 includes an infrared ray (IR) source 291 and an IR sensor 292 to recognize hovering.

The IR source 291 emits infrared rays to a surface of the display 290. Specifically, the IR source 291 is disposed on the lower portion of the display 290 that displays an image, and emits infrared rays to the surface of the display 290. There may be a predetermined region in which the approach of a user object 50 is recognized on the surface of the display 290. This region is an effective recognition region 5 in which hovering is recognized.

The user object refers to a means to input a command to the multi display device 100, and may be a part of the user's body, such as a hand or finger.

When the user object 50 approaches the effective recognition region 5, the IR sensor 292 senses infrared rays reflected from the approaching user object 50, and generates an IR scan image. Specifically, the IR sensor 292 may generate the IR scan image corresponding to the infrared rays reflected from the approaching user object 50 using a plurality of IR sensing elements, which are arranged in an array form. The multi display device 100 may sense hovering input using the generated IR scan image.

As will be explained below, it may be necessary to distinguish between hovering of an input pen 500 and hovering of other objects besides the input pen 500.

Figure 11:
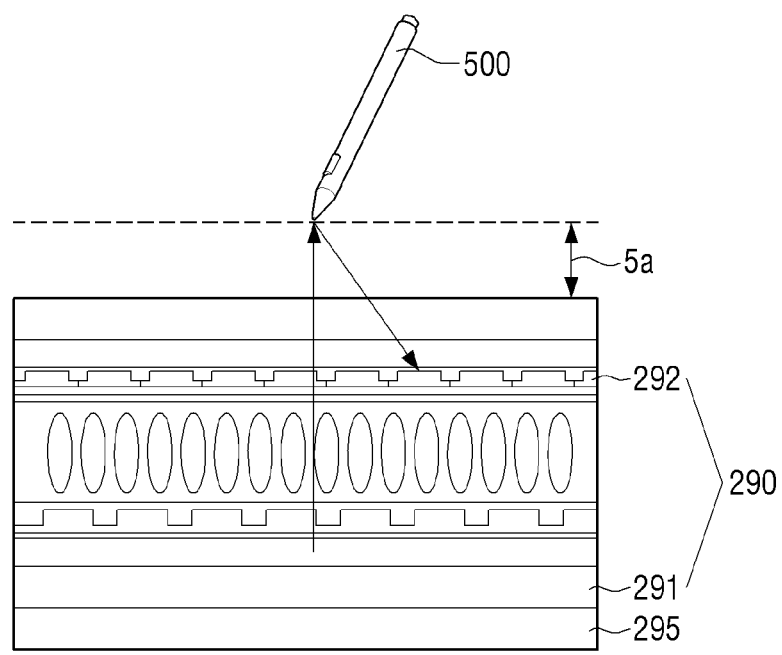
FIG. 11 is a view illustrating an example of a method of sensing hovering of an input pen according to an exemplary embodiment of the present general inventive concept.

FIG. 11 is a view illustrating an example of a method of sensing hovering using an input pen 500 according to an exemplary embodiment of the present general inventive concept.

As will be explained below, the input pen 500 may include a magnetic field coil therein. The multi display device 100 may further include a magnetic field sensor 295 to sense a change in the magnetic field according to proximity of the magnetic field coil to a display 290, which includes an infrared ray (IR) source 291 and an IR sensor 292 to recognize hovering of the input pen 500. Since a point over which the input pen 500 hovers has its magnetic field changed due to the magnetic field coil of the input pen 500, the magnetic field sensor 295 may sense hovering of the input pen 500 at a corresponding point. There may be a predetermined region in which the approach of the input pen 500 is recognized by a surface of the display 290. This region is an effective recognition region 5a in which hovering of the input pen 500 is recognized. At this time, the proximity sensor 155 of FIG. 3 also senses the hovering, but, when both the proximity sensor 155 and the magnetic field sensor 295 sense hovering of the user object, the result of sensing by the proximity sensor 155 is disregarded. Accordingly, when the magnetic field sensor 295 senses the hovering of the input pen 500, the multi display device 100 is regarded as being in a pen input mode and displays a corresponding menu item or screen.

In contrast, when the magnetic field sensor 295 does not sense the hovering of the input pen 500, but the proximity sensor 155 senses hovering, it may be determined that a user object other than the input pen 500 including the magnetic field coil (not illustrated) approaches the multi display device 100. In this case, the controller 130 may be operated in a keyboard input mode to display a soft keyboard on at least one of the first display 190a and the second display 190b.

Hereinafter, an exterior of the multi display device 100 according to an exemplary embodiment of the present general inventive concept will be explained with reference to the accompanying perspective view.

Figure 12:
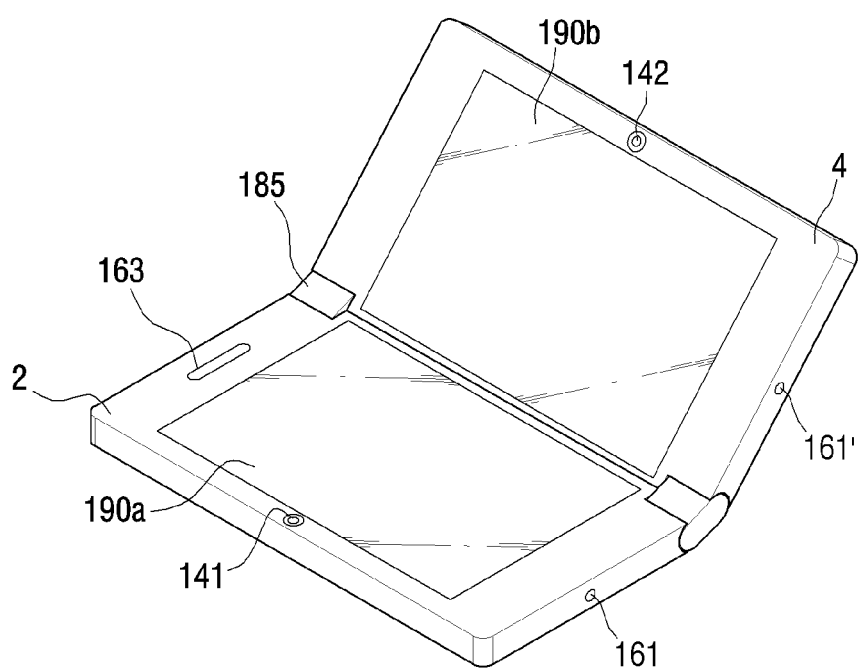
FIG. 12 is a detailed perspective view of a multi display device according to an exemplary embodiment of the present general inventive concept.

FIG. 12 is a perspective view illustrating the multi display device 100 in detail according to an exemplary embodiment of the present general inventive concept. In FIG. 12, the multi display device 100 includes the first and second displays 190a and 190b, respectively, which are connected to each other by means of a hinge 185.

Referring to FIG. 12, the multi display device 100 includes first and second bodies 2 and 4, respectively, which are connected to each other by the hinge 185 and are movable relative to each other. The first display 190a may be provided on one surface of the first body 2, and at least one physical button 161 may be provided on one side surface of the first display 190a. The second display 190b may be provided on one surface of the second body 4, and at least one physical button 161' may be provided on one side surface of the second display 190b. The physical buttons 161 and 161' include at least one of a push button and a touch button. In an exemplary embodiment of the present general inventive concept, the first display 190a that is provided on the first body 2 including a speaker (not illustrated) and a microphone (not illustrated) is operated as a main screen, and the second display 190b that is provided on the second body 4 that does not include such a member may be operated as a sub screen. In an exemplary embodiment of the present general inventive concept, the first body 2 includes a first camera 141 and the second body 4 includes a second camera 142.

When the multi display device 100 is placed as illustrated in FIG. 12, the first and second displays 190a and 190b, respectively, display screens in a landscape mode.

When the multi display device 100 is configured to have the first body 2 and the second body 4 connected to each other by means of the hinge 185 and move relative to each other, the multi display device 100 may be any device like a mobile phone, a laptop computer, a tablet PC, and a portable multimedia player (PMP). Although the first display 190a and the second display 190b are provided on the first body 2 and the second body 4, respectively, the following explanation may also be applied to a device in which a touch screen display is provided on only one of the two panels. Also, at least one of function buttons 161 on the side surfaces of the first and second displays 190a and 190b, respectively, may be omitted. Furthermore, although the first body 2 and the second body 4 are connected to each other by means of the hinge 185, they may be connected to each other by means of other elements only if the first body 2 and the second body 4 can be folded in relative to each other.

As illustrated in FIG. 12, the hinge 185 may include two hinges that are formed at opposite edges of a connection portion between the first body 2 and the second body 4. Also, the hinge 185 may be a single hinge that is disposed on the entire connection portion between the first body 2 and the second body 4.

The multi display device 100 includes a display device that includes the first display 190a and the second display 190b that are physically or graphically separated from each other, and may support various screen modes as illustrated in FIGS. 13 through 17 using the first and second displays 190a and 190b, respectively.

FIGS. 13 through 17 are views illustrating screen modes according to a relative angle between the first body 2 and the second body 4 of the multi display device 100 according to an exemplary embodiment of the present general inventive concept.

A relative angle ($\theta$) is a rotation angle of the second body 4 that is rotated with reference to the first body 2 in a predetermined direction (for example, a counter clockwise direction).

Specifically, the relative angle ($\theta$) may be detected using a hinge sensor that is embedded within the hinge 185. The hinge sensor may include at least one of a hall sensor, a pressure sensor, an inductive sensor, an electric content sensor, and an optical sensor, but is not limited thereto, and may recognize the relative angle ($\theta$) by detecting a movement and a relative location of the hinge. Also, the relative angle ($\theta$) may be recognized by the geomagnetic sensor or the acceleration sensor 153 detecting locations of the first and second bodies 2 and 4.

Figure 13:
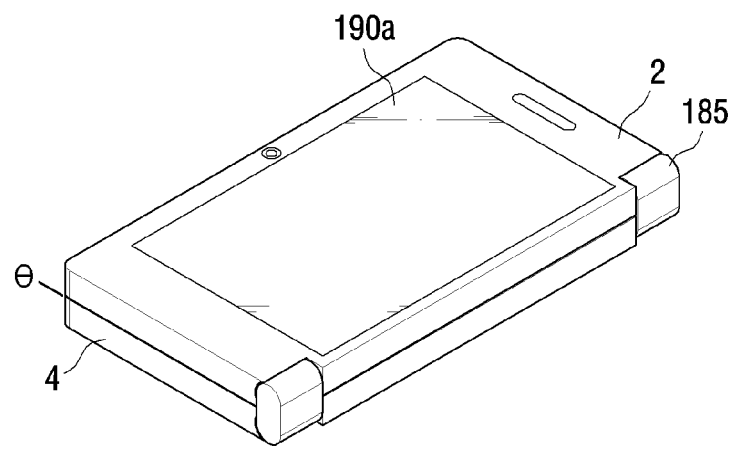
FIGS. 13 through 17 are views illustrating screen modes according to a relative angle between a first body and a second body of a multi display device according to an exemplary embodiment of the present general inventive concept.

FIG. 13 is a perspective view illustrating the multi display device 100 when it is folded with reference to the hinge 185. As illustrated in FIG. 13, the first body 2 and the second body 4 are in contact with each other with the first and second displays 190a and 190b, respectively, on the first body 2 and the second body 4 facing in the opposite direction. That is, the first body 2 and the second body 4 are completely folded out in the opposite direction. This state may be called a single mode. At this time, the relative angle ($\theta$) is 0°. For example, when the relative angle between the first and second bodies 2 and 4 is between 0° and 60°, the multi display device is recognized as being in the single mode. The single mode may be usefully used when the multi display device 100 is not in use and is in a locked state or may be used in a call application. In the single mode, the first display 190a on a front surface displays a task screen of at least one application, and the second display 190b on a rear surface may be turned off.

Some applications may turn on the second display 190b on the rear surface using an option menu.

Figure 14:
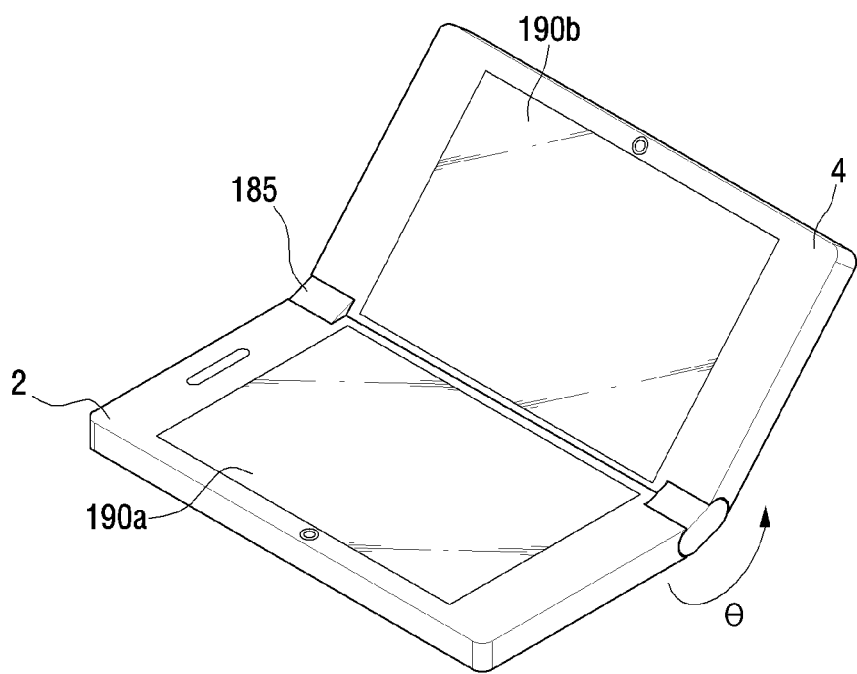

FIG. 14 illustrates the first body 2 and the second body 4 when they are parallel to each other, that is, are unfolded. In this state, the relative angle (θ) is 180° or approaches 180° within a predetermined range. This state will be referred to as an expanding mode. For example, when the relative angle between the first and second bodies 2 and 4 ranges from 175° to 185°, the multi display device 100 determines that the first and second bodies 2 and 4 are unfolded. In the expanding mode, two task screens of two applications may be displayed on the first and second displays 190a and 190b, respectively, or two task screens of one application may be displayed on the first and second displays 190a and 190b, respectively. Also, one task screen of one application may be may be broadly displayed over the first and second displays 190a and 190b, respectively. In this manner, various view modes may be provided. When there is no application being executed on one of the first and second displays 190a and 190b, the at least one of the first and second displays 190a and 190b may display a home screen. The expanding mode may be usefully used in an E-book and a moving image player application.

Figure 15:
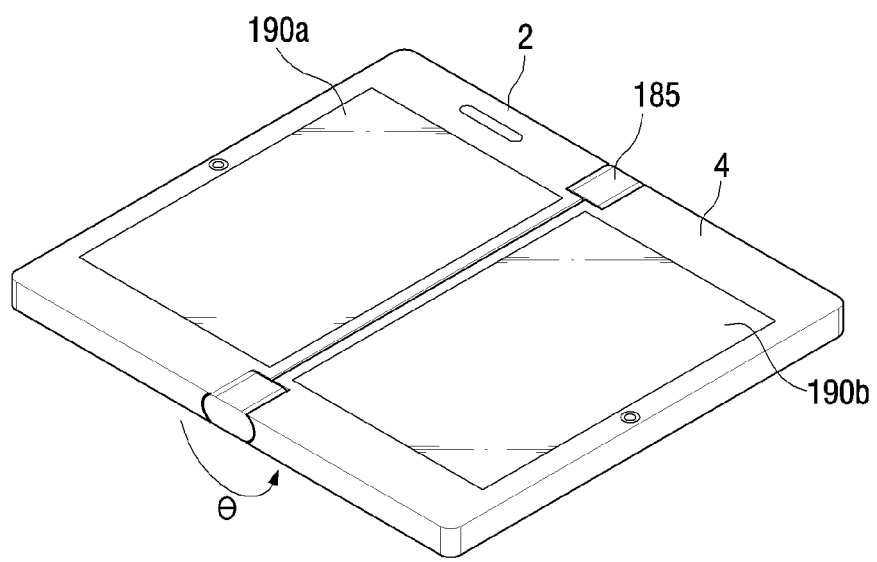

FIG. 15 illustrates the relative angle (θ) of the second body 4 to the first body 2 exceeding 180°, that is, illustrates the first and second displays 190a and 190b, respectively, which are slightly folded inward towards each other. In the following descriptions, this state will be referred to as a tool kit mode. For example, when the relative angle between the first and second bodies 2 and 4 is between 185° and 265°, the tool kit mode is recognized. The tool kit mode refers to a state in which the first and second displays 190a and 190b, respectively, are slightly folded inwards towards each other and may be useful when the multi display device 100 is used like a laptop computer. For example, a task screen may be displayed on one display 190a, whereas various task environments such as a tool of a keyboard may be provided on the other display 190b.

Figure 16:
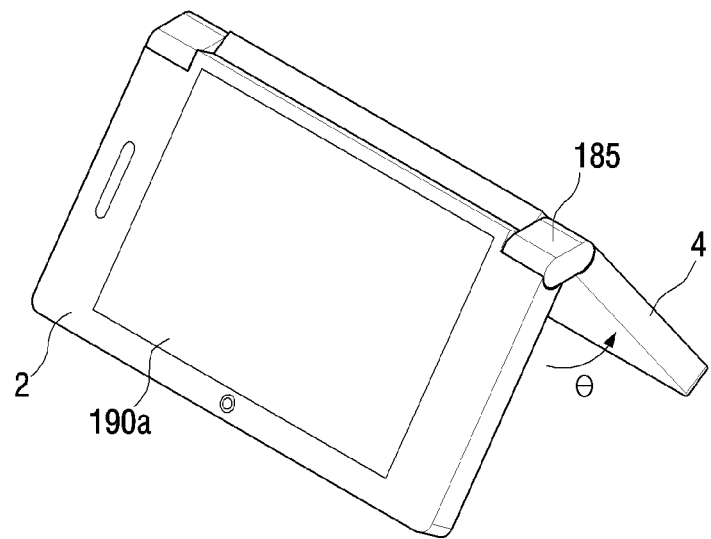

FIG. 16 illustrates a state in which the relative angle (θ) of the second body 4 to the first body 2 is less than 180°, that is, the first and second displays 190a and 190b, respectively, are almost folded out to face each other in the opposite direction. This state is called a standing mode. For example, the relative angle between the first and second bodies 2 and 4 is between 30° and 90°. In the following descriptions, this state will be referred to as a standing mode. In the standing mode, the first and second displays 190a and 190b, respectively, are folded out to face outwardly and the multi display device 100 may be placed on a bottom in a triangular shape. The standing mode is useful when the multi display device 100 is charged or used as a digital clock or album, or when the user views a private broadcast, movie, and moving image for a long time. According to another exemplary embodiment of the present general inventive concept, the standing mode may be applied to an application that requires collaboration of two or more uses or interaction, for example, a video conference or a collaborative game. Some application may display a task screen only on the first display 190a of the front surface and may turn off the second display 190b of the rear surface in the standing mode. Some application may turn on the second display 190b on the rear surface using an option menu.

Figure 17:
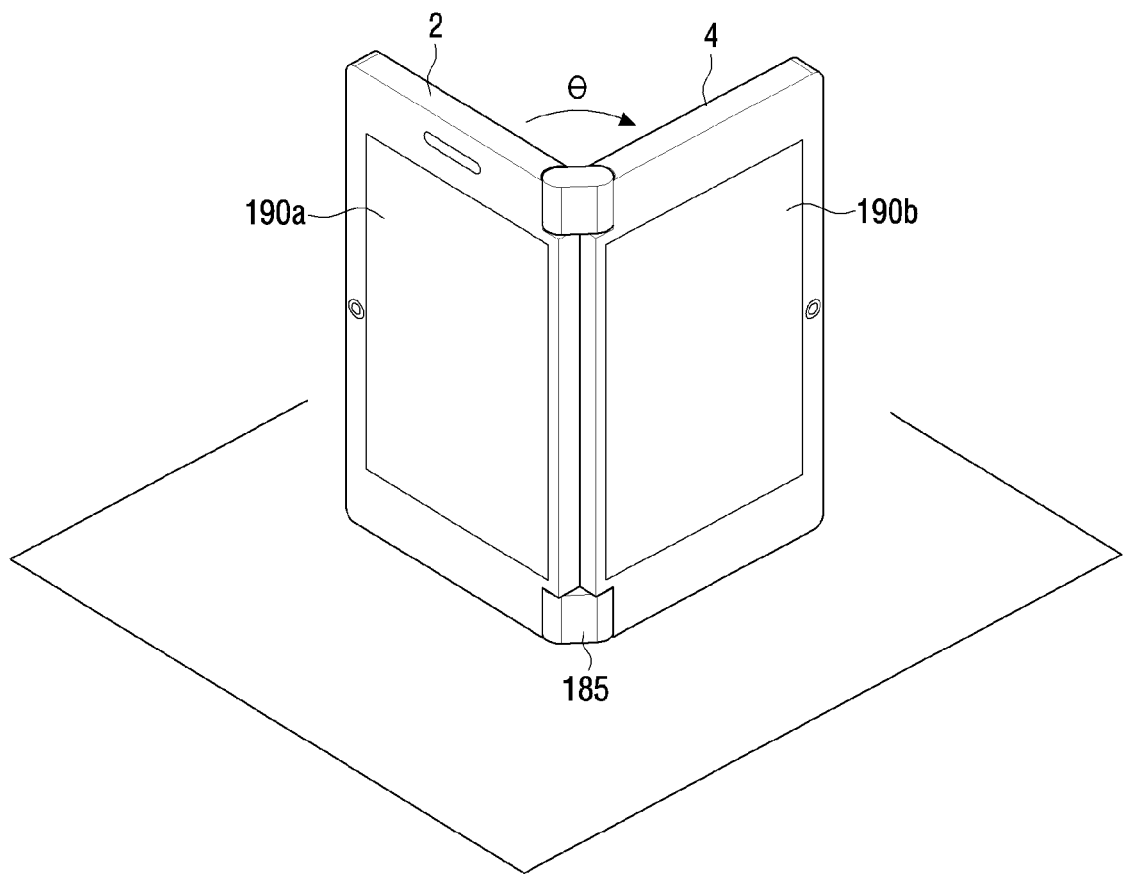

FIG. 17 illustrates another exemplary embodiment of the present general inventive concept of the standing mode of FIG. 16, and illustrates the multi display device 100 that is placed upright such that a part of the hinge 185 is in contact with a bottom. This state may be referred to as a portrait view mode. In the portrait view mode, the relative angle between the first and second bodies 2 and 4 is between 30° and 90°, and, when it is determined that the multi display device 100 is placed upright by means of the acceleration sensor 153, the portrait view mode is recognized.

Specifically, the acceleration sensor 153 senses a rotation of the multi display device 100. The acceleration sensor 153 senses a switch between the portrait view mode in which the first and second displays 190a and 190b, respectively, of the multi display device 100 are placed on the left and right sides, and a landscape view mode in which the first and second displays 190a and 190b, respectively, are placed on the upper and lower sides.

The portrait view mode may be applied to an application that has to provide different images to two or more users, for example, a video conference or a multi moving image player.

Figure 18:
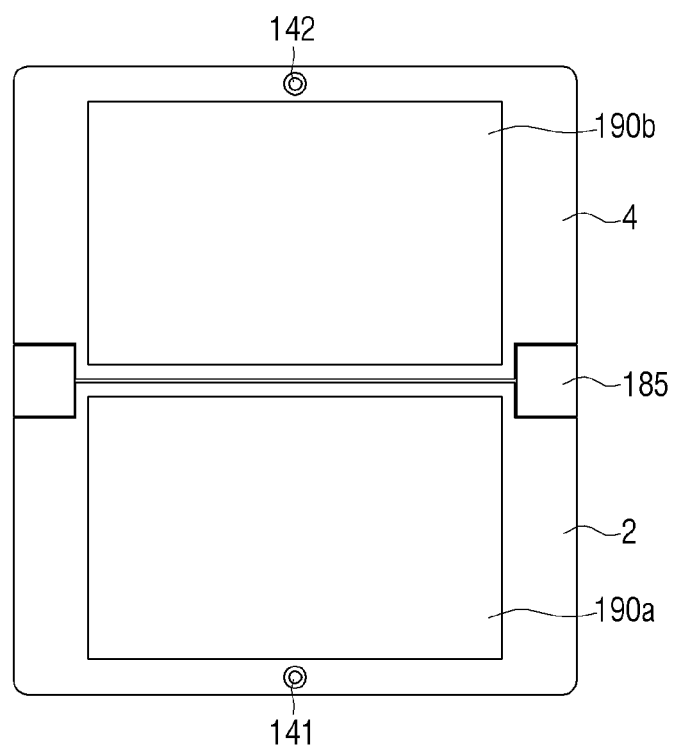
FIGS. 18 and 19 are views illustrating an example of placement of a camera of a multi display device according to an exemplary embodiment of the present general inventive concept.
Figure 19:
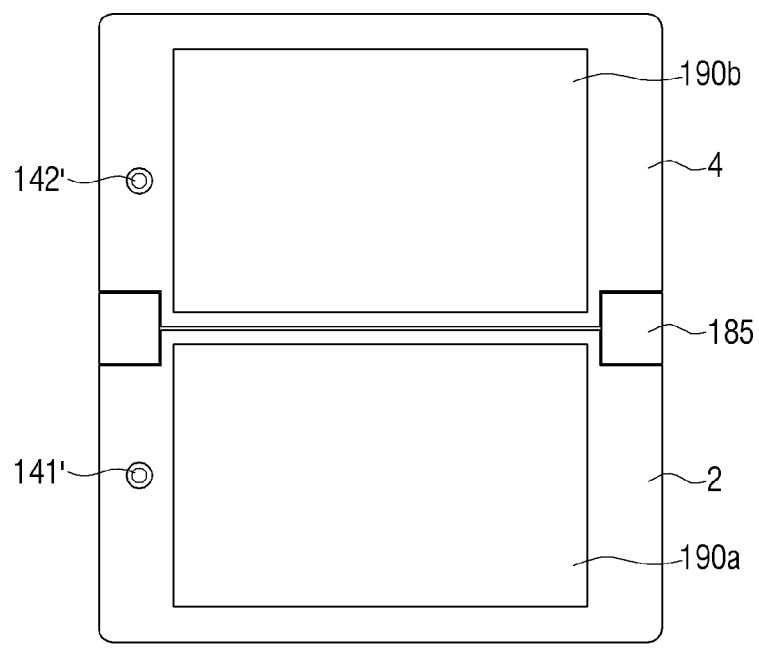

FIGS. 18 and 19 are views illustrating placements of two cameras of the multi display device 100 according to an exemplary embodiment of the present general inventive concept. FIGS. 18 and 19 illustrate the multi display device 100 viewed from the front. FIGS. 18 and 19 are illustrating the placement of the cameras and thus omit components other than the cameras.

Referring to FIG. 18, the multi display device 100 includes the first body 2 and the second body 4, and the first body 2 includes the first display 190a and the second body 4 includes the second display 190b. The first body 2 and the second body 4 are connected to each other by means of the hinge 185 and are movable relative to each other. A first camera 141 may be placed on a center of a border region opposite the hinge 185 from among border regions of the first body 2. A second camera 142 may be placed on a center of a border region opposite the hinge 185 from among border regions of the second body 4.

Placement of the cameras will be explained with reference to FIG. 19. Explanations are made with reference to a direction in which the user faces the multi display device 100 for the sake of easy understanding. A first camera 141' may be placed on a center surface of a left border region of the first body 2, and a second camera 142' may be placed on a center surface of a left border region of the second body 4. In another exemplary embodiment, the first and second cameras may be placed on center surfaces of right border regions of the first and second bodies 2 and 4, respectively. In still another exemplary embodiment of the present general inventive concept, the first and second cameras may be placed on corner regions, or any other regions for that matter, of the first and second bodies 2 and 4, respectively. The multi display device 100 may be used in the horizontal direction as described above, and may be displayed in a vertical direction.

The user performs a variety of input through the above-described multi display device 100, and the multi display device 100 performs output corresponding to the input.

Figure 20:
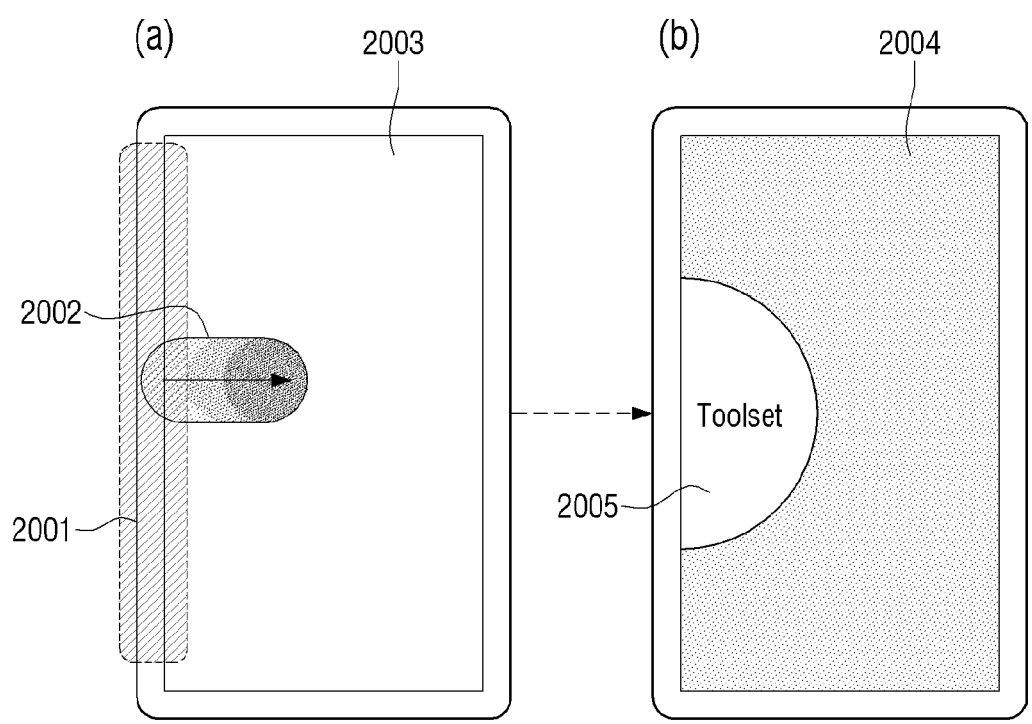
FIGS. 20 and 21 are views illustrating activating a toolset according to an exemplary embodiment of the present general inventive concept.
Figure 21:
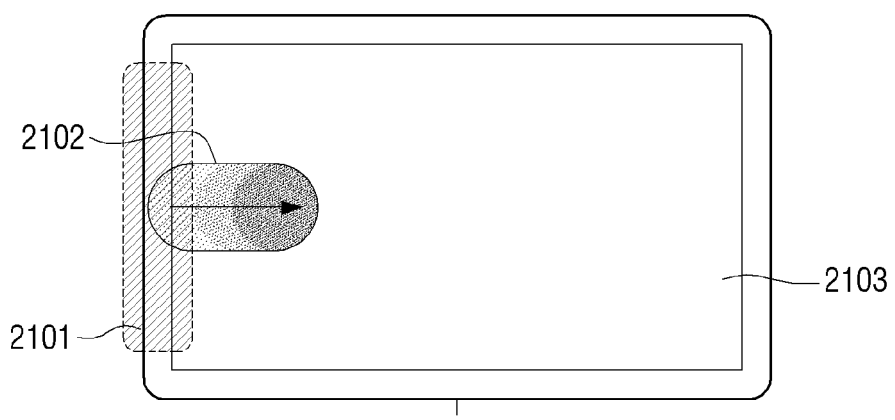
Figure 21:
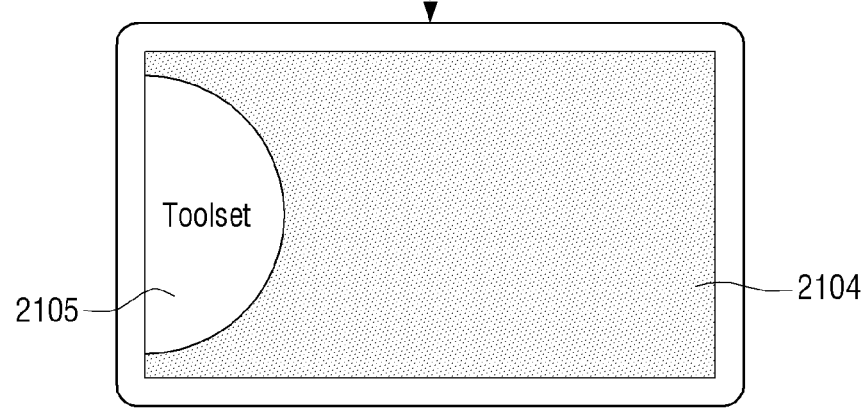

FIGS. 20 and 21 are views illustrating activating a toolset according to an exemplary embodiment of the present general inventive concept.

FIG. 20 illustrates an operation of activating a toolset when the multi display device 100 is utilized in a vertical direction. View (a) of FIG. 20 illustrates an initial state of a display 2003, and view (b) of FIG. 20 illustrates a state in which a toolset 2005 is activated. Specifically, when a drag gesture 2002 moving from a hinge region 2001 to the display 2003 in order to display the toolset 2005 is sensed, the toolset 2005 is displayed as illustrated in view (b) of FIG. 20. In response to the drag gesture 2002, the multi display device 100 displays the toolset 2005 as a toolset UI of a semi-circular shape in a direction of dragging from the hinge region 2001 to the display 2003. Accordingly, as illustrated in view (b) of FIG. 20, a screen of the dragged display 2003 is dimmed (2004).

FIG. 20 illustrates the toolset activating operation when the multi display device 100 is utilized in the vertical direction. Hereinafter, an operation of activating a toolset when the multi display device 100 is utilized in a horizontal direction will be explained with reference to FIG. 21.

View (a) of FIG. 21 illustrates an initial state of a display 2103, and view (b) of FIG. 21 illustrates a state in which a toolset 2105 is activated. Specifically, when a drag gesture 2102 moving from a shortcut region 2101 of a bezel toward the display 2103 to display the toolset 2105 is sensed, the toolset is displayed as illustrated in view (b) of FIG. 21. In response to the drag gesture 2102, the multi display device 100 displays the toolset 2105 having a toolset UI of a semi-circular shape in a direction of dragging from the shortcut region 2101 of the bezel to the display 2103. At this time, a screen of the dragged display 2103 is dimmed (2104).

Although the toolset 2105 is activated on the shortcut region 2101 of the bezel in FIG. 21, the toolset 2105 may be activated on the hinge region 2001 as illustrated in FIG. 20 even when the multi display device 100 is utilized in the horizontal direction.

Also, even when the multi display device 100 is utilized in the vertical direction as illustrated in FIG. 20, the toolset 2005 may be activated on the shortcut region 2101 of the bezel as illustrated in FIG. 21.

Figure 22:
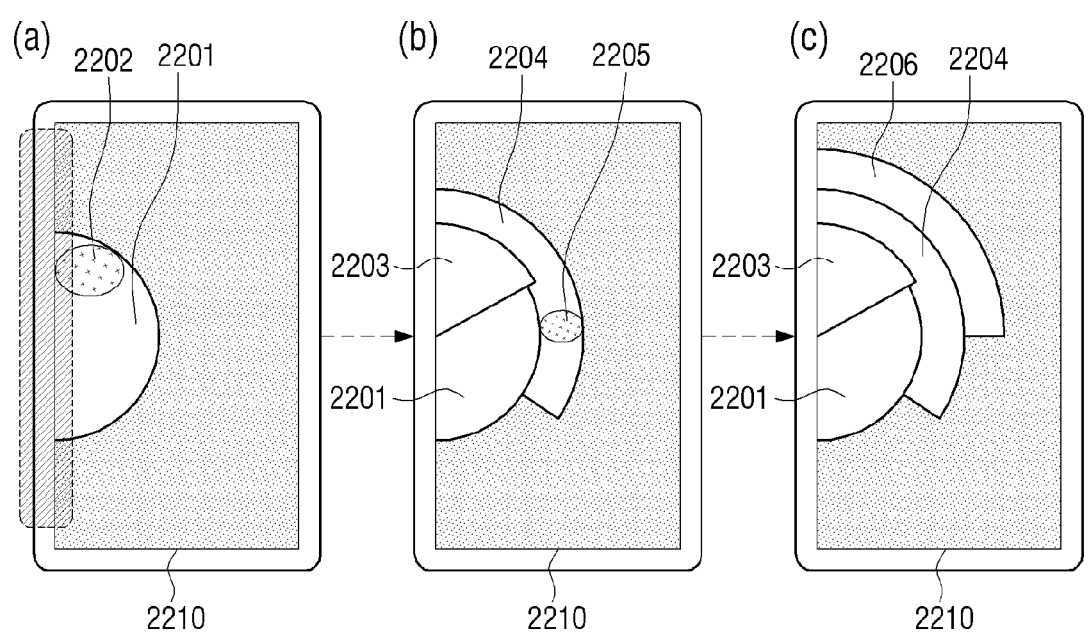
FIGS. 22 and 23 are views illustrating activating a lower level toolset according to an exemplary embodiment of the present general inventive concept.

FIGS. 22 and 23 are views illustrating activating a lower level toolset according to an exemplary embodiment of the present general inventive concept.

FIGS. 22 and 23 are views illustrating activating a lower level toolset when the multi display device 100 is utilized in the vertical direction and in the horizontal direction, respectively.

Referring to view (a) of FIG. 22 and view (a) of FIG. 23, a first toolset 2201 or 2301, respectively, which is an uppermost level toolset, is displayed on a display 2210 or 2310, respectively, by a user's toolset activating operation. When a certain tool is selected from the first toolset 2201 or 2301 and a tap gesture 2202 or 2302, respectively, is sensed on the selected tool, the multi display device 100 progresses to view (b) of FIG. 22 and view (b) of FIG. 23. Referring to view (b) of FIG. 22 and view (b) of FIG. 23, in response to the tap gesture 2202 or 2302, respectively, the multi display device 100 separates the tool selected from the first toolset from the semi-circle of the first toolset, slightly extends the tool, and displays the tool (2203 or 2303), and activates a second toolset 2204 or 2304, respectively, which is a lower level toolset of the selected tool and displays the second toolset 2204 or 2304 on the display 2210 or 2310, respectively. When a certain tool is selected from the second toolset 2204 or 2304, respectively, and a tap gesture 2205 or 2305, respectively, is sensed on the selected tool, the multi display device 100 progresses to a screen of view (c) of FIG. 22 or view (c) of FIG. 23, respectively. Referring to view (c) of FIG. 22 and view (c) of FIG. 23, the multi display device 100 activates a third toolset 2206 or 2306, respectively, which is a lower level toolset of the selected tool and displays the third toolset 2206 or 2306 on the display 2210 or 2310, respectively, in response to the tap gesture.

Figure 24:
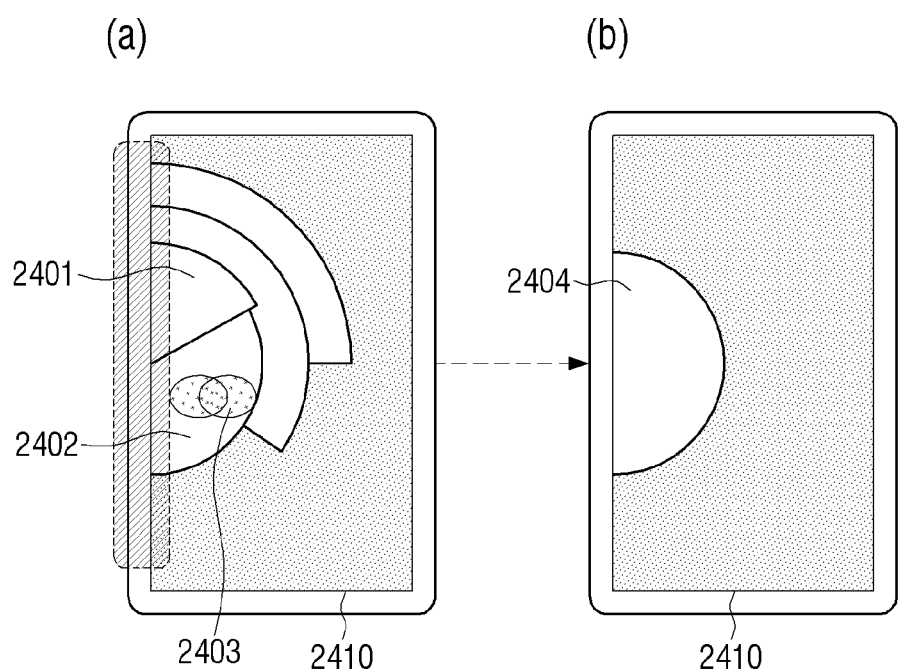
FIGS. 24 and 25 are views illustrating ending a lower level toolset according to an exemplary embodiment of the present general inventive concept.
Figure 25:
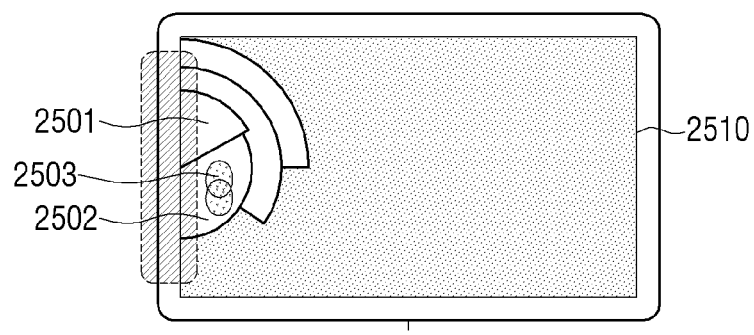
Figure 25:
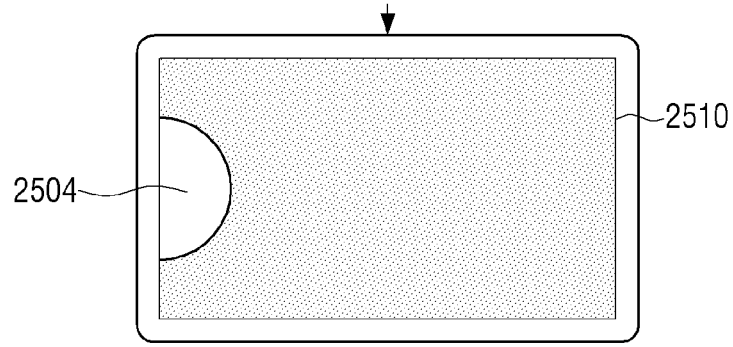

FIGS. 24 and 25 are views illustrating ending a lower level toolset according to an exemplary embodiment of the present general inventive concept.

FIGS. 24 and 25 illustrate operation of making a lower level toolset disappear when the multi display device 100 is utilized in the vertical direction and in the horizontal direction, respectively.

Referring to view (a) of FIG. 24 and view (a) of FIG. 25, a first toolset, a second toolset, and a third toolset are displayed on a display 2410 or 2510, respectively, by extending lower level toolsets. When a double tap gesture 2403 or 2503 is sensed on a margin 2402 or 2502 of the first toolset that is not within an activated tool region 2401 or 2501 of the first toolset, the multi display device 100 progresses to view (b) of FIG. 24 and view (b) of FIG. 25, respectively. Referring to view (b) of FIG. 24 and view (b) of FIG. 25, in response to the double tap gesture, the multi display device 100 makes the second toolset and the third toolset, which are lower level toolsets, and the activated tool region of the first toolset disappear from the display 2410 or 2510, respectively. Accordingly, only the first toolset 2404 or 2504 is displayed on the display 2410 or 2510, respectively.

Figure 26:
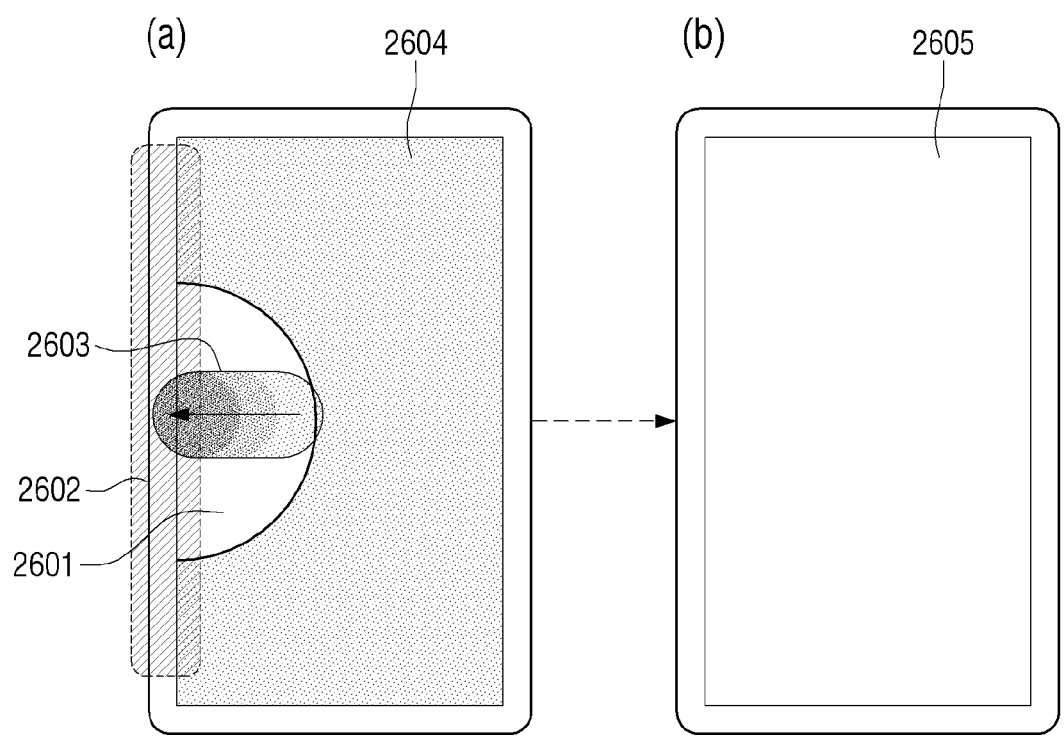
FIGS. 26 and 27 are views illustrating ending a toolset according to an exemplary embodiment of the present general inventive concept.
Figure 27:
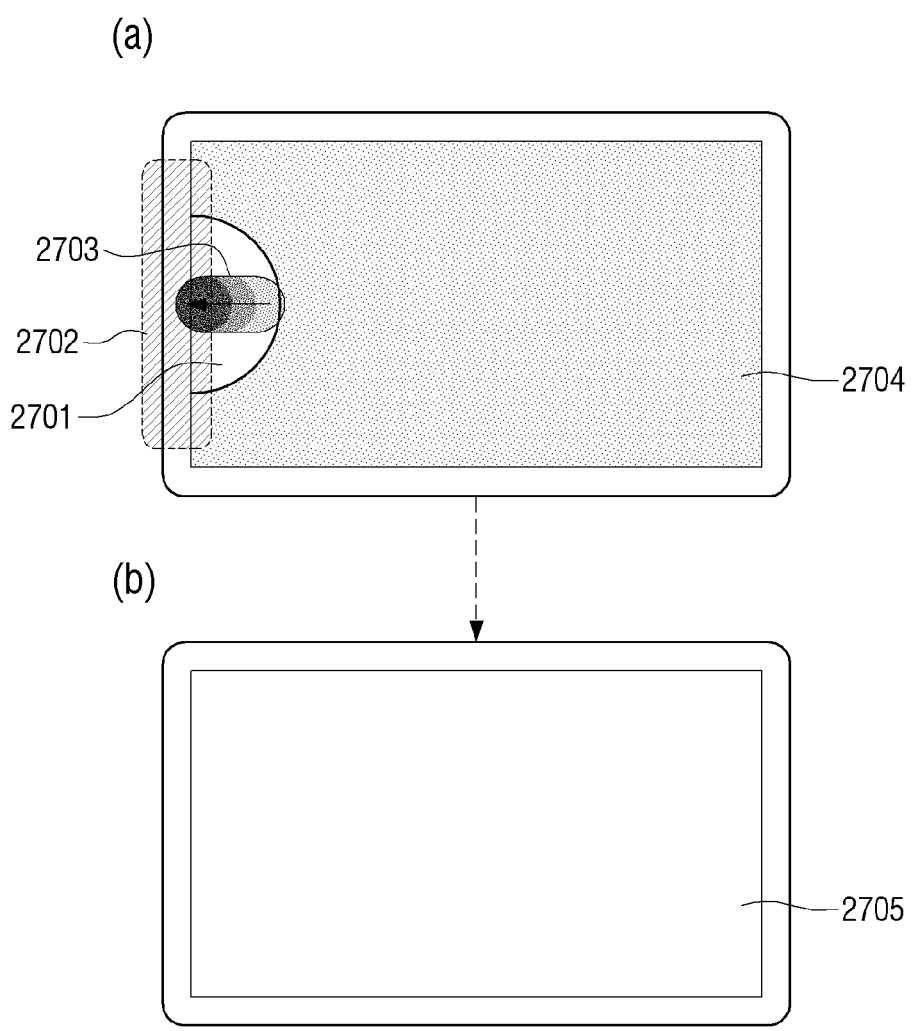

FIGS. 26 and 27 are views illustrating ending a toolset according to an exemplary embodiment of the present general inventive concept.

FIGS. 26 and 27 illustrate an operation of ending a toolset when the multi display device 100 is placed in the vertical direction and in the horizontal direction, respectively.

Referring to view (a) of FIG. 26 and view (b) of FIG. 27, when a first toolset 2601 or 2701 is displayed on the display 2604 or 2704, respectively and a drag gesture 2603 or 2703 moving toward a hinge region 2602 or 2702 is sensed on the first toolset 2601 or 2701, the multi display device 100 progresses to a screen of view (b) of FIG. 26 or a view (b) of FIG. 27. Referring to view (b) of FIG. 26 and view (b) of FIG. 27, in response to the drag gesture, the multi display device 100 makes the first toolset disappear from the display and un-dims the dimmed display 2604 or 2704 and displays the screen 2605 or 2705, respectively.

In FIGS. 20 through 27, the operation of activating the toolset has been described on the assumption that the multi display device 100 is in the single mode. However, the toolset may be activated in the above-described various modes.

Figure 28:
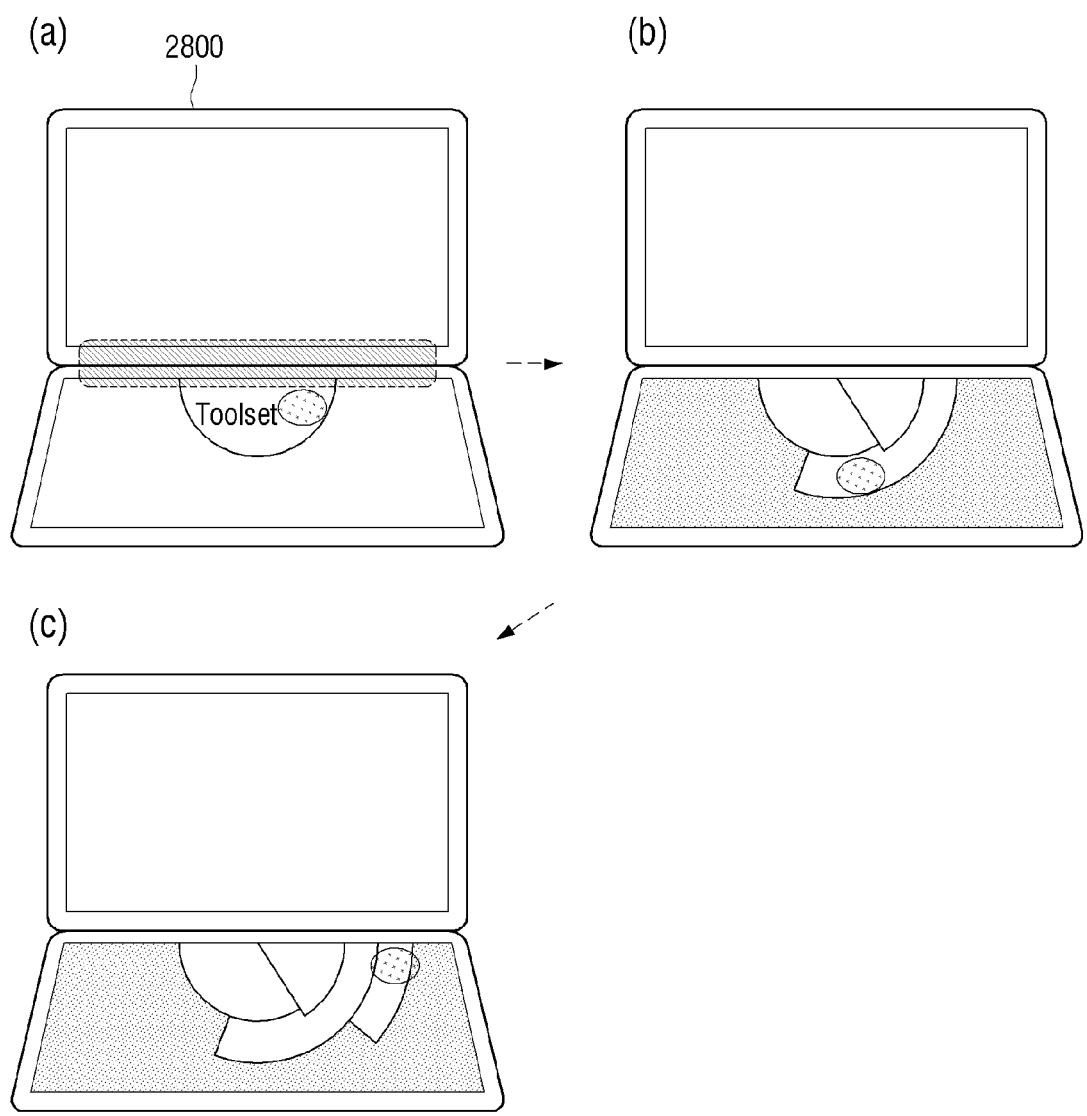
FIGS. 28 through 30 are views illustrating executing a toolset according to a screen mode of a multi display device according to an exemplary embodiment of the present general inventive concept.
Figure 29:
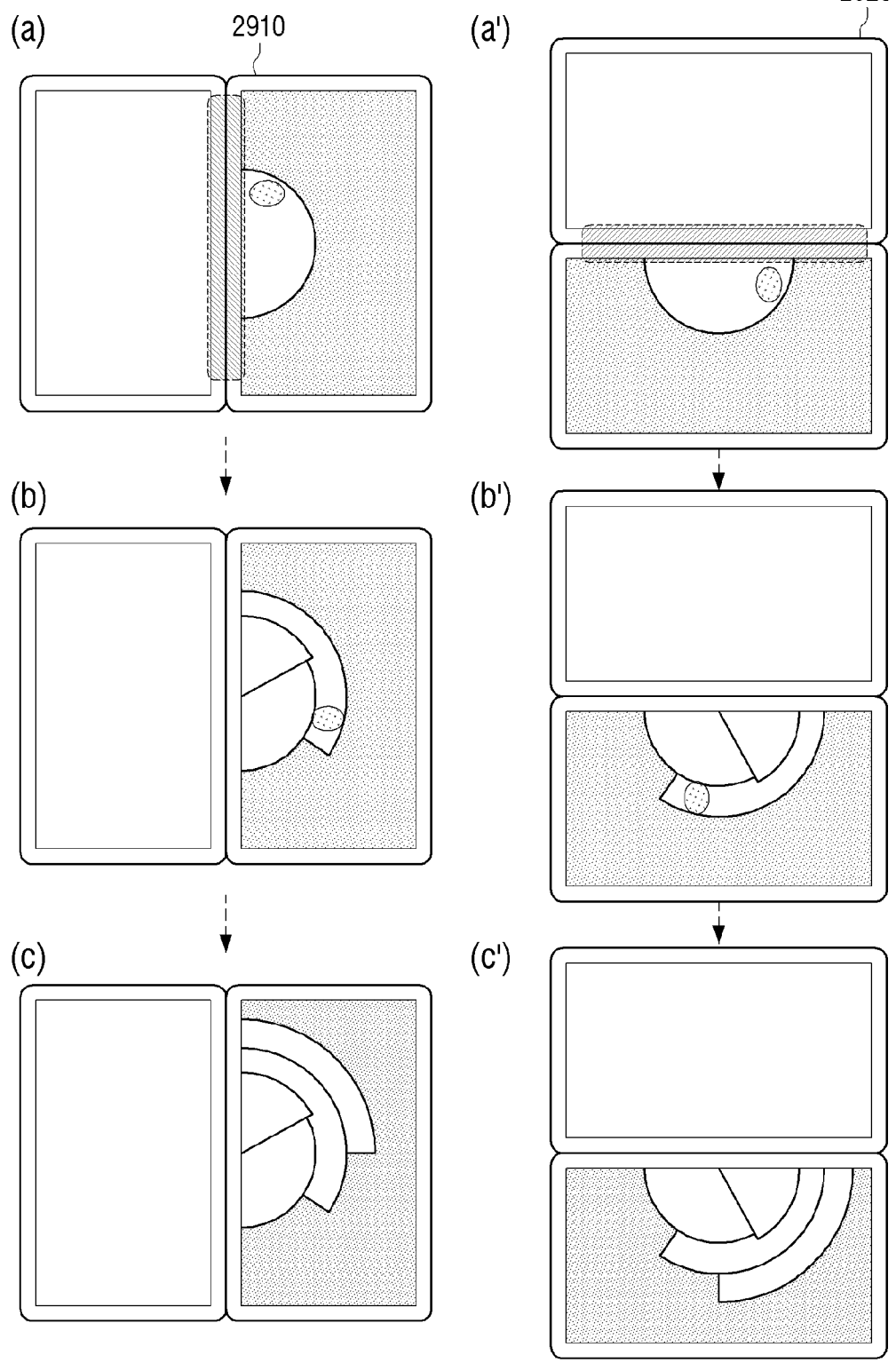
Figure 30:
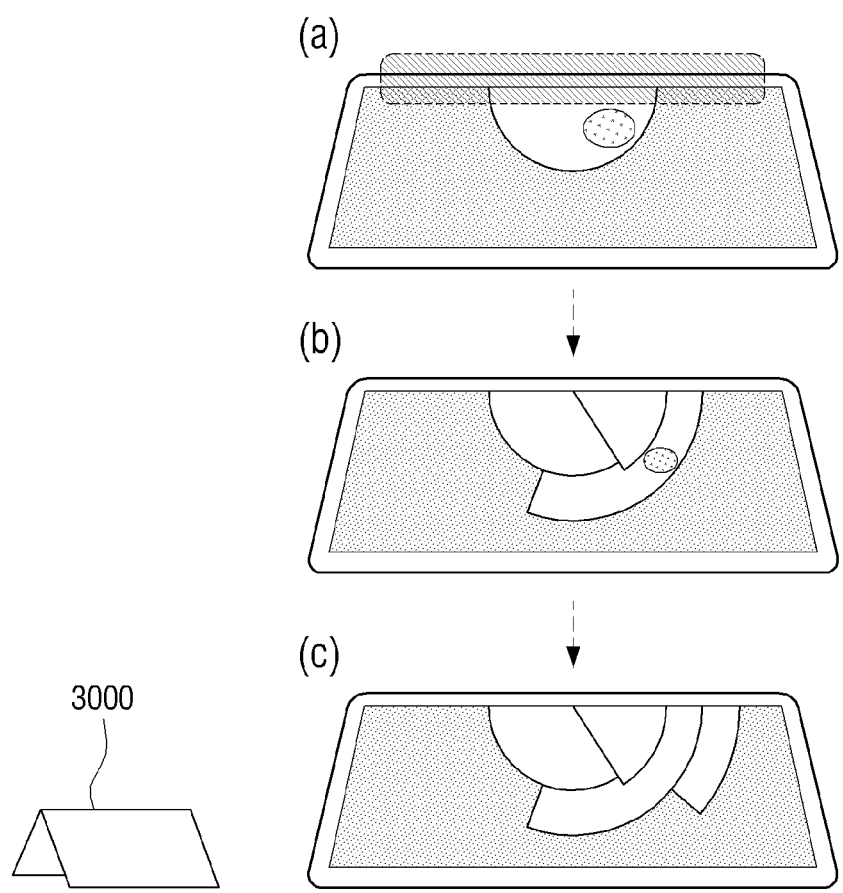

FIGS. 28 through 30 are views illustrating executing a toolset according to a screen mode of the multi display device 100 according to an exemplary embodiment of the present general inventive concept.

FIGS. 28 through 30 explain an operation of executing a toolset in a tool kit mode 2800, an expanding mode 2900, and a standing mode 3000, respectively.

The operation of executing the toolset in the single mode as explained above with reference to FIGS. 20 through 27 is commonly applied to FIGS. 28 through 30 and thus a redundant explanation is omitted.

Figure 31:
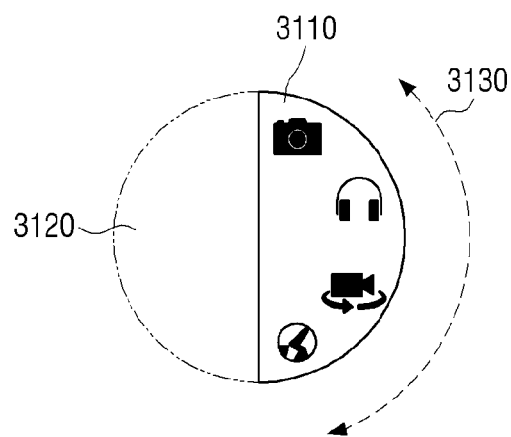
FIG. 31 is a view illustrating a first toolset according to various exemplary embodiments of the present general inventive concept.
Figure 31:
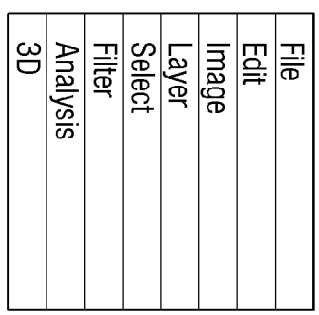
Figure 31:
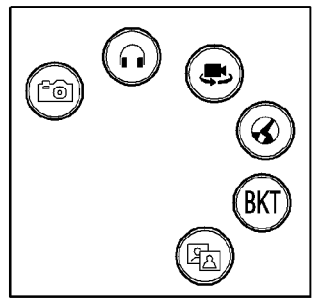
Figure 31:
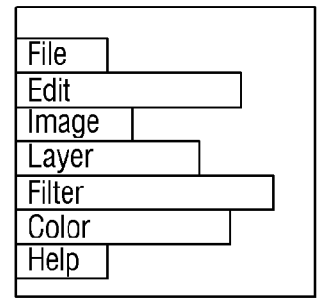

FIG. 31 is a illustrating a first toolset according to various exemplary embodiments of the present general inventive concept.

The first toolset refers to a basic toolset that is displayed by user's toolset activating manipulation.

Referring to FIG. 31, a first toolset UI according to various exemplary embodiments of the present general inventive concept is illustrated.

In a first exemplary embodiment, a first toolset of a semi-circular UI 3100-1 is divided into a display region 3110 that is displayed on the display, and a variable region 3120 that is not displayed on the display. Specifically, the display region 3110 is a semi-circular part that is displayed when the toolset is activated, and a predetermined tool is placed on the display region 3110. The predetermined tool may be directly set by the user and may be a tool that is normally provided by the multi display device. For example, the predetermined tool may represent a camera, a music player, a moving image shoot, a web browser, a gallery, an electronic book, a message, a memo, contact information, a calendar, and device settings. The variable region 3120 is the other semi-circular part that is not displayed when the toolset is activated, and a tool other than the predetermined tool, that is, a hidden tool, is placed. Such a variable region 3120 makes it possible to extend the tool in the future by updating the toolset. The first toolset 3100 is configured as a dial UI that is rolled up and down (3130), and the hidden tool of the variable region 3120 may be displayed on the display region 3110 by user's manipulation.

As described in the above first exemplary embodiment of the present general inventive concept, a toolset according to exemplary embodiments as will be explained below may be divided into a display region and a variable region, and a hidden tool of the variable region may be displayed on the display according to user's manipulation.

In contrast, the first toolset according to various exemplary embodiments of the present general inventive concept may be displayed in at least one form of a card pocket UI 3100-2, a water drop UI 3100-3, and a quadrangular bar graph UI 3100-4.

Figure 32:
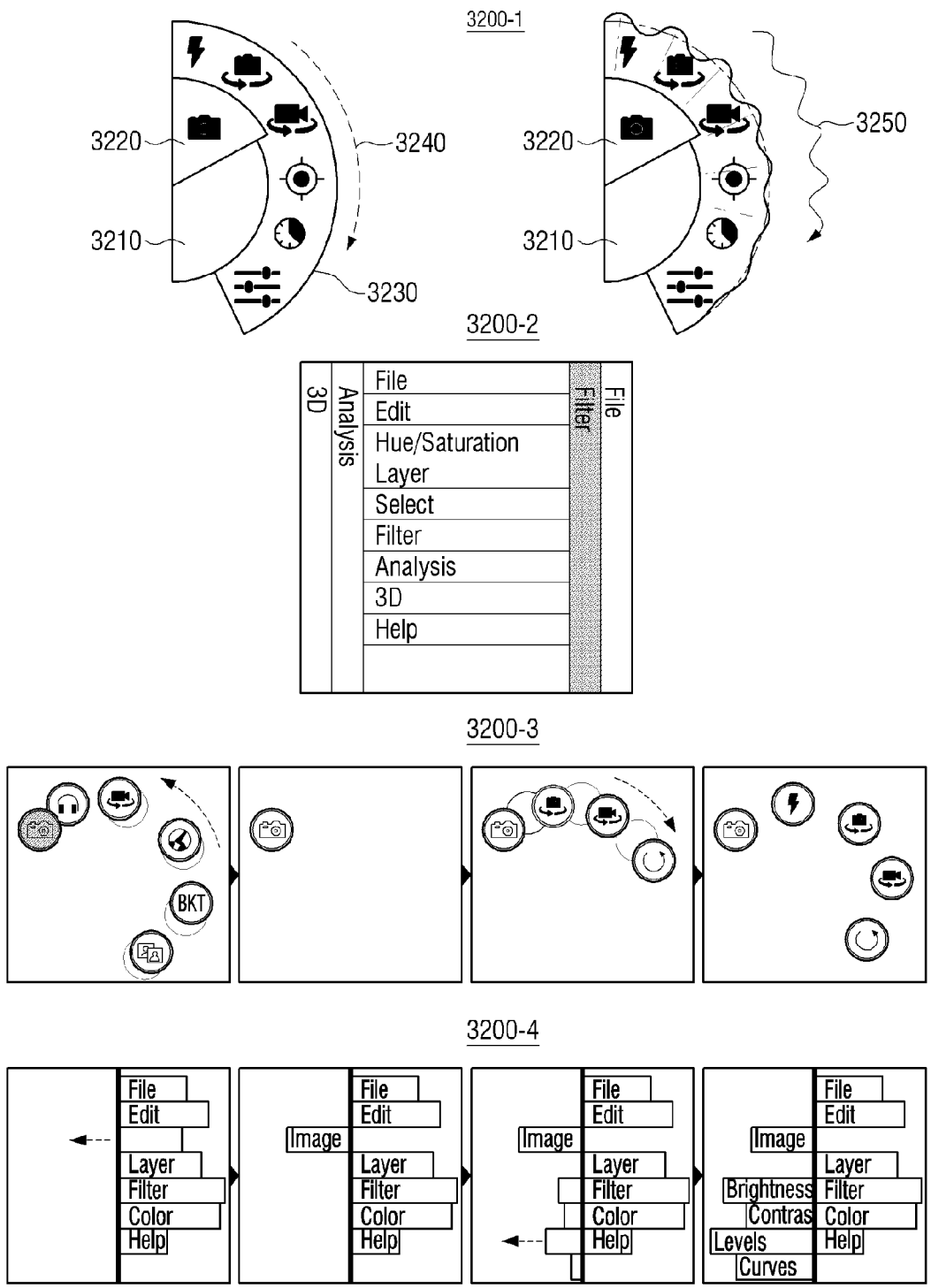
FIG. 32 is a view illustrating a second toolset that is a lower level toolset of a first toolset according to various exemplary embodiments of the present general inventive concept.

FIG. 32 is a view to explain a second toolset that is a lower level toolset of a first toolset according to various exemplary embodiments of the present general inventive concept.

Referring to FIG. 32, when one tool 3220 is selected from a first toolset 3210 on a semi-circular UI 3200-1 of the first exemplary embodiment of the present general inventive concept, the selected tool 3220 is activated, and a second toolset 3230, which is a lower level toolset of the selected tool 3220, is displayed in a circular bar shape as if it slides down enclosing the first toolset (3240). Alternatively, the second toolset 3230 may be displayed as if it slides down enclosing the first toolset 3220 with an animation effect showing a rolling wave (3250). By adding such an animation effect (for example, a rolling wave or afterimage effect) when the second toolset 3230 is displayed, a UI matching user's sensibility may be provided.

The second toolset 3230 may have a length of the bar changed according to a number of tools included in the second toolset 3230, and may be displayed in various layouts to be distinguished from the first toolset 3220.

A second exemplary embodiment of the present general inventive concept includes a second toolset of the card pocket UI 3200-2 being displayed as if a card is drawn from the card pocket when one tool is selected from the first toolset.

A third exemplary embodiment of the present general inventive concept includes a second toolset of a water drop UI 3200-3, such that when one tool is selected from the first toolset, unselected tools are put away in the selected tool as illustrated in FIG. 32. Tools of the second toolset appear from the selected tool in a direction opposite to the direction in which the tools are put away in the first toolset, such that the second toolset is displayed.

A third exemplary embodiment of the present general inventive concept includes a second toolset of a quadrangular bar graph UI 3200-4, such that when one tool is selected from the first toolset, the selected tool is moved toward the other display in the opposite direction of the display on which the first toolset is displayed, as illustrated in FIG. 32. The second toolset is displayed on the display on which the selected tool is displayed.

Figure 33:
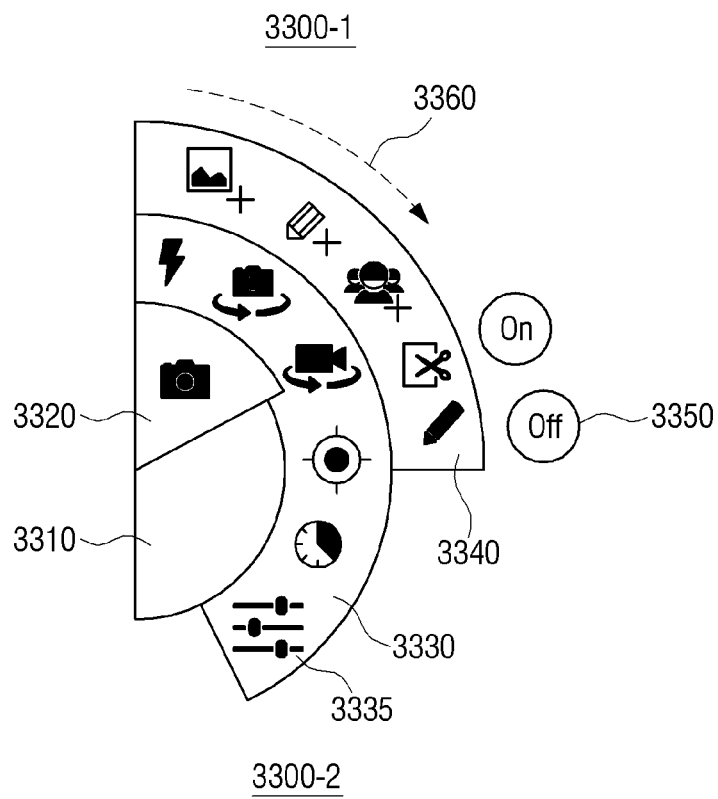
FIG. 33 is a view illustrating a third toolset that is a lower level toolset of a second toolset, and executing a tool according to various exemplary embodiments of the present general inventive concept.
Figure 33:
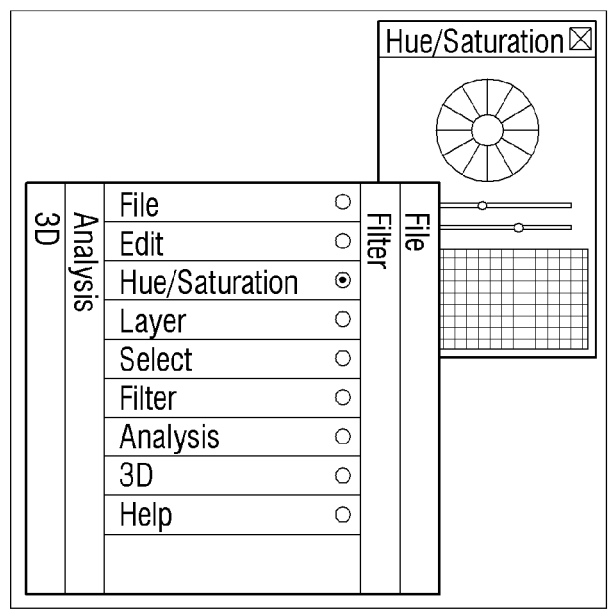

FIG. 33 is a view illustrating a third toolset that is a lower level toolset of a second toolset, and executing a tool according to various exemplary embodiments of the present general inventive concept.

Referring to FIG. 33, a semi-circular UI 3300-1 includes a tool 3320 that has already been selected from a first toolset 3310, such that a second toolset 3330 appears. Accordingly, when a tool 3335 is selected from the second toolset 3330, the semi-circular UI 3300-1 of the first exemplary embodiment of the present general inventive concept displays a third toolset 3340, which is a lower level toolset of the selected tool 3335, in a circular bar shape as if it slides down (3360) enclosing the second toolset 3330. The third toolset 3340 may have a length of the bar changed according to a number of tools included in the third toolset 3340. Another lower level tool under the third toolset 3340 may be displayed in a form of a circular button 3350.

However, although the lower level tool is displayed in the form of the circular button 3350 in the first exemplary embodiment of the present general inventive concept of the semi-circular UI 3300-1, the lower level tool may be provided on a separate region as in the second exemplary embodiment of the present general inventive concept of a semi-circular UI 3300-2, and may perform a specific function.

Hereinafter, a toolset operation will be explained with reference to the toolset of the semi-circular UI of the first exemplary embodiment. The toolset operation may also be applied to the second through fourth exemplary embodiments of the present general inventive concept.

Figure 34:
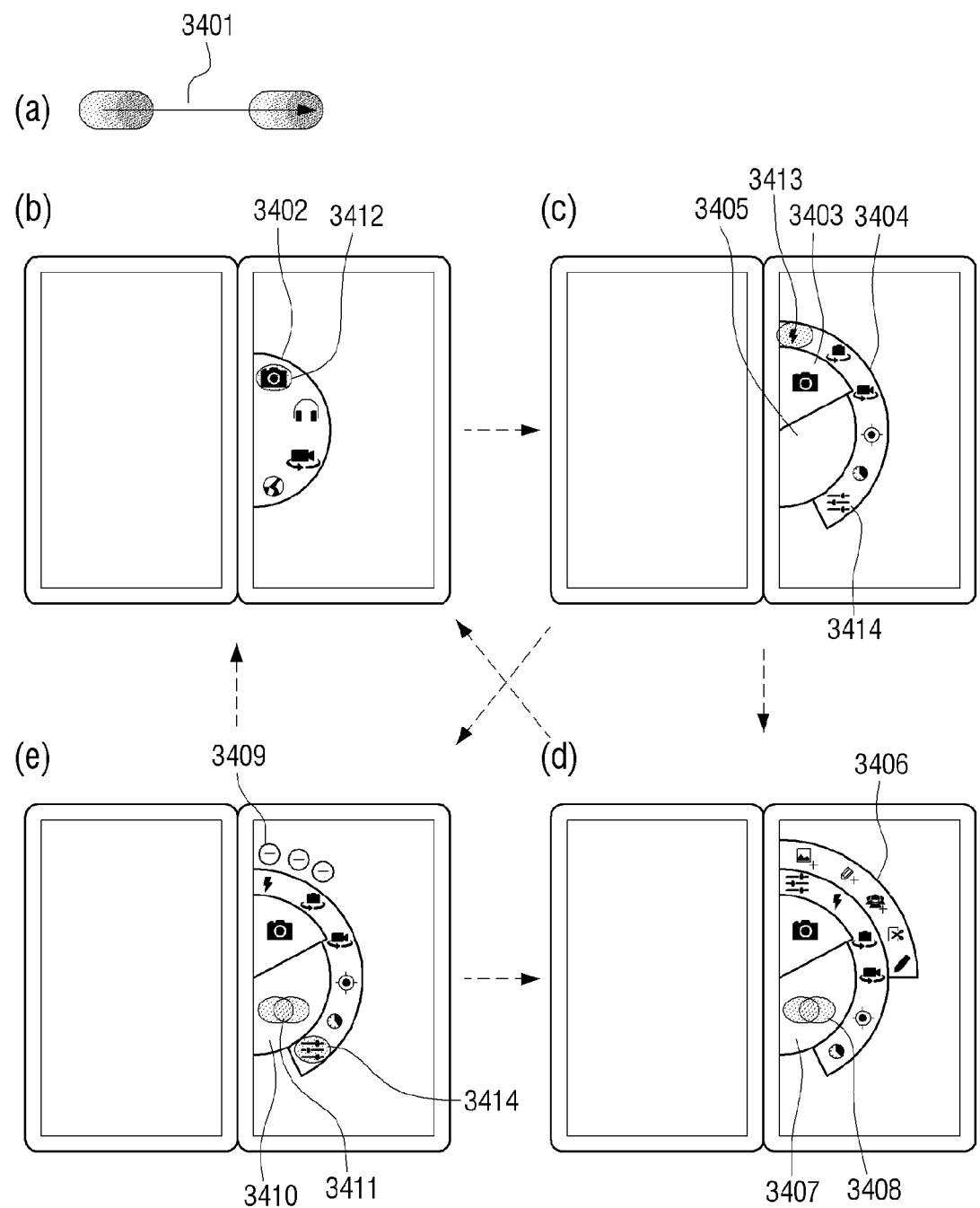
FIG. 34 is a view illustrating a flow of a toolset UI according to an exemplary embodiment of the present general inventive concept.

FIG. 34 is a view illustrating a flow of a toolset UI according to an exemplary embodiment of the present general inventive concept.

Referring to view (a) of FIG. 34, when a pre-defined touch gesture, for example, a drag gesture 3401 is sensed, the multi display device 100 progresses to view (b) of FIG. 34.

Referring to view (b) of FIG. 34, the multi display device 100 displays a first toolset 3402 in response to the drag gesture 3401. When a certain tool 3412 is selected from the first toolset 3402 and a tap gesture is sensed on the selected tool 3412, the multi display device 100 progresses to view (c) of FIG. 34. Referring to view (c) of FIG. 34, the multi display device 100 activates the tool 3412 selected from the first toolset 3402 in response to the tap gesture (3403), and displays a second toolset 3404 as if it slides down enclosing the first toolset 3402. As such, when a tap gesture 3405 is sensed on a certain tool 3413 of the second toolset 3404, the multi display device 100 progresses to view (d) or (e) of FIG. 34. When the tool 3413 selected from the second toolset 3404 has a lower level toolset, the multi display device 100 progresses to view (d) of FIG. 34, and, when a tool 3414 selected from the second toolset 3404 does not have a lower level toolset, the multi display device 100 progresses to view (e) of FIG. 34. Referring to view (d) of FIG. 34, the multi display device 100 displays a third toolset 3406, which is a lower level toolset of the selected tool 3413, in response to the tap gesture 3405. Also, referring to view (e) of FIG. 35, when the selected tool 3414 does not have a lower level toolset and performs on/off or +/−operations, the multi display device 100 displays a circular button 3409 along an outer edge of the circular bar of the second toolset 3404. When a double tap gesture 3408 or 3411 is sensed on a margin 3407 or 3410 that is not within a tool activation region on the first toolset 3402 as illustrated in views (d) and (e) of FIG. 34, the third toolset 3406 and the second toolset 3404 turn around towards the hinge 185 in sequence and disappear, and the multi display device 100 progresses to view (b) of FIG. 34.

Figure 35:
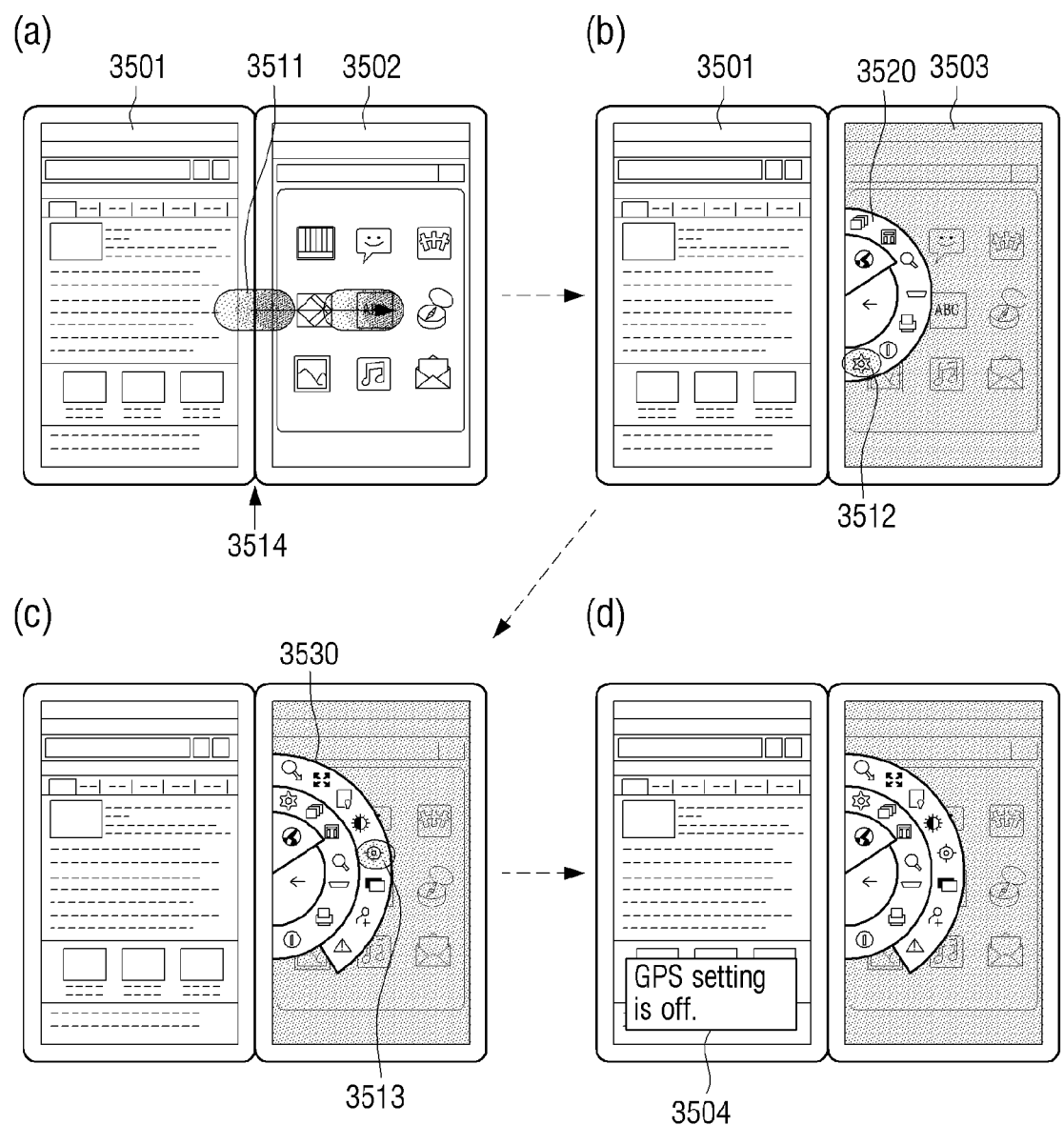
FIG. 35 is a view illustrating executing a toolset when a single display-based application is run according to an exemplary embodiment of the present general inventive concept.

FIG. 35 is a view illustrating executing a toolset when a single display-based application is driven according to an exemplary embodiment of the present general inventive concept.

Referring to view (a) of FIG. 35, a single display-based application is driven on first and second displays 3501 and 3502, respectively. As such, when a drag gesture 3511 performed in a direction from the first display 3501 toward the second display 3502 is sensed within a hinge region 3514, the multi display device 100 progresses to view (b) of FIG. 35.

Referring to view (b) of FIG. 35, the multi display device 100 displays a toolset 3520 on the second display 3502 to correspond to the direction of the drag gesture 3511, and dims the second display 3502 (3503). When a user's gesture to select a 'setting' tool 3512 of the toolset 3520 is sensed, the multi display device 100 progresses to view (c) of FIG. 35. Referring to view (c) of FIG. 35, a lower level toolset 3530 is displayed in response to the user's gesture 3512 to select the 'setting' tool 3512, and, when a user's gesture to select a 'GPS' tool 3513 is sensed on the lower level toolset 3530, the multi display device 100 progresses to view (d) of FIG. 35. Referring to view (d) of FIG. 35, the multi display device 100 displays a GPS off state 3504 on the first display 190a via an alert message in response to the user's gesture to select the 'GPS' tool 3513.

Furthermore, when the user selects a certain tool from the toolset, the selected toolset is always placed on an upper portion of the toolset UI, so that the same movement of the user's eyes is maintained and thus a consistent eye tracking environment can be provided to the user. For example, referring to view (b) and view (c) of FIG. 35, when the user gesture to select the 'setting' tool 3512 is sensed on the second toolset 3520, the selected 'setting' tool 3512 is rolled up and is displayed on an upper portion of the second toolset 3520, and a second toolset 3530 that is a lower level toolset of the 'setting' tool 3512 is wiped down and displayed on at least a portion of an outer circumference of the second toolset 3520.

Figure 36:
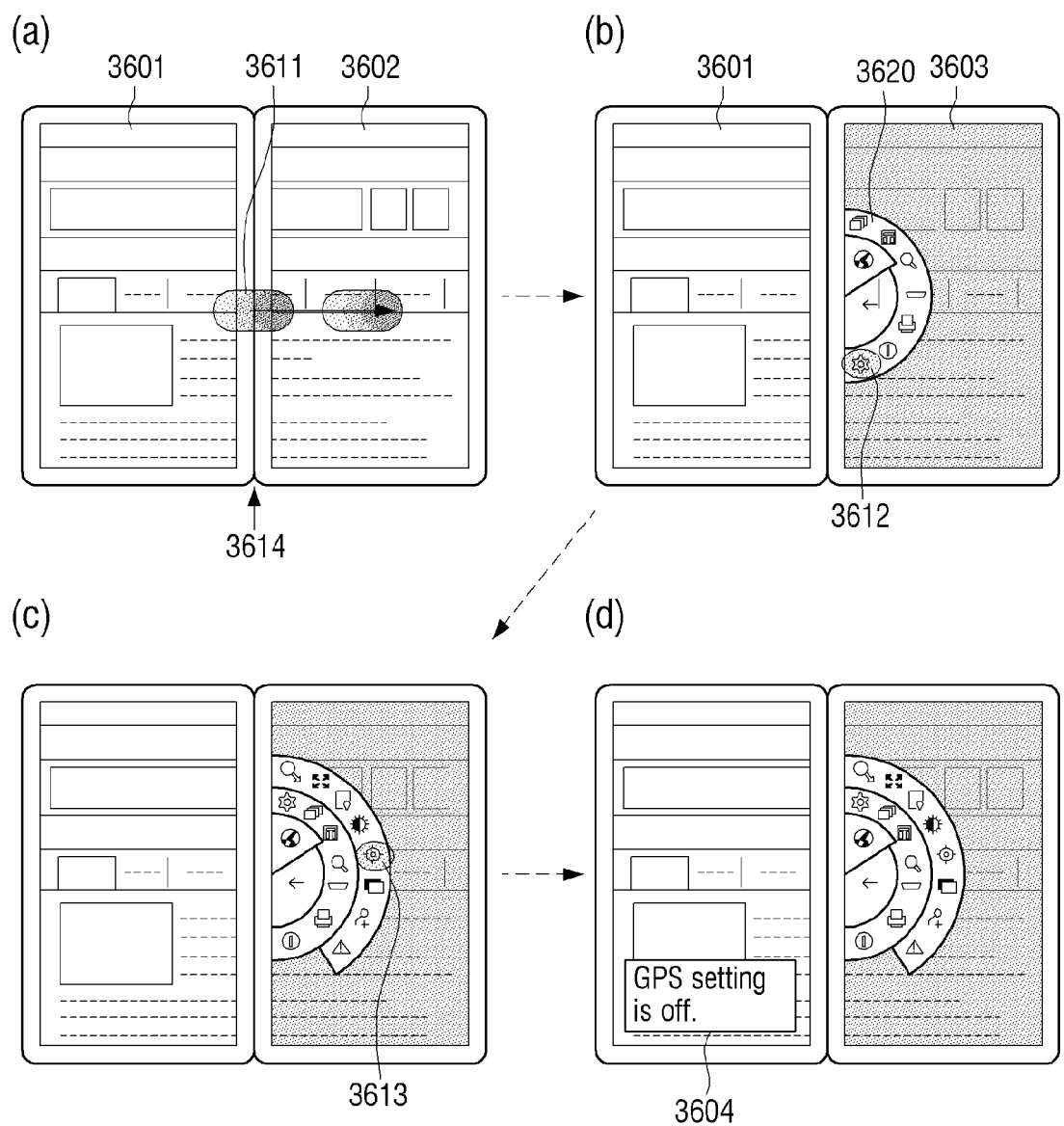
FIG. 36 is a view illustrating executing a toolset when a dual display-based application is run according to an exemplary embodiment of the present general inventive concept.

FIG. 36 is a view illustrating executing a toolset when a dual display-based application is driven according to an exemplary embodiment of the present general inventive concept.

In comparison with FIG. 35, the dual display-based application is different from the application in FIG. 35 in that a single application is driven on both first and second displays 3601 and 3602. However, a toolset 3620 may be executed on the dual display-based application in the same way as in the single display-based application. The second display 3602 on which the toolset is activated is dimmed (3603) such that the user can clearly recognize the toolset.

Referring to view (a) of FIG. 36, the dual display-based application is driven on the first and second displays 3601 and 3602, respectively. As such, when a drag gesture 3611 performed in a direction from the first display 3601 toward the second display 3602 is sensed within a hinge region 3614, the multi display device 100 progresses to view (b) of FIG. 36. Referring to view (b) of FIG. 36, the multi display device 100 displays a toolset 3620 on the second display 3602 to correspond to the direction of the drag gesture 3611, and dims the second display 3602 (3603). When a user's gesture to select a 'setting' tool 3612 of the toolset 3620 is sensed, the multi display device 100 progresses to view (c) of FIG. 36. Referring to view (c) of FIG. 36, a lower level toolset 3630 is displayed in response to the user's gesture 3612 to select the 'setting' tool 3612, and, when a user's gesture to select a 'GPS' tool 3613 is sensed on the lower level toolset 3630, the multi display device 100 progresses to view (d) of FIG. 36. Referring to view (d) of FIG. 36, the multi display device 100 displays a GPS off state 3604 on the first display 190a via an alert message in response to the user's gesture to select the 'GPS' tool 3613.

Figure 37:
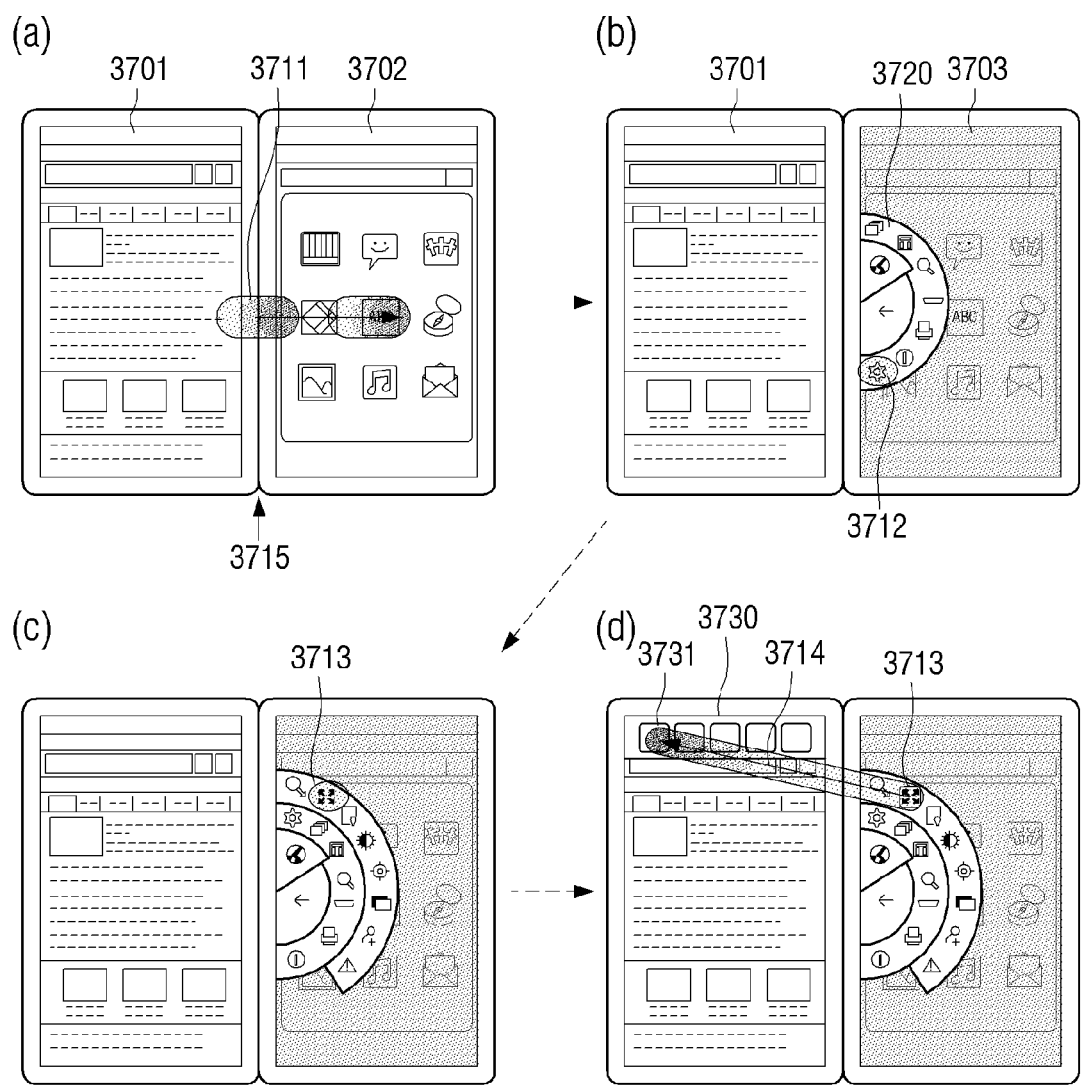
FIG. 37 is a view illustrating a toolset dock according to an exemplary embodiment of the present general inventive concept.

FIG. 37 is a view illustrating a toolset dock according to an exemplary embodiment of the present general inventive concept.

Referring to view (a) of FIG. 37, a single display-based application is driven on a first display 3701 and a second display 3702. As such, when a drag gesture 3711 performed in a direction from the first display 3701 toward the second display 3702 is sensed on a hinge region 3715, the multi display device 100 progresses to view (b) of FIG. 37. Referring to view (b) of FIG. 37, the multi display device 100 displays a toolset 3720 second display 3602 to correspond to the direction of the drag gesture 3711, and dims the second display 3702 (3703). When a user gesture 3712 to select a 'setting' tool 3712 from the toolset 3720 is sensed, the multi display device 100 progresses to view (c) of FIG. 37. Referring to view (c) of FIG. 37, in response to the user gesture 3712 to select the 'setting' tool 3712, the multi display device 100 displays a lower level toolset 3730. When a long tap gesture is sensed on a 'display extension' tool 3713 of the lower level toolset 3730, the multi display device 100 progresses to view (d) of FIG. 37. Referring to view (d) of FIG. 37, according to a long tap gesture 3714, the 'display extension' tool 3713 is activated in a movable form and a toolset dock 3730 is formed on an upper portion of the first display 3701, such that the 'display extension' tool 3713 is moved to a position 3731 for easy user-access.

The toolset dock 3730 refers to a UI that stores and displays a selected tool in order to execute a tool that the user frequently uses swiftly.

Using the toolset dock 3730, the user may swiftly execute the tool that he/she wants to use without executing the toolset. The toolset dock may be activated by a user's specific gesture while an application is being executed. For example, when a tap gesture is sensed on an upper portion of the application, the multi display device 100 activates the toolset dock on the upper portion of the application for a predetermined time.

In contrast, the toolset dock may vary a number of tools that can be stored according to user's settings. The toolset dock may have an individual toolset for each application and may provide a tool according to user's taste. Therefore, user' convenience in using an application can be improved.

The basic operations of the toolset corresponding to user manipulation have been described above with reference to FIGS. 31 through 37. However, the gestures corresponding to user manipulation, the positions of the toolsets, and the UIs of the toolsets are merely examples and they are not limited to these exemplary embodiments.

As described above, a toolset may include tools corresponding to an operation state of the multi display device 100. That is, the toolset may vary according to whether the multi display device 100 is displaying a home screen or is executing an application. In particular, when the multi display device 100 is executing an application, the multi display device 100 may display a different toolset according to a type of the application.

FIGS. 38 through 47 are views illustrating examples of toolsets that are configured differently according to operation states of the multi display device 100, according to an exemplary embodiment of the present general inventive concept.

Figure 38:
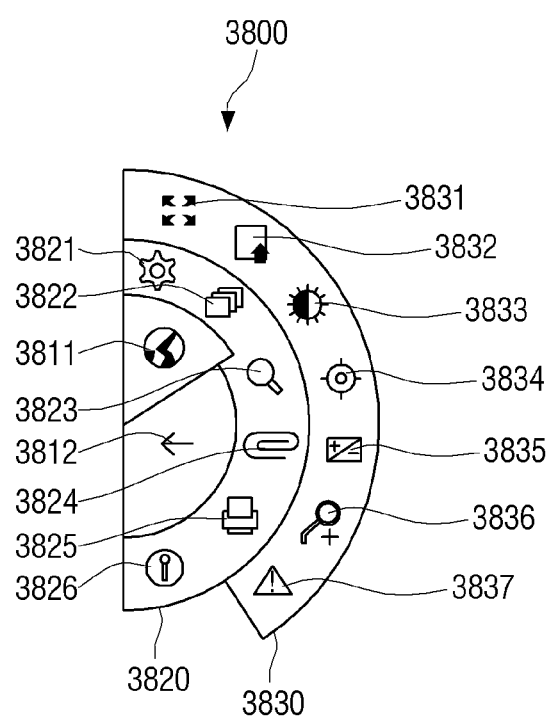
FIGS. 38 through 47 are views illustrating a toolset corresponding to each application according to an exemplary embodiment of the present general inventive concept.

FIG. 38 is a view illustrating a configuration example of a toolset that is displayed when an Internet browser tool is executed. Referring to FIG. 38, an internet browser tool 3811 is normally activated to display a lower level toolset 3820 on a first toolset UI 3800. The lower level toolset 3820 of the Internet browser tool 3811 may include a setting tool 3821, a multi-window split tool 3822, a search tool 3823, an attachment tool 3824, a print tool 3825, and an information display tool 3826. When the setting tool 3821 is selected, a lower level toolset 3830 of the setting tool 3821 may include a display extension tool 3831, an upload setting tool 3832, a brightness adjustment tool 3833, a GPS setting tool 3834, a contrast adjustment tool 3835, a key setting tool 3836, and a security setting tool 3837.

Referring to FIG. 38, a lower level toolset reduction tool 3812 is also displayed on the first toolset UI 3800. The lower level toolset reduction tool 3812 is a tool to end a currently displayed lowest level toolset. For example, when the lower level toolset 3820 and the lower level toolset 3830 are both displayed, as illustrated in FIG. 38, and the lower level toolset reduction tool 3812 is selected, the lower level toolset 3830 disappears.

Figure 39:
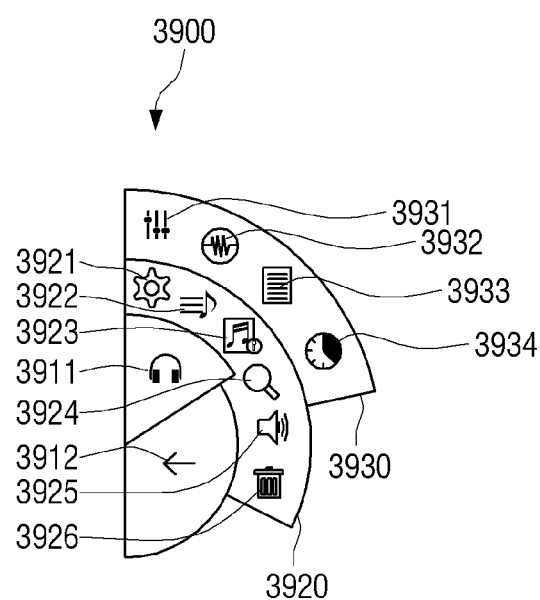

FIG. 39 is a view illustrating a toolset that is displayed when a music player is executed, according to an exemplary embodiment of the present general inventive concept.

Referring to FIG. 39, a music player tool 3911 and a lower level toolset reduction tool 3912 are displayed on a first toolset UI 3900. When the music player tool 3911 is activated, a lower level toolset 3920 of the music player tool 3911 may include a setting tool 3921, a playlist tool 3922, a music information view tool 3923, a search tool 3924, a volume adjustment tool 3925, and a trash bin tool 3926. When the setting tool 3821 is selected, a lower level toolset 3930 of the setting tool 3821 may include an equalizer setting tool 3931, a sound effect setting tool 3932, a playlist setting tool 3933, and a timer setting tool 3934.

Figure 40:
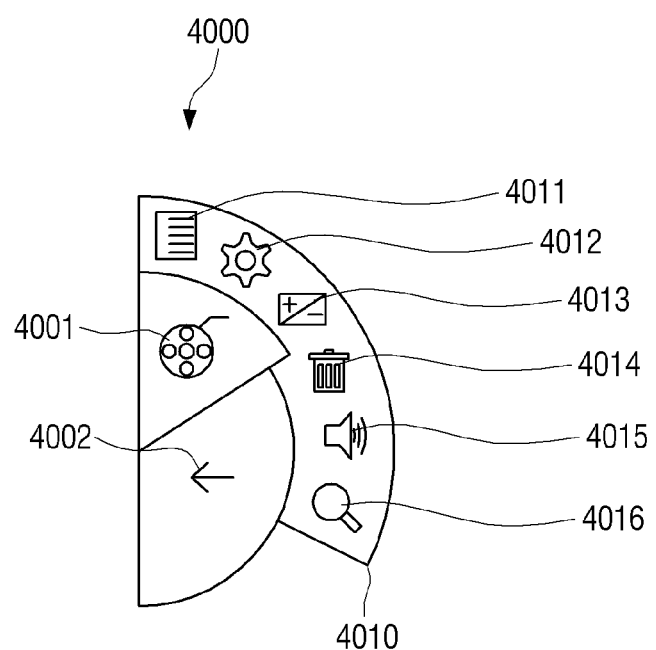

FIG. 40 is a view illustrating a toolset that is displayed when a moving image player is executed, according to an exemplary embodiment of the present general inventive concept.

Referring to FIG. 40, a moving image player tool 4001 and a lower level toolset reduction tool 4002 are displayed on a first toolset UI 4000. When the moving image player tool 4001 is activated, a lower level toolset 4010 of the moving image player tool 4001 may include a playlist tool 4011, a setting tool 4012, a screen adjustment tool 4013, a trash bin tool 4014, a volume adjustment tool 4015, and a search tool 4016.

Figure 41:
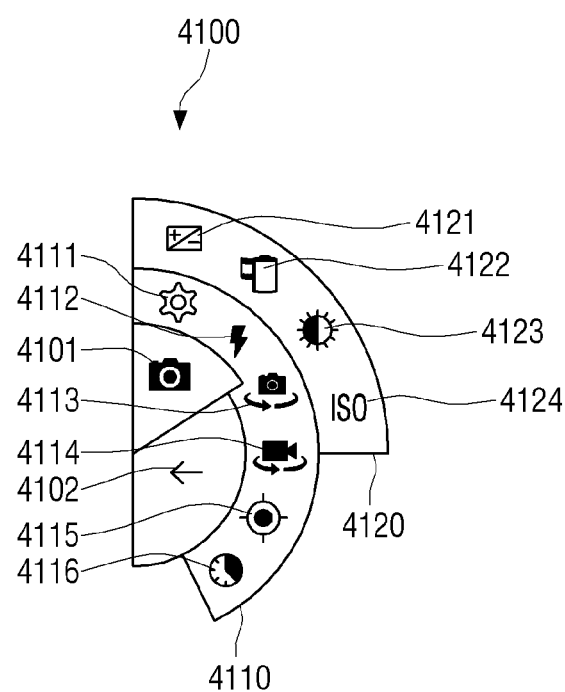

FIG. 41 is a view illustrating a toolset that is displayed when a camera is executed, according to an exemplary embodiment of the present general inventive concept.

Referring to FIG. 41, a camera tool 4101 and a lower level toolset reduction tool 4102 are displayed on a first toolset UI 4100. When the camera tool 4101 is activated, a lower level toolset 4110 of the camera tool 4101 may include a setting tool 4111, a flash setting tool 4112, a front and rear camera conversion tool 4113, a moving image shooting conversion tool 4114, a focus mode setting tool 4115, and a timer setting tool 4116. When the setting tool 4111 is selected, a lower level toolset 4120 of the setting tool 4111 may include a resolution setting tool 4121, a film setting tool 4122, a white balance setting tool 4123, and an ISO sensitivity setting tool 4124.

Figure 42:
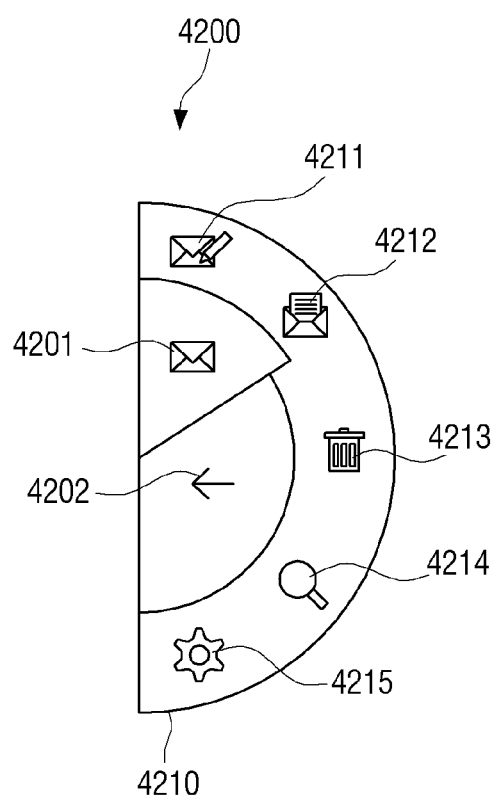

FIG. 42 is a view illustrating a toolset that is displayed when a message is executed, according to an exemplary embodiment of the present general inventive concept.

Referring to FIG. 42, a message tool 4201 and a lower level toolset reduction tool 4202 are displayed on a first toolset UI 4200. When the message tool 4201 is activated, a lower level toolset 4210 of the message tool 4201 may include a new message writing tool 4211, a received message view tool 4212, a trash bin tool 4213, a search tool 4214, and a setting tool 4215.

Figure 43:
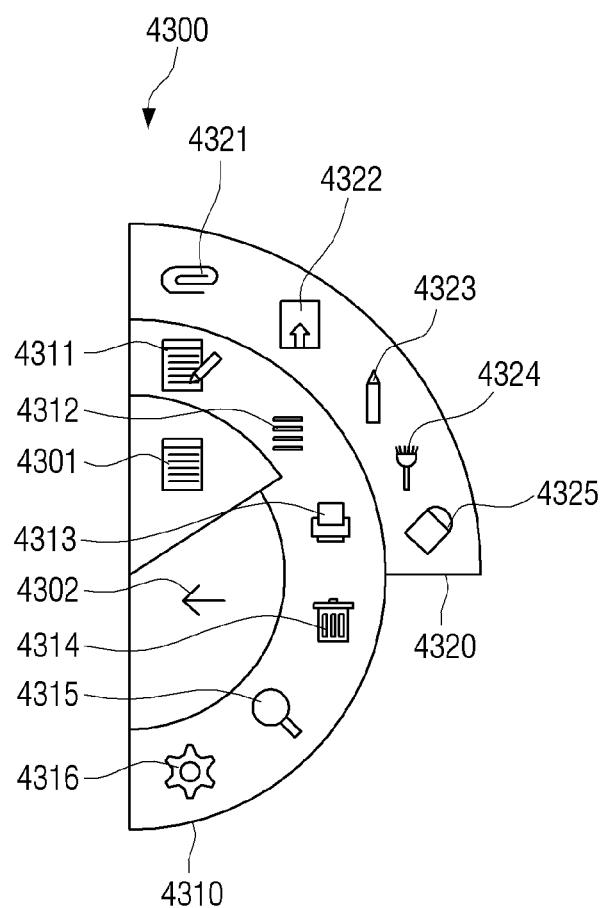

FIG. 43 is a view illustrating a toolset that is displayed when a memo is executed, according to an exemplary embodiment of the present general inventive concept.

Referring to FIG. 43, a memo tool 4301 and a lower level toolset reduction tool 4302 are displayed on a first toolset UI 4300. When the memo tool 4301 is activated, a lower level toolset 4310 of the memo tool 4301 may include a new memo writing tool 4311, a memo list tool 4312, a print tool 4313, a trash bin tool 4314, a search tool 4315, and a setting tool 4316.

When the new memo writing tool 4311 is selected, a lower level toolset 4320 of the new memo writing tool 4311 may include an attachment tool 4321, a social network service (SNS) upload tool 4322, a pen setting tool 4323, a brush setting tool 4324, and an eraser setting tool 4325.

Figure 44:
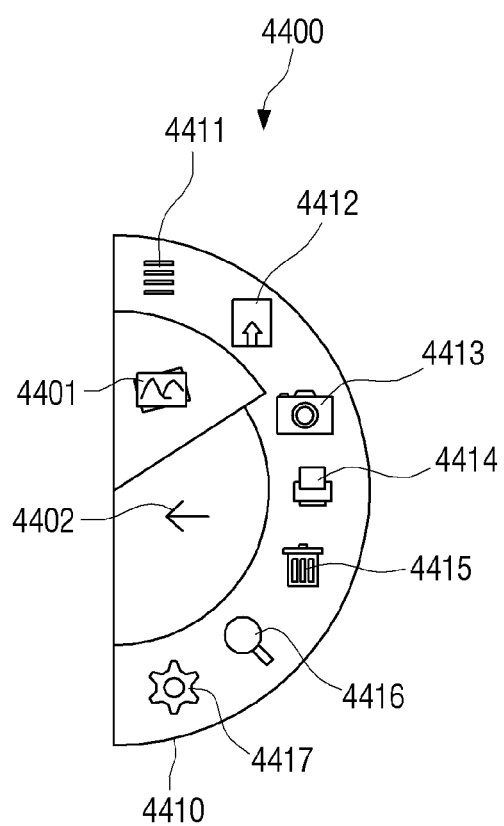

FIG. 44 is a view illustrating a toolset that is displayed when a gallery is executed, according to an exemplary embodiment of the present general inventive concept.

Referring to FIG. 44, a gallery tool 4401 and a lower level toolset reduction tool 4402 are displayed on a first toolset UI 4400. When the gallery tool 4401 is activated, a lower level toolset 4410 of the gallery tool 4401 may include a gallery list tool 4411, an SNS upload tool 4412, a shooting mode conversion tool 4413, a print tool 4414, a trash bin tool 4415, a search tool 4416, and a setting tool 4417.

Figure 45:
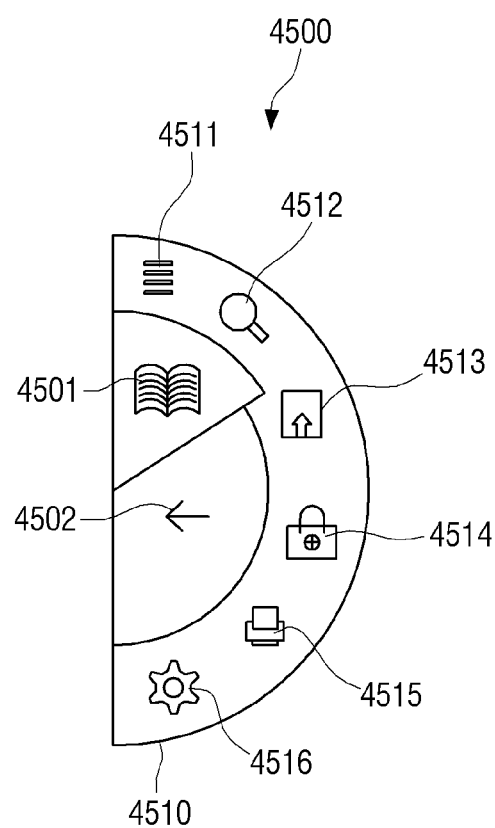

FIG. 45 is a view illustrating a toolset that is displayed when an e-book is executed, according to an exemplary embodiment of the present general inventive concept.

Referring to FIG. 45, an e-book tool 4501 and a lower level toolset reduction tool 4502 are displayed on a first toolset UI 4500. When the e-book tool 4501 is activated, a lower level toolset 4510 of the e-book tool 4501 may include a list tool 4511, a search tool 4512, an SNS upload tool 4513, an e-book download tool 4514, a print tool 4515, and a setting tool 4516.

Figure 46:
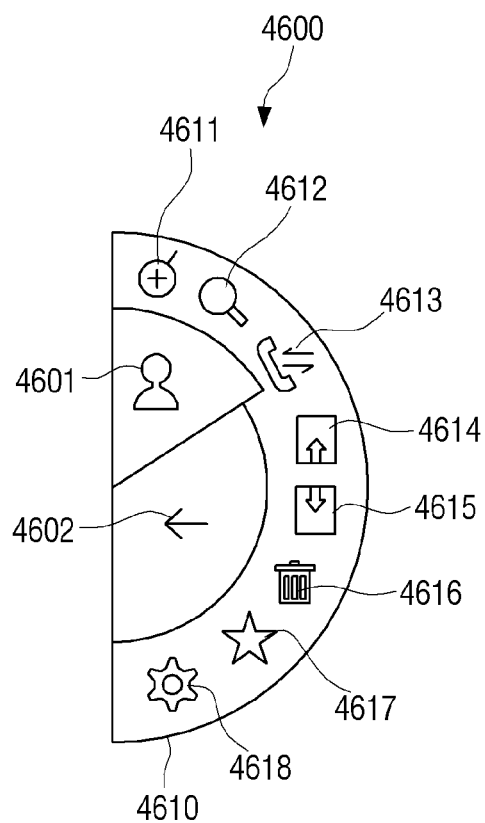

FIG. 46 is a view illustrating a toolset that is displayed when contact information is executed, according to an exemplary embodiment of the present general inventive concept.

Referring to FIG. 46, a contact information tool 4601 and a lower level toolset reduction tool 4602 are displayed on a first toolset UI 4600. When the contact information tool 4601 is activated, a lower level toolset 4610 of the contact information tool 4601 may include a new contact information addition tool 4611, a search tool 4612, a recent call contact information tool 4613, a contact information upload tool 4614, a contact information download tool 4615, a trash bin tool 4616, a bookmark tool 4617, and a setting tool 4618.

Figure 47:
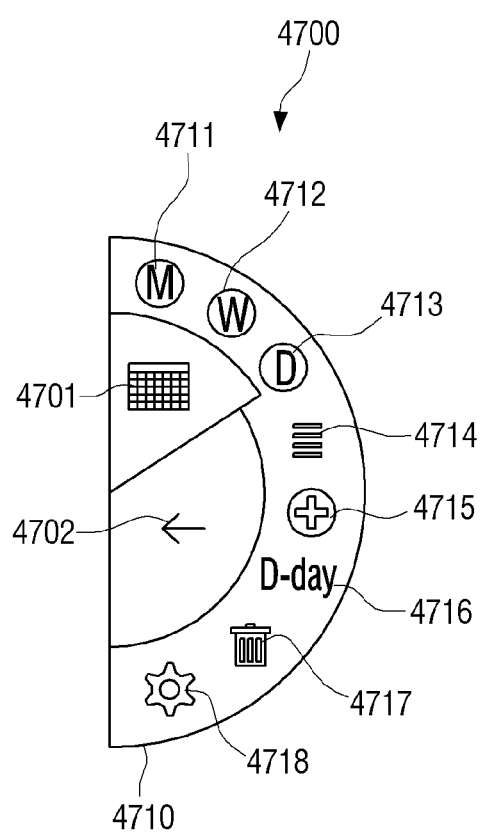

FIG. 47 is a view illustrating a toolset that is displayed when a calendar is executed, according to an exemplary embodiment of the present general inventive concept.

Referring to FIG. 47, a calendar tool 4701 and a lower level toolset reduction tool 4702 are displayed on a first toolset UI 4700. When the calendar tool 4701 is activated, a lower level toolset 4710 of the calendar tool 4701 may include a monthly schedule tool 4711, a weekly schedule tool 4712, a daily schedule tool 4713, a schedule list tool 4714, a schedule addition tool 4715, a D-day menu tool 4716, a trash bin tool 4717, and a setting tool 4718.

Although the toolsets varying according to the operation states of the multi display device have been described in the above exemplary embodiments of the present general inventive concept, the toolsets may vary according to various types of touching means corresponding to the multi display device 100. For example, a toolset displayed when the user touches the multi display device 100 with his/her hand may be different from a toolset displayed when the user touches the multi display device 100 with a pen.

Hereinafter, a configuration of a toolset that is displayed when a stylus pen 4800 is used and a configuration of the stylus pen 4800 according to various exemplary embodiments of the present general inventive concept will be explained in detail.

The stylus pen 4800 is one of the external inputting means of the multi display device 100, and the user may manipulate the multi display device 100 using a touch gesture as well as the stylus pen 4800.

Figure 48A:
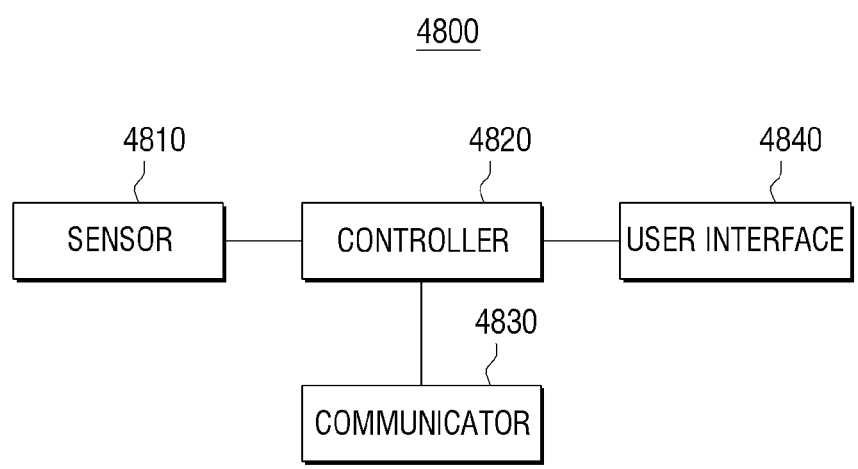
FIG. 48A is a block diagram illustrating an inner configuration of a stylus pen according to an exemplary embodiment of the present general inventive concept

FIG. 48A is a block diagram illustrating an inner configuration of a stylus pen 4800 according to an exemplary embodiment of the present general inventive concept.

Referring to FIG. 48A, the stylus pen 4800 includes a sensor 4810, a controller 4820, a communicator 4830, and a user interface 4840.

The sensor 4810 is configured to sense at least one physical quantity existing within a predetermined range. For example, the sensor 4810 may include at least one of a camera to shoot an image, a gyro sensor to detect a motion or position, an acceleration sensor to detect acceleration according to a force applied to a moving object, a geomagnetic sensor to detect azimuth by detecting a flow of a magnetic field, an IR sensor to detect infrared rays of an object, and a pressure sensor to detect an intensity of applied pressure, but is not limited thereto.

The user interface 4840 may be disposed on a handle of the stylus pen 4800 in a push type, a touch type or a dialer type, but is not limited thereto.

The controller 4820 controls an overall operation of the stylus pen 4800. In particular, the controller 4820 controls the communicator 4830 to receive a result of sensing by the sensor 4810 and user input of the user interface 4840, and to transmit information on the result of the sensing and the user input to the multi display device 100. The controller 4820 includes a micro processing unit (MPU) or a central processing unit (CPU), and an operating system (OS) to drive the same.

The communicator 4830 is configured to communicate with the multi display device 100. Specifically, the communicator 4830 transmits the information on the result of the sensing obtained through the sensor 4810 and the user input of the user interface 4840 to the multi display device 100. Also, the communicator 4830 may receive a control signal from the multi display device 100 if necessary.

The communicator 4830 may be implemented by using various short-range wireless communicating means. For example, the communicator 4830 may be implemented by using Bluetooth, IR communication, near field communication (NFC), Wi-Fi, or Zigbee, but is not limited thereto.

As described above, the stylus pen 4800 may sense a variety of information through the sensor 4810, and may receive user input through the user interface 4840. The result of the sensing and the user input information may be transmitted to the multi display device 100 through the communicator 4830. The information received at the multi display device 100 may be an event, which may manipulate the multi display device 100.

Figure 48B:
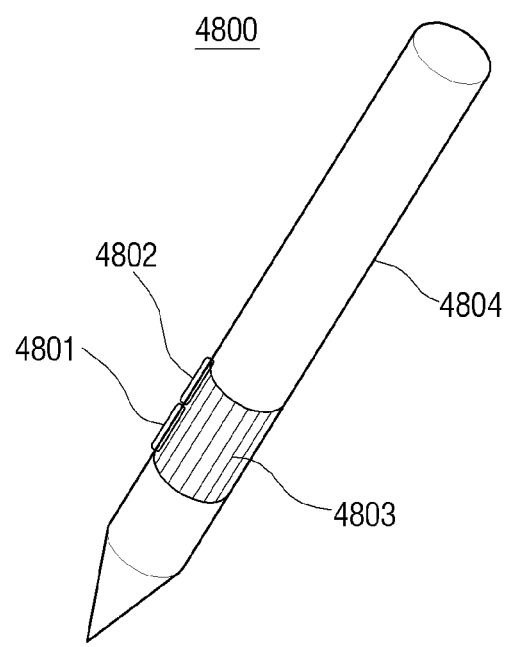
FIG. 48B is a view illustrating a stylus pen according to an exemplary embodiment of the present general inventive concept.

FIG. 48B is a view illustrating a stylus pen 4800 according to an exemplary embodiment of the present general inventive concept.

Referring to FIG. 48B, the stylus pen 4800 according to an exemplary embodiment of the present general inventive concept may include a lower button 4801, an upper button 4802, and a dialer 4803, which are disposed on a handle 4804 of the stylus pen 4800, and serve as a user interface. Specifically, the lower button 4801 may perform functions of selecting or executing like a left button of a mouse, and the upper button 4802 may perform functions of menu or setting like a right button of a mouse. Also, the dialer 4803 may perform a function of scrolling up and down like a mouse wheel.

Hereinafter, the multi display device 100 executing a toolset using the stylus pen 4800 of FIGS. 48A and 48B will be explained.

Figure 49:
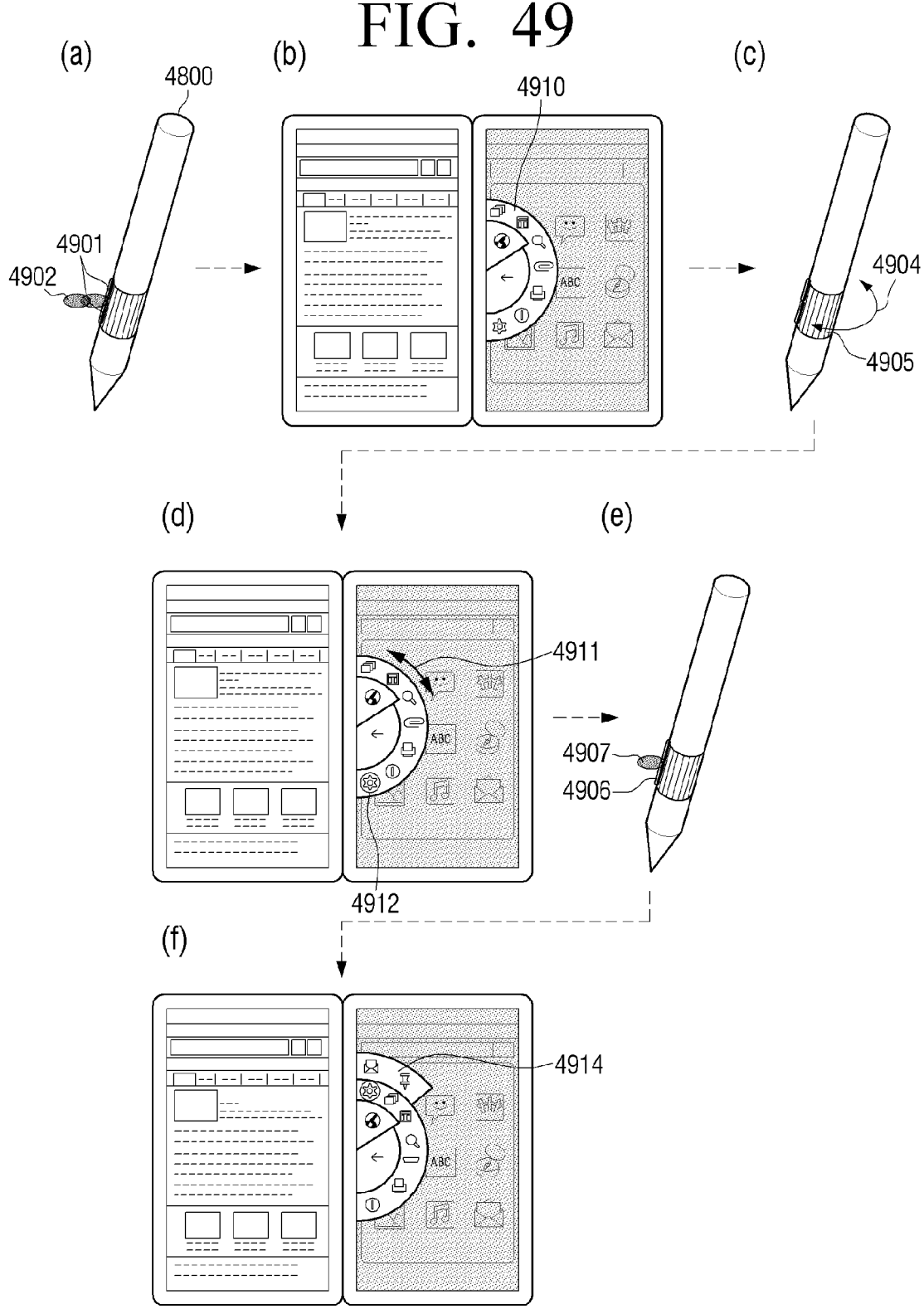
FIG. 49 is a view illustrating activating a toolset and extending a lower level toolset using a stylus pen according to an exemplary embodiment of the present general inventive concept.

FIG. 49 is a view illustrating activating a toolset and extending a lower level toolset using a stylus pen 4800 according to an exemplary embodiment of the present general inventive concept.

Referring to view (a) of FIG. 49, when the user double clicks one of the upper and lower buttons 4901 of the stylus pen 4800 (4902), the multi display device 100 progresses to view (b) of FIG. 49. Referring to view (b) of FIG. 49, the multi display device 100 activates a toolset 4910 corresponding to a running application and displays the toolset 4910 in response to a control signal of the stylus pen 4800.

Referring to view (c) of FIG. 49, when user manipulation 4904 to rotate a dialer 4905 of the stylus pen 4800 is input after the toolset is activated, the multi display device 100 progresses to view (d) of FIG. 49. Referring to view (d) of FIG. 49, the multi display device 100 rotates a selection display (4911) and displays tool selection 4912 in response to the rotation 4904 of the dialer 4905 of the stylus pen 4800.

Referring to view (e) of FIG. 49, when the user clicks a lower button 4906 of the stylus pen 4800 (4907) while the tool selected from the toolset is being displayed, the multi display device 100 progresses to view (f) of FIG. 49. Referring to view (f) of FIG. 49, the multi display device 100 activates a lower level toolset 4914 of the selected tool and displays it in response to the click 4907 of the stylus pen 4800.

Figure 50:
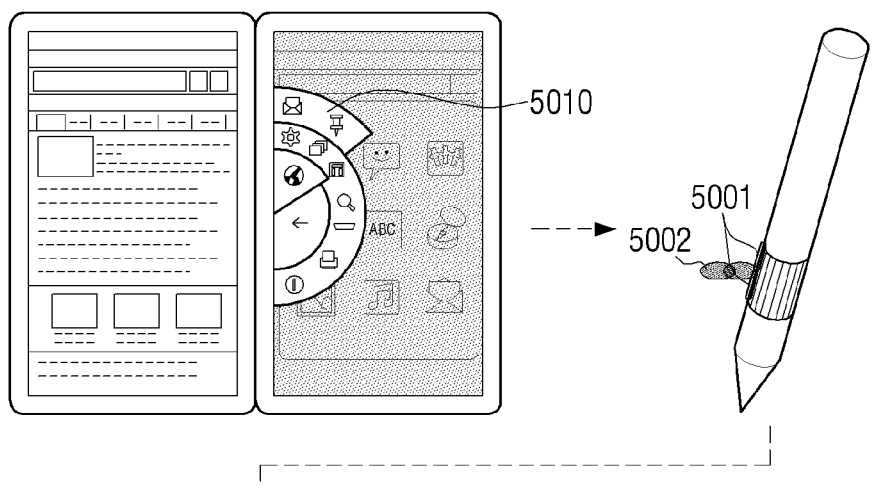
FIG. 50 is a view illustrating ending a toolset using a stylus pen according to an exemplary embodiment of the present general inventive concept.
Figure 50:
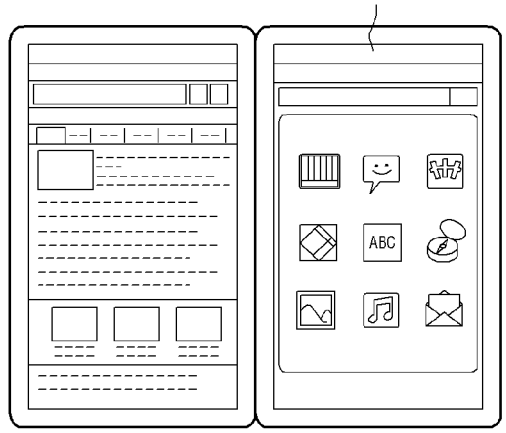

FIG. 50 is a view illustrating ending a toolset using a stylus pen 4800 according to an exemplary embodiment of the present general inventive concept.

Referring to view (a) of FIG. 50, when the user double clicks one of the upper and lower buttons 5001 of the stylus pen 4800 with respect to the multi display device 100 on which a lower level toolset 5010 is displayed (5002), the multi display device 100 progresses to view (b) of FIG. 50. Referring to view (b) of FIG. 50, the multi display device 100 ends the toolset in response to a control signal of the stylus pen 4800.

Figure 51:
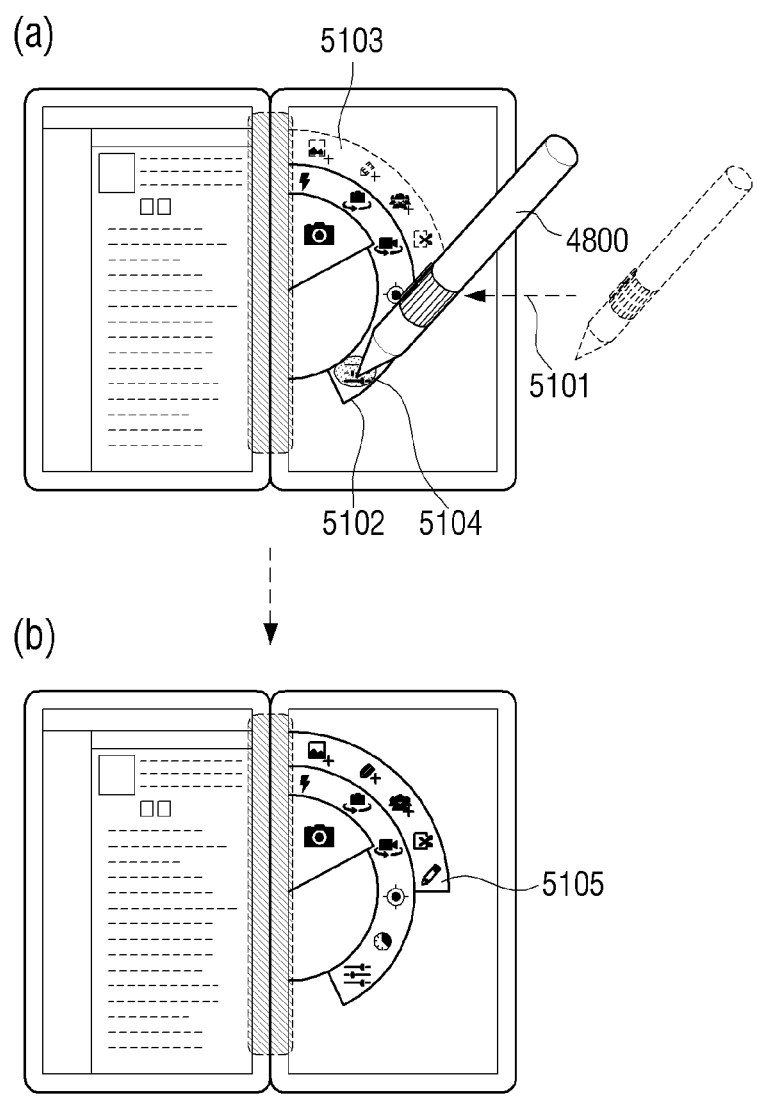
FIGS. 51 and 52 are views illustrating executing a toolset using a proximity sensor according to an exemplary embodiment of the present general inventive concept.
Figure 52:
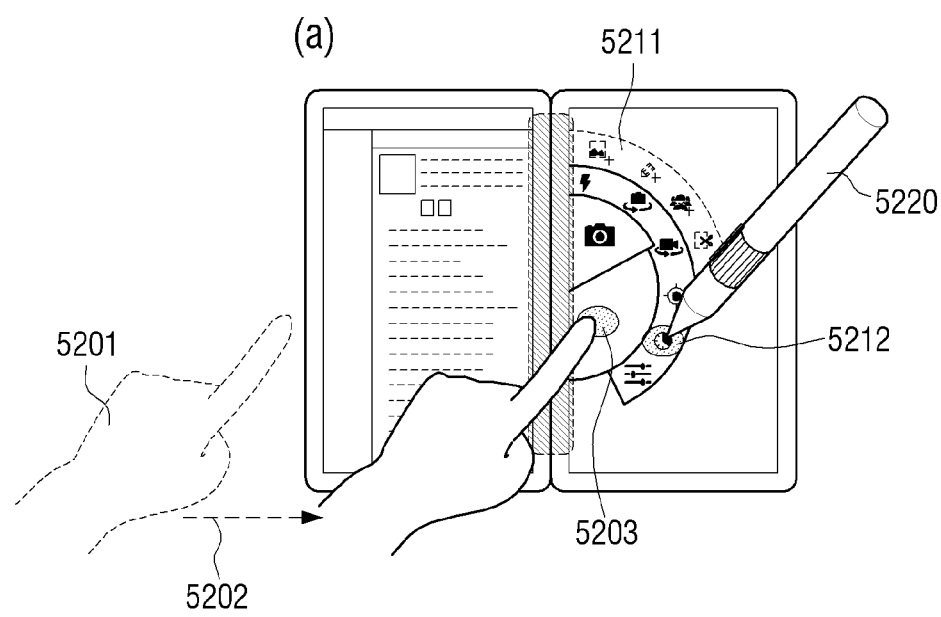
Figure 52:
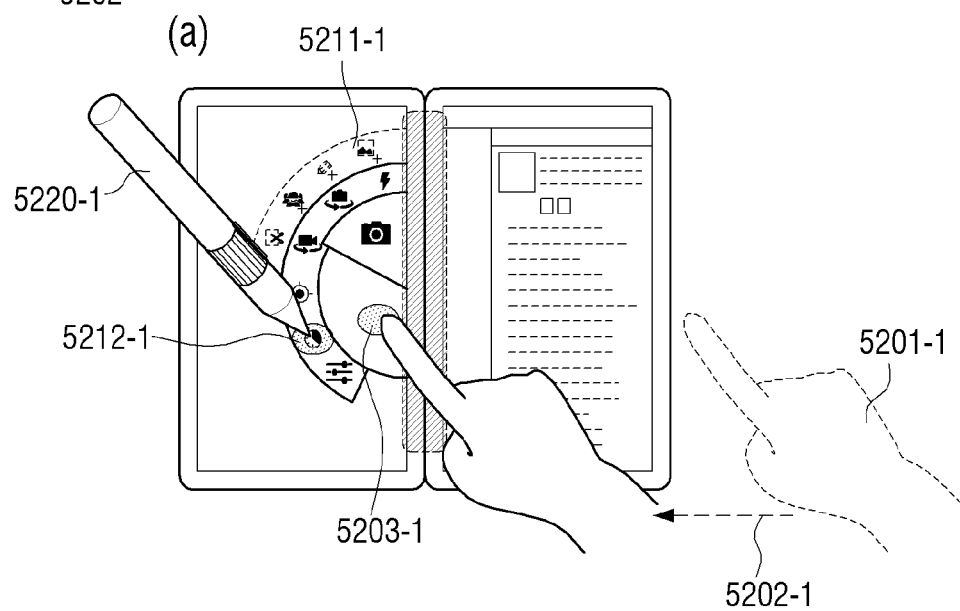

FIGS. 51 and 52 are views illustrating executing a toolset using the proximity sensor 155 of FIGS. 3, 7, and 17, according to an exemplary embodiment of the present general inventive concept.

Since the proximity sensor 155 and the hovering have been described above with reference to FIGS. 7 and 17, a redundant explanation is omitted.

Referring to view (a) of FIG. 51, when a stylus pen 4800 approaches a tool 5102 to select the tool of the multi display device 100 (5101), a lower level toolset of the tool 5102 is slightly exposed to provide a semi-transparent toolset 5103. When the user taps the tool 5102 with the stylus pen 4800, the multi display device 100 progresses to view (b) of FIG. 51. Referring to view (b) of FIG. 51, a fully-visible lower level toolset 5105 corresponding to the selected tool 5102 is displayed by tapping with the stylus pen 4800.

Although the approach of the stylus pen 4800 is assumed in the above exemplary embodiment, an approach of a user's hand or other user objects may be applied.

FIG. 52 is a view illustrating executing a toolset according to an approach of a user's hand according to an exemplary embodiment of the present general inventive concept.

Referring to view (a) of FIG. 52, the user's left hand 5201 approaches the multi display device 100 (5202). When the user touches a point 5203 of the display of the multi display device 100 with one finger of the left hand 5201, the multi display device 100 activates a toolset 5211 with reference to a touch point with reference to an approaching direction of the user's left hand 5201. After that, the user may select a tool 5212 of the toolset 5211 using a stylus pen 5220 or the user's right hand 5201-1.

View (b) of FIG. 52 illustrates the user's right hand 5201-1 approaching the multi display device 100 (5202-1). Accordingly, a toolset 5211-1 is activated with reference an approaching direction of the user's right hand 5201-1 when the user touches a point 5203-1 of the display of the multi display device 100 with one finger of the left hand 5201. After that, the user may select a tool 5212-1 of the toolset 5211-1 using a stylus pen 5220-1 or the user's left hand 5201.

The toolset 5211-1 may be activated by motion in an opposite direction of the approaching direction of the user's right hand 5201-1 so as not to obstruct the user's line of sight.

Hereinafter, the multi displaying device 100 executing a toolset using a multi-touch will be explained.

Figure 53:
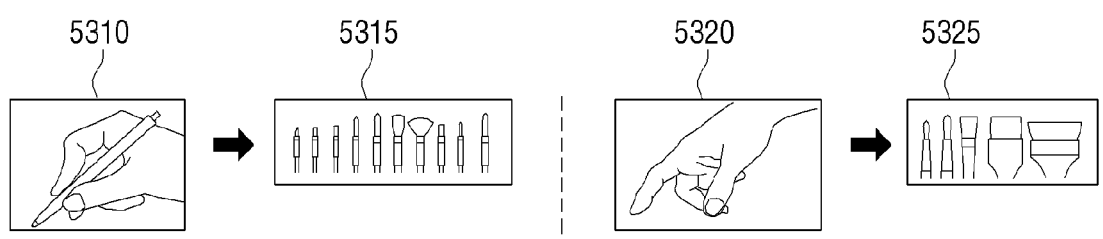
FIG. 53 is a view illustrating providing a toolset according to a multi-touch of a hand and a pen according to an exemplary embodiment of the present general inventive concept.

FIG. 53 is a view illustrating providing a toolset corresponding to a multi-touch of a hand or a pen according to an exemplary embodiment of the present general inventive concept.

Referring to FIGS. 2 and 53, when a touch of a stylus pen 4800 is recognized (5310), the multi display device 100 displays a toolset 5315 that is used by the stylus pen 4800 in a running application. For example, since the stylus pen 4800 may be used to draw a fine line in a paint application, the toolset 5315 to select a corresponding pen type may be provided.

In contrast, when a touch of the hand is recognized (5320), the multi display device 100 displays a toolset 5325 that is used by the hand in a running application. For example, since the hand may be used to draw a thick line or color in the paint application, the toolset 5315 to select a corresponding brush type may be provided.

As such, the multi display apparatus 100 is able to differentiate between a touch of the stylus pen 4800 and a user's hand. Other objects may also be used by the multi display apparatus 100 to perform the aforementioned operations.

Figure 54:
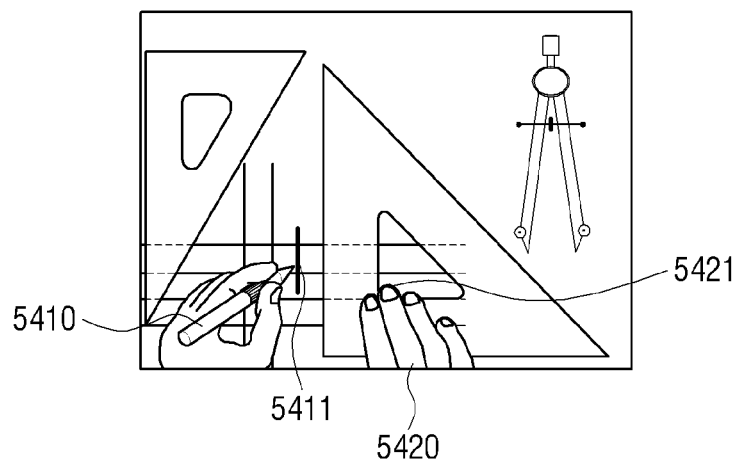
FIG. 54 is a view illustrating a method of using a tool corresponding to a multi-touch of a hand and a pen according to an exemplary embodiment of the present general inventive concept.

FIG. 54 is a view illustrating a method of using a tool corresponding to a multi-touch of a hand and a pen according to an exemplary embodiment of the present general inventive concept.

Although the tool to draw a line is provided to correspond to the stylus pen 4800 and the tool to draw a thick line or color is provided to correspond to the hand in the paint application in FIG. 53, in FIG. 54, it is assumed that a tool of a writing instrument (for example, a pencil, a pen, a brush, and a crayon displaying various colors) may be provided to correspond to the stylus pen 4800, and a tool of a pattering instrument (for example, a straight ruler, a square-form ruler, a wave-form ruler, a protractor, and a circular plate) may be provided to correspond to the hand.

Referring to FIG. 54, the multi display device 100 recognizes touches of a stylus pen 5410 and a hand 5420, and performs an operation 5411 corresponding to the touch of the stylus pen 5410 and an operation 5421 corresponding to the touch of the hand 5420. For example, when the touch of the stylus pen 5410 moves on the display, a single line is drawn along a moving path 5411, and, when the touch of the hand 4510 moves, a set square 5421 moves along a moving path. Accordingly, the user can easily draw a desired picture using the patterning instrument such as the set square.

Figure 55:
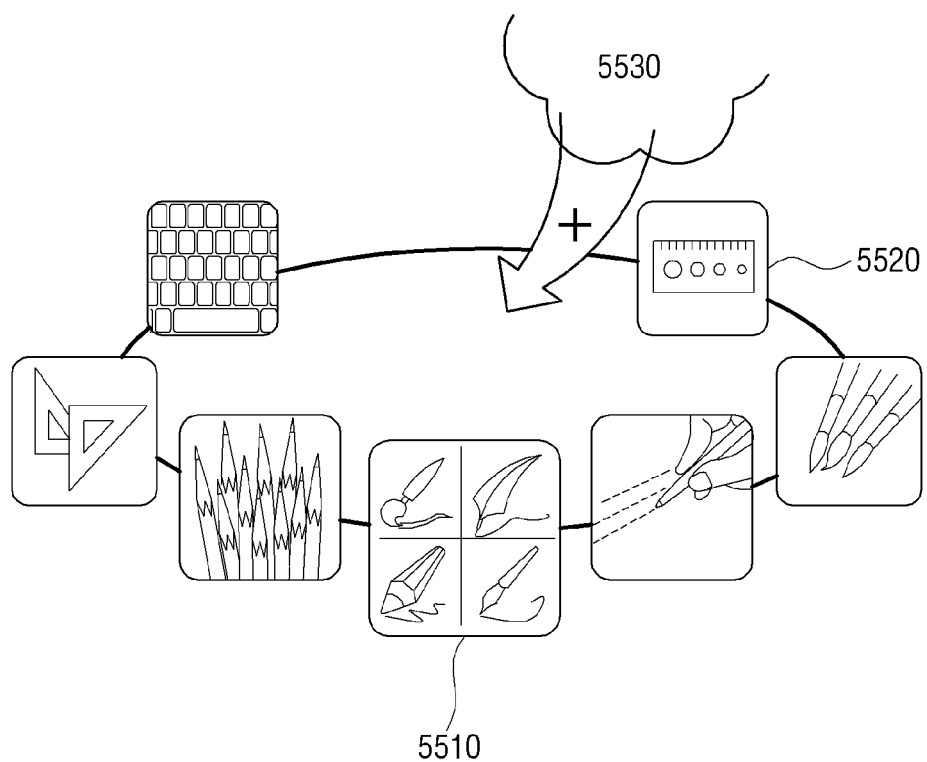
FIG. 55 is a view illustrating a update operation of a toolset according to an exemplary embodiment of the present general inventive concept.

FIG. 55 is a view illustrating an operation of updating a toolset according to an exemplary embodiment of the present general inventive concept.

The multi display device 100 may share data with an external device or an external network using each communication module of the communicator 100. The multi display device 100 may update a toolset by adding an additional tool through an external device or an external network. The additional tool may be developed using an OS software development kit (SDK) of the multi display device 100, and the users may add a developed new additional tool and an updated tool to the multi display device 100 through the internet or a network. For example, the user may purchase a developed tool at an application store and may reconfigure a toolset.

Referring to FIG. 55, the user may receive a new additional tool 5520 through an external network 5530 such as the Internet. Accordingly, the user may selectively add a tool matching a user's preference in addition to an already installed tool 5510.

The added tool 5520 may be placed on the variable region 3120 of FIG. 31.

Figure 56:
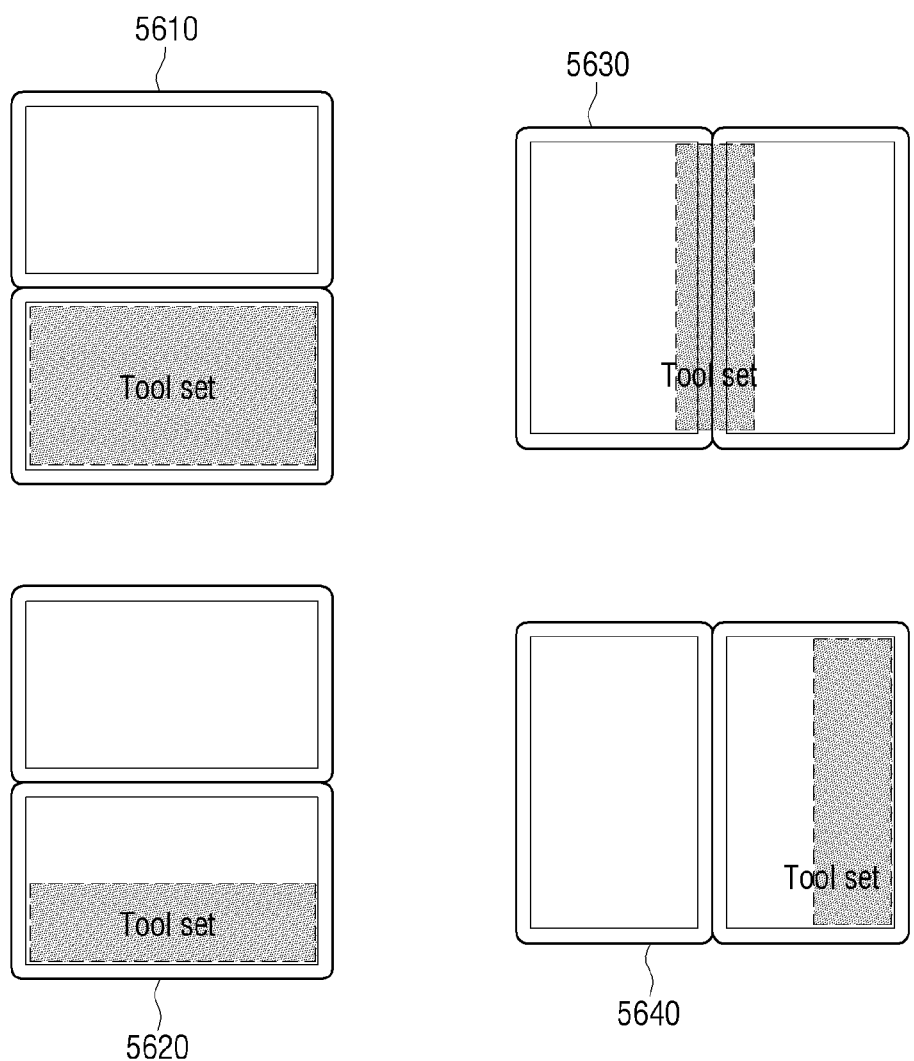
FIG. 56 is a view illustrating placing a toolset according to an exemplary embodiment of the present general inventive concept.

FIG. 56 is a view illustrating placing a toolset according to an exemplary embodiment of the present general inventive concept.

Although only the toolset UI of the semi-circular shape which is placed on the hinge region in the direction toward one display has been illustrated in FIGS. 20 through 47, the toolset may be placed in various forms as follows.

Referring to FIG. 56, when the first and second displays are placed vertically on the multi display device 100 in the expending mode, a toolset may be placed on an entire region 5610 of the second display, which is disposed on a lower side, or a lower end 5620. This may be applied to a toolset that provides a task environment such as a notebook computer to the user.

In contrast, when the first and second displays are placed horizontally on the multi display device 100, a toolset may be placed on parts 5630 of the display that are disposed on left and right sides of the hinge region, or on opposite ends 5640 of the display. This may be applied to a toolset of a task environment in which user's manipulation such as a touch gesture is input on the two displays as explained above with reference to FIGS. 20 through 47.

Figure 57:
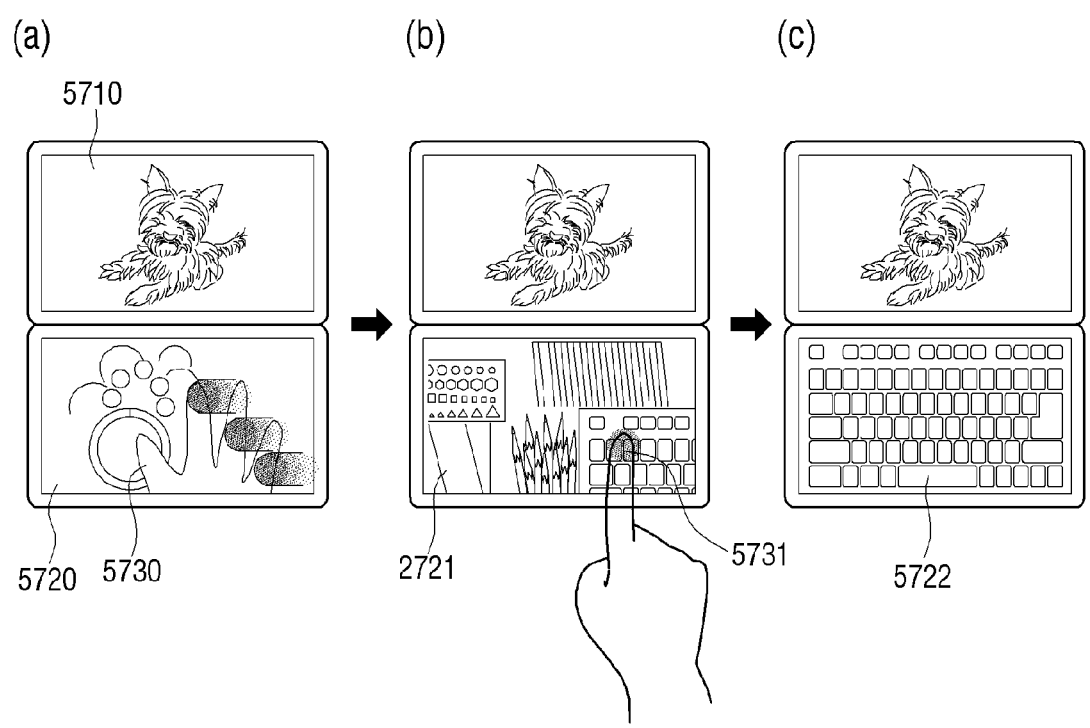
FIG. 57 is a view illustrating executing a toolset when the toolset is placed on an entire region of a second display of FIG. 58 according to an exemplary embodiment of the present general inventive concept.

FIG. 57 is a view illustrating executing a toolset when the toolset is placed on the entire region 5610 of the second display of FIG. 56 according to an exemplary embodiment of the present general inventive concept.

Referring to FIG. 2 and view (a) of FIG. 57, the multi display device 100 displays a task screen on a screen 5710 of the first display like a monitor of a notebook computer. A screen 5720 of the second display is used to receive user input, and, when specific user' manipulation, for example, a three finger flick gesture 5730, is sensed on the second display 5720, the multi display device 100 progresses to view (b) of FIG. 57. Referring to view (b) of FIG. 57, the multi display device 100 displays a toolset 5721 corresponding to an application that is being currently driven in response to the specific user's manipulation. As such, when a gesture to select one tool from the toolset, for example, a tap gesture 5731, is input by the user, the multi display device 100 progresses to view (c) of FIG. 57. Referring to view (c) of FIG. 57, the second display displays the selected tool as a keyboard 5722 in response to the gesture to select one tool.

As described above, by automatically executing the toolset according to user manipulation such as a touch gesture without process of other operations, a customized user task environment can be provided.

Figure 58:
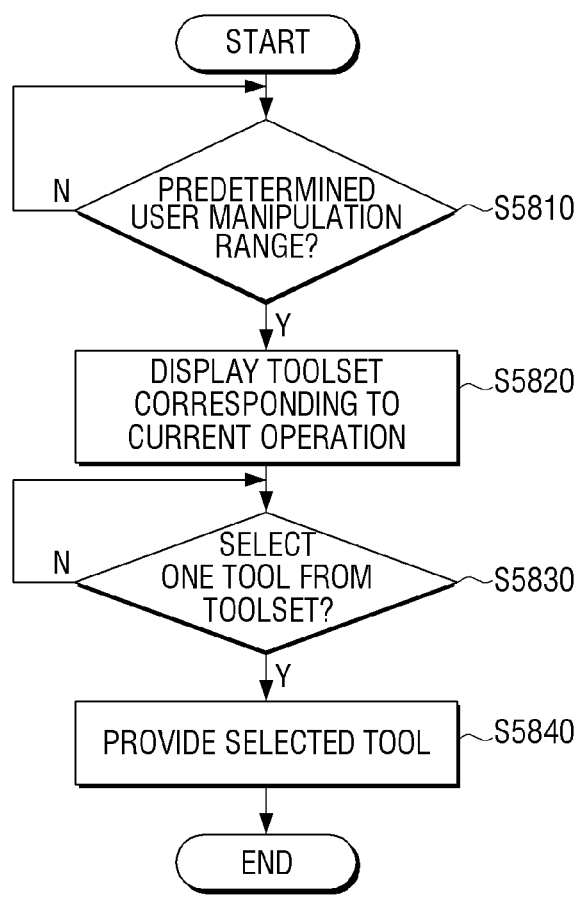
FIG. 58 is a flowchart illustrating an operation of providing a tool of a multi display device according to an exemplary embodiment of the present general inventive concept.

FIG. 58 is a flowchart to explain an operation of providing a tool of a multi display device 100 according to an exemplary embodiment of the present general inventive concept.

Referring to FIGS. 2 and 58, when pre-defined user manipulation is input (S5810: YES), a toolset corresponding to a current operation is displayed using at least one of the first display 190*a* and the second display 190*b* (S5820).

The pre-defined user manipulation may be a touch gesture that moves from the hinge 185 connecting the first display

190*a* and the second display 190*b* in a first direction toward the first display 190*a* or a second direction toward the second display 190*b*, and the toolset may be displayed on the first display 190*a* or the second display 190*b* according to the direction of the touch gesture.

The toolset may be a graphic UI that lists tools in a semi-circular form with reference to a point at which the touch gesture ends, but is not limited thereto.

The toolset may include at least one of an internet browser adjustment menu, a music player adjustment menu, a moving image player adjustment menu, a camera option adjustment menu, a message adjustment menu, a memo adjustment menu, a gallery adjustment menu, an e-book adjustment menu, a contact information adjustment menu, a calendar adjustment menu, a writing characteristic adjustment menu, and an e-book adjustment menu, but is not limited thereto.

When one tool is selected from the toolset (S5830: YES), the selected tool is provided (S5840).

The method for providing the tool of the multi display device as illustrated in FIG. 58 may be executed in the multi display device 100 having the configuration of FIG. 1, and may be executed in a multi display device having other configurations.

Figure 59:
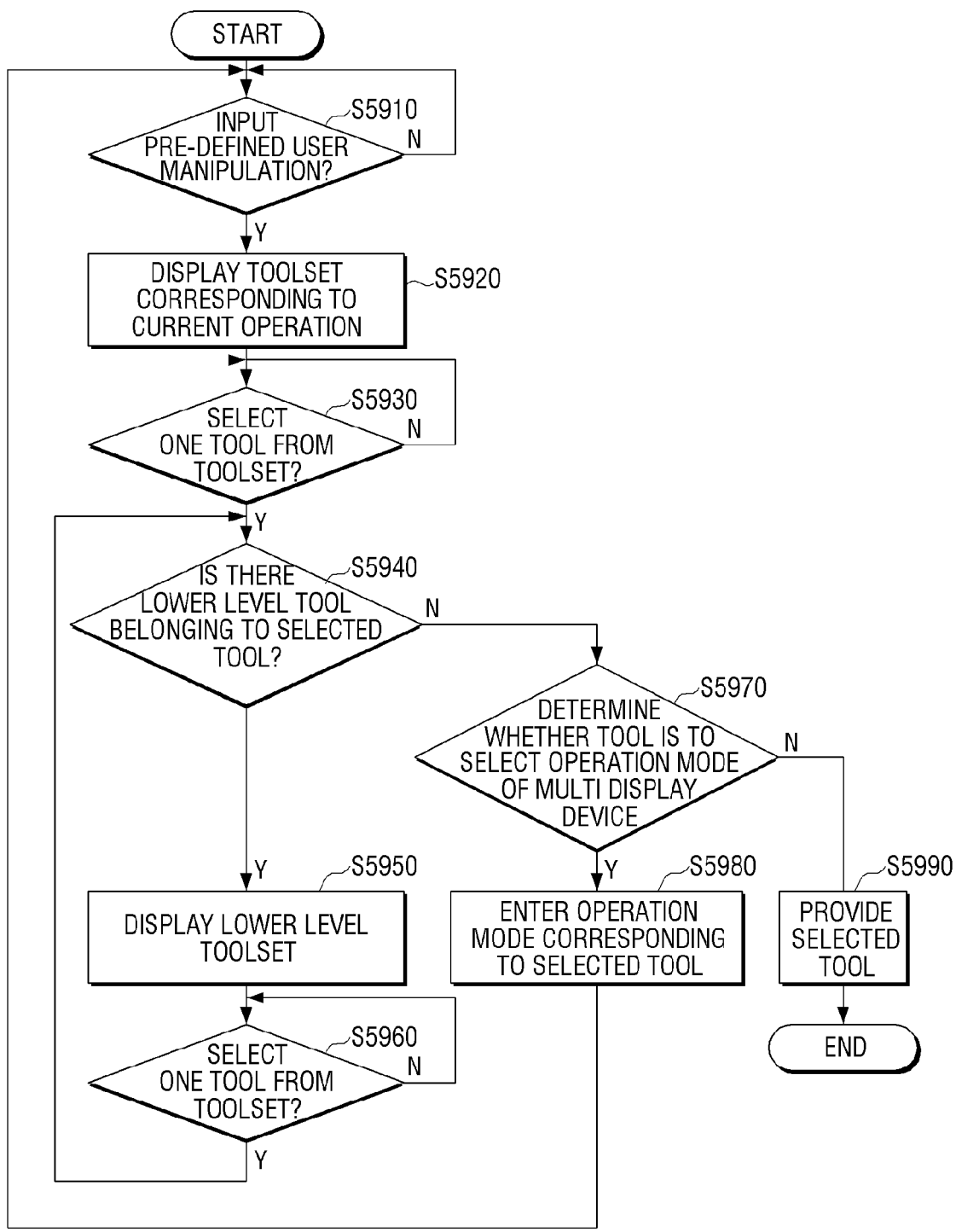
FIG. 59 is a flowchart illustrating an operation of providing a tool of a multi display device according to an exemplary embodiment of the present general inventive concept.

FIG. 59 is a flowchart illustrating an operation of providing a tool of a multi display device 100 according to an exemplary embodiment of the present general inventive concept.

Referring to FIG. 59, when a pre-defined user manipulation (to display a toolset) is input (S5910: YES), a toolset including tools corresponding to an operation of the multi display device is displayed on a screen of at least one of the first display 190*a* and the second display 190*b* (S5920). In contrast, if the pre-defined user manipulation (to display the toolset) is not input (S5910: NO), a mode is changed to an operation mode corresponding to a selected tool (S5980).

The toolset recited herein may vary the tools included in the toolset according to user's manipulation.

The user manipulation may be a touch gesture that moves from the hinge 185 connecting the first display 190*a* and the second display 190*b* in a first direction toward the first display 190*a* or a second direction toward the second display 190*b*, and the toolset may be displayed on the first display 190*a* or the second display 190*b* according to a direction of the touch gesture.

The toolset may include at least one of an internet browser adjustment menu, a music player adjustment menu, a moving image player adjustment menu, a camera option adjustment menu, a message adjustment menu, a memo adjustment menu, a gallery adjustment menu, an e-book adjustment menu, a contact information adjustment menu, a calendar adjustment menu, a writing characteristic adjustment menu, and an e-book adjustment menu, but is not limited thereto.

When one tool is selected from the toolset (S5930: YES) and there is a lower level tool belonging to the selected tool (S5940: YES), a lower level toolset listing the lower level tool may be displayed (S5950). When one tool is selected from the lower level toolset (S5960: YES), operation S5940 resumes.

The lower level toolset may be a graphic UI of a circular bar shape or a graphic UI of a button shape that is displayed along an outer edge of the upper level toolset.

At least one of the toolset and the lower level toolset may be scrolled by user's rolling manipulation, and may display a hidden tool.

In contrast, when there is no lower level tool belonging to the selected tool (S5940: NO), it is determined whether the selected tool is to select an operation mode of the multi display device 100. When it is determined that the selected tool is to select the operation mode (S5970: YES), a mode is changed to an operation mode corresponding to the selected tool (S5980).

In this case, when the pre-defined user manipulation is input again in the operation mode, the toolset and the lower level toolset listing lower level tools corresponding to the operation mode may be displayed simultaneously.

In contrast, when it is determined that the selected tool is not to select the operation mode (S5970: NO), the selected tool is provided (S5990). In this case, in the operation of providing the tool, when the tool is usable in an application that is being executed in the toolset, the selected tool may be displayed on at least one of the first display 190*a* and the second display 190*b*.

The method of providing the tool of the multi display device as illustrated in FIG. 59 may be executed in the multi display device 100 having the configuration of FIG. 1, or alternatively, may be executed in a multi display device having other configurations.

According to various exemplary embodiments of the present general inventive concept as described above, a multi display device 100 provides a toolset corresponding to each application so that the user can control an application intuitively and easily.

The methods according to various exemplary embodiments as described above may be programmed and stored in various storage media. Accordingly, the methods according to the above-described various exemplary embodiments may be implemented in various kinds of electronic devices that execute a storage medium.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Specifically, according to an exemplary embodiment of the present general inventive concept, a non-transitory computer readable medium having embodied thereon a computer program to execute a method of providing a tool of a multi display device, the method including when pre-defined user manipulation is input, displaying a toolset corresponding to a current operation using at least one of a first display 190*a* and a second display 190*b*, and, when one tool is selected from the toolset, providing the selected tool.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi display device, comprising:
a first body comprising a first display;
a second body comprising a second display;
a hinge to connect the first and second bodies; and
a controller to display a toolset comprising tools corresponding to an operation state of the multi display device on a screen of at least one of the first and second displays when a user manipulation to display a toolset is input with the toolset being displayed as a set of tool symbols, and to perform an operation corresponding to the selected tool when one tool is selected from the toolset by selecting one of the tool set symbols,
wherein a display position of a tool displayed on the toolset is variable.

2. The multi display device as claimed in claim 1, wherein the toolset comprises a tool that is usable in an application that is being executed in the multi display device.

3. The multi display device as claimed in claim 2, wherein the toolset comprises a dedicated tool that is used only for the application, and a common tool that is commonly usable in a plurality of applications,
wherein the controller places the dedicated tool in the toolset in preference to the common tool.

4. The multi display device as claimed in claim 2, wherein, when a tool that is usable in the application that is being executed is selected from the toolset, the controller displays a tool icon corresponding to the selected tool, and performs an operation corresponding to the tool while changing a display position of the tool icon according to user manipulation.

5. The multi display device as claimed in claim 1, wherein, when there is a first lower level tool belonging to the selected tool, the controller displays a first lower level toolset listing the first lower level tool on one side of the toolset,
wherein, when one first lower level tool is selected from the first lower level toolset and there is a second lower level tool belonging to the selected first lower level tool, the controller displays a second lower level toolset listing the second lower level tool on one side of the first lower level toolset.

6. The multi display device as claimed in claim 2, wherein a size and a shape of the toolset are adjusted differently according to a number of tools that are usable in the application.

7. The multi display device as claimed in claim 5, wherein the user manipulation is a touch gesture,
wherein the toolset is a graphic UI in which tools are arranged in a semi-circular form with reference to a point where the touch gesture ends,
wherein the first lower level toolset is a graphic UI of a circular bar shape or a graphic UI of a button shape that is displayed along an outer edge of the toolset.

8. The multi display device as claimed in claim 1, wherein the controller newly displays a hidden tool on the toolset according to user manipulation.

9. The multi display device as claimed in claim 1, wherein the user manipulation is a touch and drag gesture that is made from a border region of the first body in a first direction toward the first display or from a border region of the second body in a second direction toward the second display,
wherein the controller displays the toolset on the first display or the second display according to a direction in which the touch and drag gesture is made.

10. The multi display device as claimed in claim 1, wherein the user manipulation is a touch and drag gesture that is made from a connection region between the first body and the second body in a first direction toward the first display or in a second direction toward the second display,
wherein the controller displays the toolset on the first display or the second display according to a direction in which the touch and drag gesture is made.

11. The multi display device as claimed in claim 1, wherein the toolset further comprises at least one icon to select an application that is executable in the multi display device,
wherein, when the icon is selected from the toolset, the controller executes an application corresponding to the selected icon on a certain region of the first display or the second display.

12. The multi display device as claimed in claim 1, wherein the toolset enables tool update and tool addition.

13. The multi display device as claimed in claim 1, wherein the controller provides a tool region on at least one of the first display and the second display, and moves a tool that is selected by the user from among tools of the toolset to the tool region and displays the tool on the tool region.

14. The multi display device as claimed in claim 1, wherein the user manipulation is a touch that is performed by an external object on the first display or the second display,
wherein, when the touch is performed, the controller displays the toolset comprising a tool corresponding to a kind of the external object on a touch point, and assigns a function of a tool selected from the toolset to the external object.

15. The multi display device as claimed in claim 14, wherein, when a patterning instrument is assigned to a first external object and a writing instrument is assigned to a second external object, and, when a touch is performed by the first external object and the second external object on the screen of the first or second display, the controller displays a pattering instrument image and a writing instrument image on touch points, and, when the touch point of the second external object is moved, the controller displays the patterning instrument image and a line that is drawn according to a moving path of the second external object.

16. The multi display device as claimed in claim 1, further comprising a communicator that receives a control signal from a stylus pen to manipulate the multi display device,
wherein, when a control signal to display the toolset is input from the stylus pen, the controller determines that the user manipulation is performed.

17. The multi display device as claimed in claim 1, wherein the toolset comprises at least one of an internet browser adjustment menu, a music player adjustment menu, a moving image player adjustment menu, a camera option adjustment menu, a message adjustment menu, a memo adjustment menu, a gallery adjustment menu, an e-book adjustment menu, a contact information adjustment menu, a calendar adjustment menu, a writing characteristic adjustment menu, and an e-book adjustment menu.

18. A method of providing a tool of a multi display device that comprises a first body comprising a first display, and a second body comprising a second display, the method comprising:
when user manipulation to display a toolset is input with the toolset being displayed as a set of tool symbols, displaying a toolset comprising tools corresponding to an operation state of the multi display device on a screen of at least one of the first display and the second display; and
when one tool is selected from the toolset by selecting one of the tool set symbols, performing an operation corresponding to the selected tool, wherein a display position of a tool displayed on the toolset is variable.

19. The method as claimed in claim 18, wherein the toolset comprises a tool that is usable in an application that is being executed in the multi display device.

20. The method as claimed in claim 18, further comprising newly displaying a hidden tool on the toolset according to user manipulation.

21. The method as claimed in claim 18, wherein the user manipulation is a touch and drag gesture that is made from a border region of the first body in a first direction toward the first display or from a border region of the second body in a second direction toward the second display, wherein the displaying on the screen comprises displaying the toolset on the first display or the second display according to a direction in which the touch and drag gesture is made.

22. The method as claimed in claim 18, wherein the user manipulation is a touch and drag gesture that is made from a connection region between the first body and the second body in a first direction toward the first display or in a second direction toward the second display, wherein the displaying on the screen comprises displaying the toolset on the first display or the second display according to a direction in which the touch and drag gesture is made.

23. The method as claimed in claim 18, wherein the user manipulation is a touch that is performed by an external object on the first display or the second display, wherein the displaying on the screen comprises, when the touch is performed, displaying the toolset comprising a tool corresponding to a kind of the external object on a touch point, wherein the performing the operation corresponding to the tool comprises assigning a function of a tool selected from the toolset to the external object.

24. The method as claimed in claim 23, further comprising, when a patterning instrument is assigned to a first external object and a writing instrument is assigned to a second external object, and, when a touch is performed by the first external object and the second external object on the screen of the first or second display, displaying a pattering instrument image and a writing instrument image on touch points, and, when the touch point of the second external object is moved, displaying the patterning instrument image and a line that is drawn according to a moving path of the second external object.

\* \* \* \* \*